US012615561B2

(12) United States Patent
Wu

(10) Patent No.: US 12,615,561 B2
(45) Date of Patent: Apr. 28, 2026

(54) MANAGING A NON-CONDITIONAL PROCEDURE DURING A CONDITIONAL PROCEDURE

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 530 days.

(21) Appl. No.: 17/800,222

(22) PCT Filed: Feb. 15, 2021

(86) PCT No.: PCT/US2021/018109
§ 371 (c)(1),
(2) Date: Aug. 16, 2022

(87) PCT Pub. No.: WO2021/163661
PCT Pub. Date: Aug. 19, 2021

(65) Prior Publication Data
US 2023/0067377 A1 Mar. 2, 2023

Related U.S. Application Data

(60) Provisional application No. 62/977,395, filed on Feb. 16, 2020.

(51) Int. Cl.
*H04W 36/00* (2009.01)
*H04W 36/36* (2009.01)

(52) U.S. Cl.
CPC .. *H04W 36/0058* (2018.08); *H04W 36/00838* (2023.05); *H04W 36/362* (2023.05)

(58) Field of Classification Search
CPC ........... H04W 36/0058; H04W 36/362; H04W 36/00838
See application file for complete search history.

(56) References Cited

U.S. PATENT DOCUMENTS

2010/0124172 A1* 5/2010 Tenny .................. H04W 24/08
370/242
2010/0124203 A1* 5/2010 Tenny .................. H04W 36/08
370/331

(Continued)

FOREIGN PATENT DOCUMENTS

CN        110545567 A     12/2019
WO     WO-2018175721 A1    9/2018

(Continued)

OTHER PUBLICATIONS

International Search Report and Written Opinion for Application No. PCT/US2021/018109, dated May 20, 2021.

(Continued)

*Primary Examiner* — Jael M Ulysse
(74) *Attorney, Agent, or Firm* — MARSHALL, GERSTEIN & BORUN LLP

(57) ABSTRACT

A technique for managing mobility configuration in a UE includes obtaining conditional configuration information including (i) a conditional configuration related to a candidate cell in the RAN, and (ii) a condition to be satisfied before the UE applies the configuration (1202). The technique further includes detecting that a non-conditional procedure related to the UE and the RAN has been initiated, when the UE is connected to the RAN via at least one cell (1204); determining, subsequently to the detecting and when the non-conditional procedure has not been completed, that the condition is satisfied (1206); and completing, by the processing hardware, (i) the conditional procedure in accordance with the conditional configuration and (ii) the non-conditional procedure (1208).

20 Claims, 35 Drawing Sheets

(56) References Cited

U.S. PATENT DOCUMENTS

| | | | | |
|---|---|---|---|---|
| 2018/0310206 A1 | 10/2018 | Li et al. | | |
| 2019/0223073 A1* | 7/2019 | Chen | | H04W 36/0077 |
| 2019/0335374 A1 | 10/2019 | Takehana et al. | | |
| 2019/0387440 A1 | 12/2019 | Yui et al. | | |
| 2020/0022209 A1 | 1/2020 | Peng et al. | | |
| 2020/0154326 A1* | 5/2020 | Deenoo | | H04W 36/362 |
| 2020/0351694 A1* | 11/2020 | Chen | | H04W 36/362 |
| 2020/0351744 A1* | 11/2020 | Latheef | | H04W 36/26 |
| 2021/0051550 A1* | 2/2021 | Latheef | | H04W 36/08 |
| 2021/0058829 A1* | 2/2021 | Ozturk | | H04W 36/0064 |
| 2021/0099926 A1* | 4/2021 | Chen | | H04W 36/362 |
| 2021/0112475 A1* | 4/2021 | Kim | | H04W 36/0061 |
| 2021/0168678 A1* | 6/2021 | Deenoo | | H04W 76/19 |
| 2021/0176682 A1* | 6/2021 | Guo | | H04W 36/00837 |
| 2021/0235500 A1* | 7/2021 | Hong | | H04W 74/0825 |
| 2021/0274404 A1* | 9/2021 | Koziol | | H04W 36/0094 |
| 2021/0410039 A1* | 12/2021 | Da Silva | | H04W 56/001 |
| 2022/0014985 A1* | 1/2022 | Da Silva | | H04W 36/00838 |
| 2022/0022121 A1* | 1/2022 | Eklöf | | H04W 36/00837 |
| 2022/0030483 A1* | 1/2022 | Cheng | | H04W 36/00838 |
| 2022/0030498 A1* | 1/2022 | Futaki | | H04W 36/0058 |
| 2022/0060952 A1* | 2/2022 | Xie | | H04W 36/0079 |
| 2022/0167234 A1* | 5/2022 | Yan | | H04W 36/0077 |
| 2022/0201582 A1* | 6/2022 | Eklöf | | H04W 24/08 |
| 2022/0255591 A1* | 8/2022 | Park | | H04W 36/362 |
| 2022/0264401 A1* | 8/2022 | Yan | | H04W 76/18 |
| 2022/0264680 A1* | 8/2022 | Kim | | H04W 76/15 |
| 2022/0272585 A1* | 8/2022 | Chen | | H04W 36/0064 |
| 2022/0272589 A1* | 8/2022 | Ishii | | H04W 36/0038 |
| 2022/0279363 A1* | 9/2022 | Uchino | | H04W 36/362 |
| 2022/0279391 A1* | 9/2022 | Bae | | H04W 36/0033 |
| 2022/0279403 A1* | 9/2022 | Yang | | H04W 74/0833 |
| 2022/0279406 A1* | 9/2022 | Uchino | | H04W 36/362 |
| 2022/0279407 A1* | 9/2022 | Uchino | | H04W 36/0061 |
| 2022/0303847 A1* | 9/2022 | Wu | | H04W 76/18 |
| 2022/0322173 A1* | 10/2022 | Chang | | H04W 36/305 |
| 2022/0322174 A1* | 10/2022 | Da Silva | | H04W 76/19 |
| 2022/0408323 A1* | 12/2022 | Ishii | | H04W 36/0055 |
| 2022/0408325 A1* | 12/2022 | Da Silva | | H04W 76/15 |

FOREIGN PATENT DOCUMENTS

| | | |
|---|---|---|
| WO | WO-2019/032882 A1 | 2/2019 |
| WO | WO-2019/195060 A1 | 10/2019 |
| WO | WO-2019/218990 A1 | 11/2019 |
| WO | WO-2021/067236 A1 | 4/2021 |

OTHER PUBLICATIONS

Mediatek Inc., "Discussions on Conditional Handover Procedures," 3GPP Draft (2019).

First Examination Report for India Application No. 202247052137, dated Nov. 29, 2022.

Office Action for European Application No. 21710798.6, dated Apr. 2, 2025.

Ericsson, "Running CR for Introduction of Even futher Mobil-ity enhancement in E-Utran," 3GPP TSG-RAN2 Meeting #108, (2019).

Inter Corporation, "RRC running CR for NR mobility on CHO ( [107bis#54])," 3GPP TSG-RAN WG2 Meeting #108, (2019).

* cited by examiner

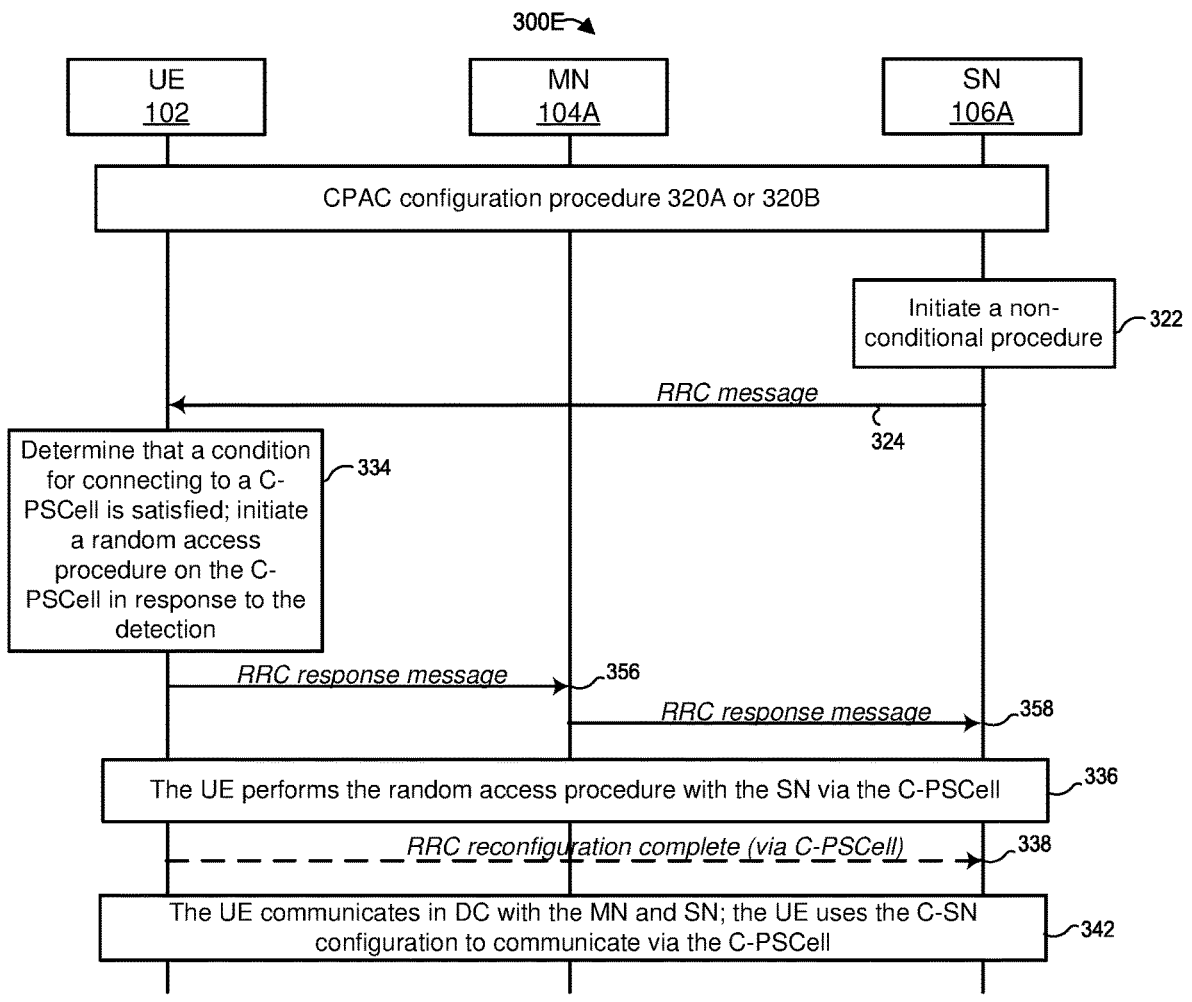

| UE 102 | MN 104A | SN 106A |

CPAC configuration procedure 320A or 320B

Initiate a non-conditional procedure — 322

*RRC message*

324

Determine that a condition for connecting to a C-PSCell is satisfied; initiate a random access procedure on the C-PSCell in response to the detection — 334

*RRC response message* — 356

*RRC response message* — 358

The UE performs the random access procedure with the SN via the C-PSCell — 336

*RRC reconfiguration complete (via C-PSCell)* — 338

The UE communicates in DC with the MN and SN; the UE uses the C-SN configuration to communicate via the C-PSCell — 342

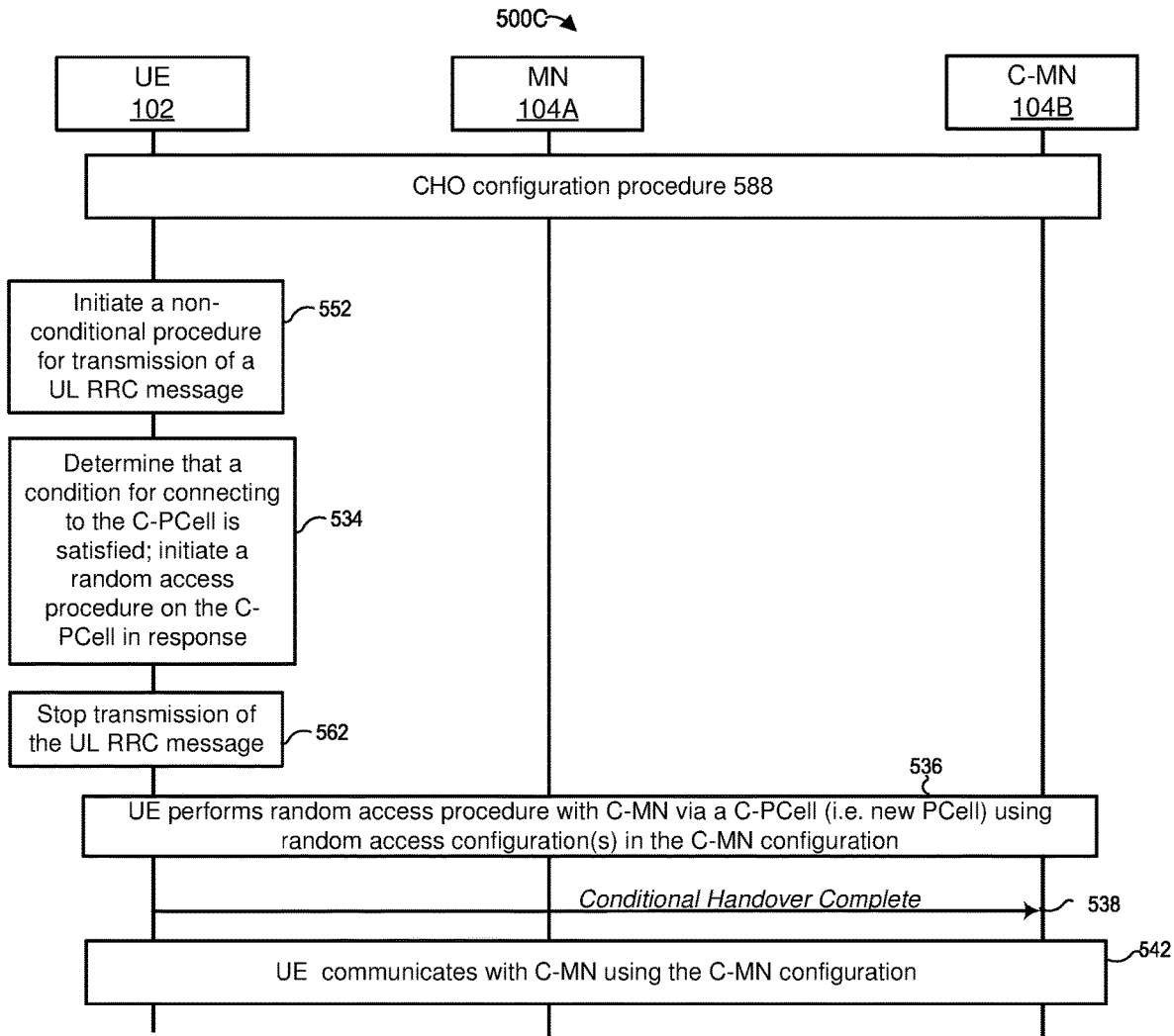

| UE 102 | MN 104A | C-MN 104B |

CHO configuration procedure 588

Initiate a non-conditional procedure for transmission of a UL RRC message — 552

Determine that a condition for connecting to the C-PCell is satisfied; initiate a random access procedure on the C-PCell in response — 534

Stop transmission of the UL RRC message — 562

536

UE performs random access procedure with C-MN via a C-PCell (i.e. new PCell) using random access configuration(s) in the C-MN configuration

*Conditional Handover Complete* — 538

UE communicates with C-MN using the C-MN configuration — 542

Figure 5D:
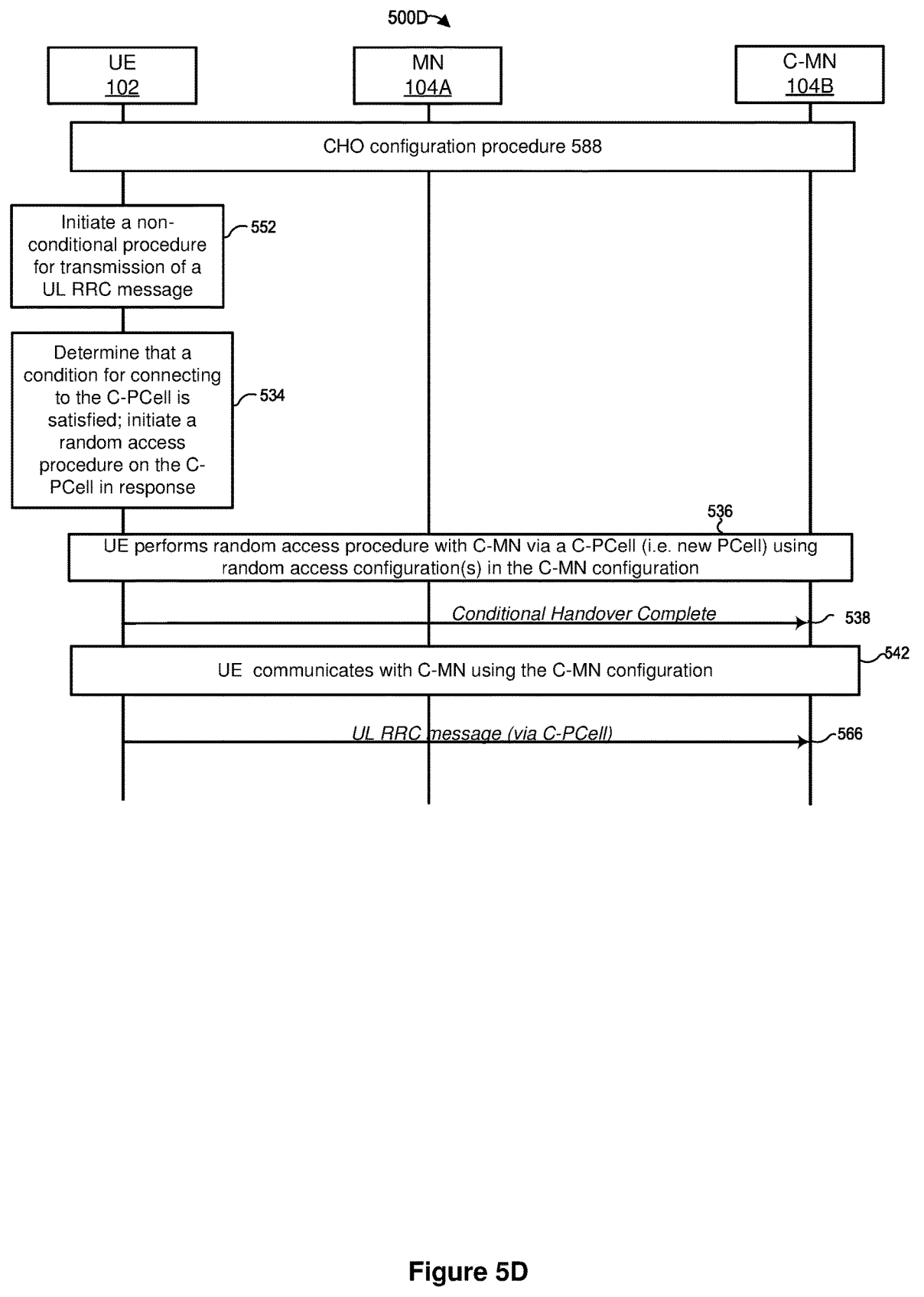

| UE<br>102 | MN<br>104A | C-MN<br>104B |
|---|---|---|

CHO configuration procedure 588

Initiate a non-conditional procedure for transmission of a UL RRC message — 552

Determine that a condition for connecting to the C-PCell is satisfied; initiate a random access procedure on the C-PCell in response — 534

536

UE performs random access procedure with C-MN via a C-PCell (i.e. new PCell) using random access configuration(s) in the C-MN configuration

*Conditional Handover Complete* ⟶ 538

UE communicates with C-MN using the C-MN configuration — 542

*UL RRC message (via C-PCell)* ⟶ 566

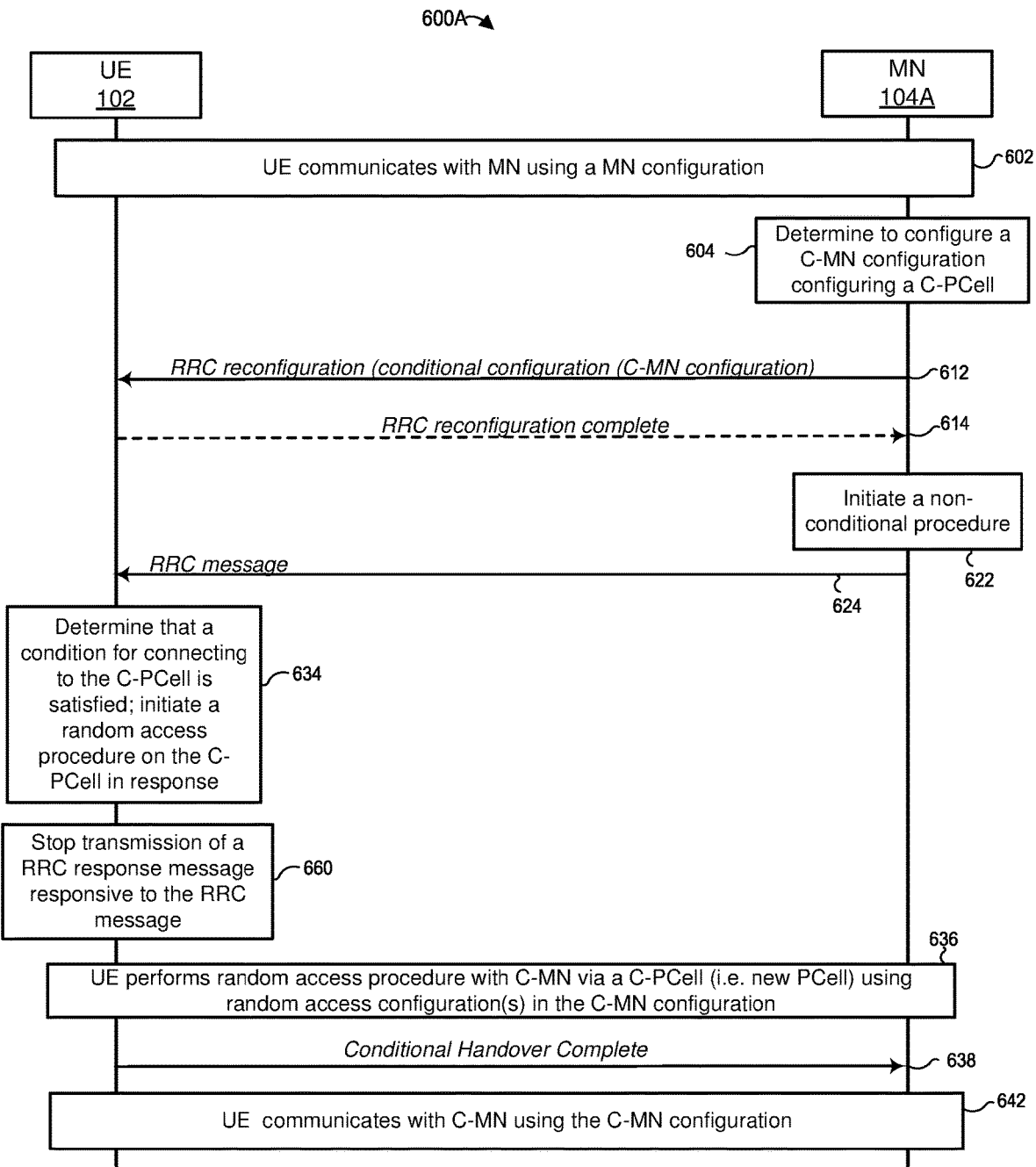

UE
102

MN
104A

UE communicates with MN using a MN configuration    602

604 — Determine to configure a C-MN configuration configuring a C-PCell

RRC reconfiguration (conditional configuration (C-MN configuration)    612

RRC reconfiguration complete    614

Initiate a non-conditional procedure    622

RRC message    624

Determine that a condition for connecting to the C-PCell is satisfied; initiate a random access procedure on the C-PCell in response    634

Stop transmission of a RRC response message responsive to the RRC message    660

636

UE performs random access procedure with C-MN via a C-PCell (i.e. new PCell) using random access configuration(s) in the C-MN configuration Conditional Handover Complete    638

UE communicates with C-MN using the C-MN configuration    642

Figure 6A

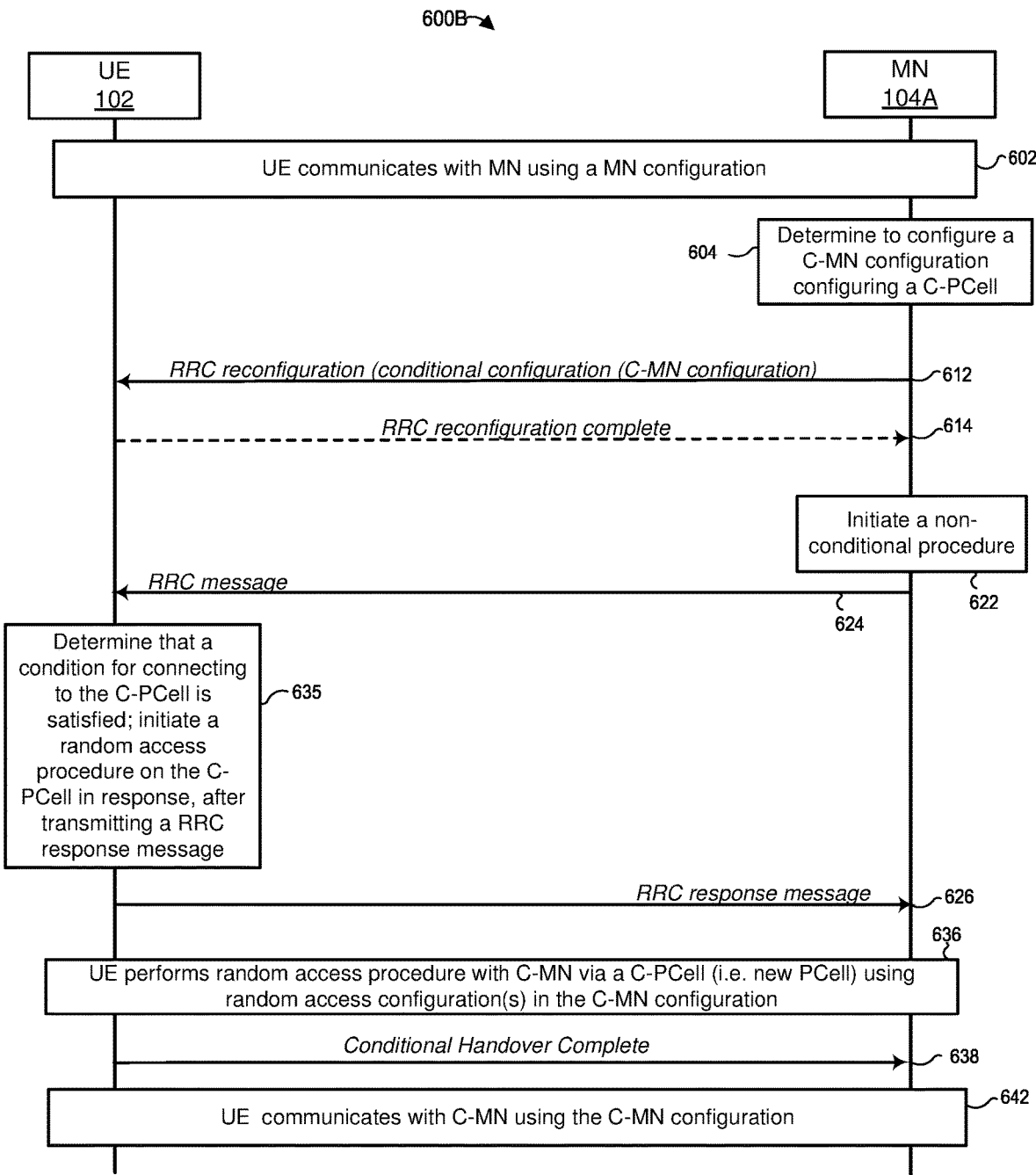

600B

UE
102

MN
104A

UE communicates with MN using a MN configuration ~602

604 — Determine to configure a C-MN configuration configuring a C-PCell

RRC reconfiguration (conditional configuration (C-MN configuration) ~612

RRC reconfiguration complete ~614

Initiate a non-conditional procedure

RRC message

622

624

Determine that a condition for connecting to the C-PCell is satisfied; initiate a random access procedure on the C-PCell in response, after transmitting a RRC response message ~635

RRC response message ~626

636

UE performs random access procedure with C-MN via a C-PCell (i.e. new PCell) using random access configuration(s) in the C-MN configuration Conditional Handover Complete ~638

UE communicates with C-MN using the C-MN configuration ~642

| RECEIVE A CONDITIONAL CONFIGURATION FOR A CANDIDATE CELL | 702 |

| START PERFORMING A NON-CONDITIONAL PROCEDURE | 704 |

| DETERMINE THAT A CONDITION FOR CONNECTING TO THE CANDIDATE CELL IS SATISFIED | 706 |

| ABORT OR SUSPEND THE NON-CONDITIONAL PROCEDURE | 708 |

| PERFORM A RANDOM ACCESS PROCEDURE ON THE CANDIDATE CELL | 710 |

| COMMUNICATE WITH THE RAN ON THE CANDIDATE CELL | 712 |

900

COMMUNICATE WITH A UE IN ACCORDANCE WITH ONE OR MORE CONFIGURATIONS — 902

TRANSMIT, TO THE UE, A CONDITIONAL CONFIGURATION FOR A CANDIDATE CELL — 904

DETERMINE THAT A CONDITION FOR UPDATING AT LEAST ONE OF THE CONFIGURATION(S) OR ADDING A NEW CONFIGURATION IS SATISFIED — 904

PREVENT TRANSMISSION OF AN RRC MESSAGE UPDATING THE CONFIGURATION(S) OR ADDING A NEW CONFIGURATION — 906

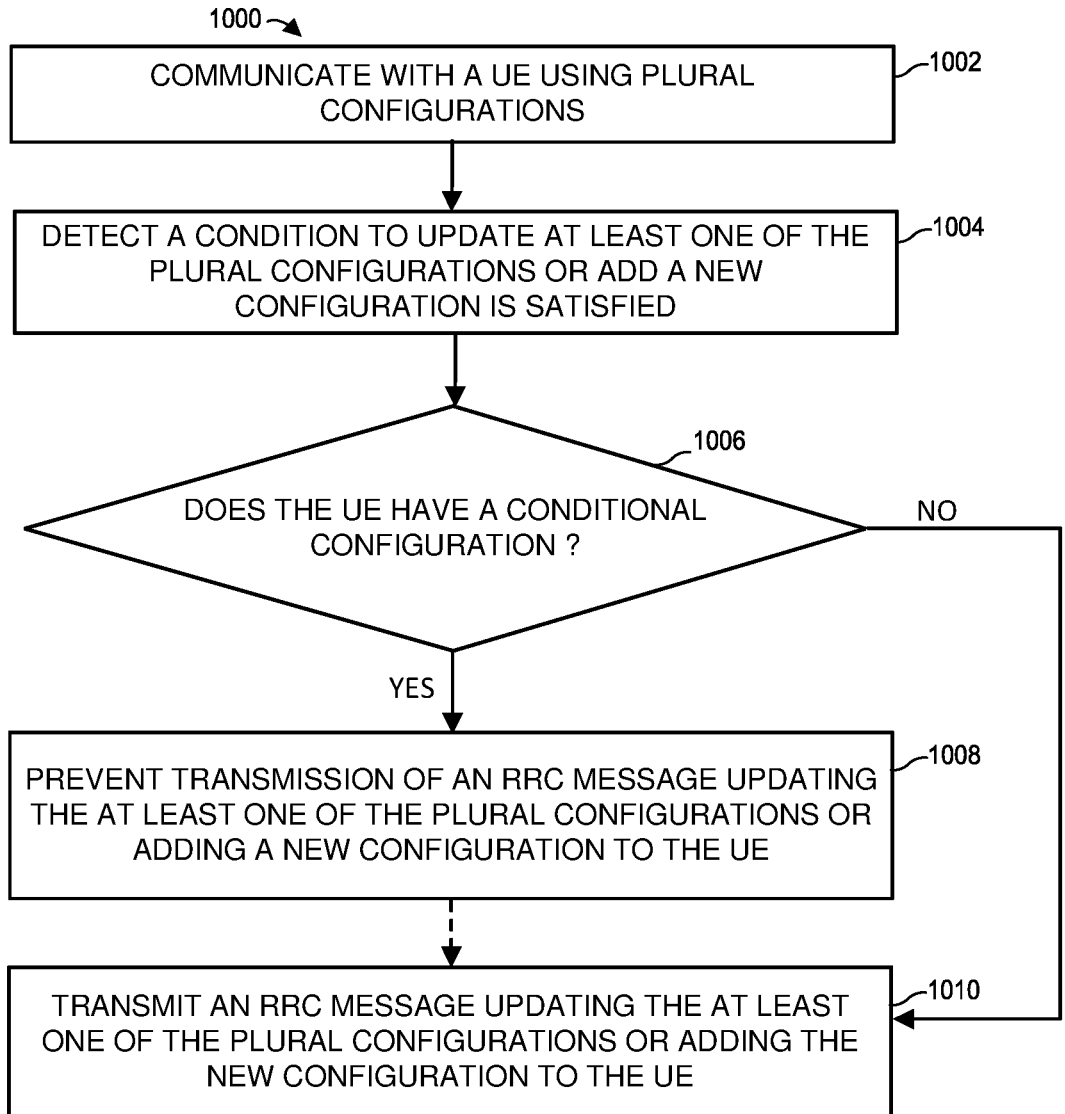

1000

1002   COMMUNICATE WITH A UE USING PLURAL CONFIGURATIONS

1004   DETECT A CONDITION TO UPDATE AT LEAST ONE OF THE PLURAL CONFIGURATIONS OR ADD A NEW CONFIGURATION IS SATISFIED

1006   DOES THE UE HAVE A CONDITIONAL CONFIGURATION ?

NO

YES

1008   PREVENT TRANSMISSION OF AN RRC MESSAGE UPDATING THE AT LEAST ONE OF THE PLURAL CONFIGURATIONS OR ADDING A NEW CONFIGURATION TO THE UE

1010   TRANSMIT AN RRC MESSAGE UPDATING THE AT LEAST ONE OF THE PLURAL CONFIGURATIONS OR ADDING THE NEW CONFIGURATION TO THE UE

Figure 10

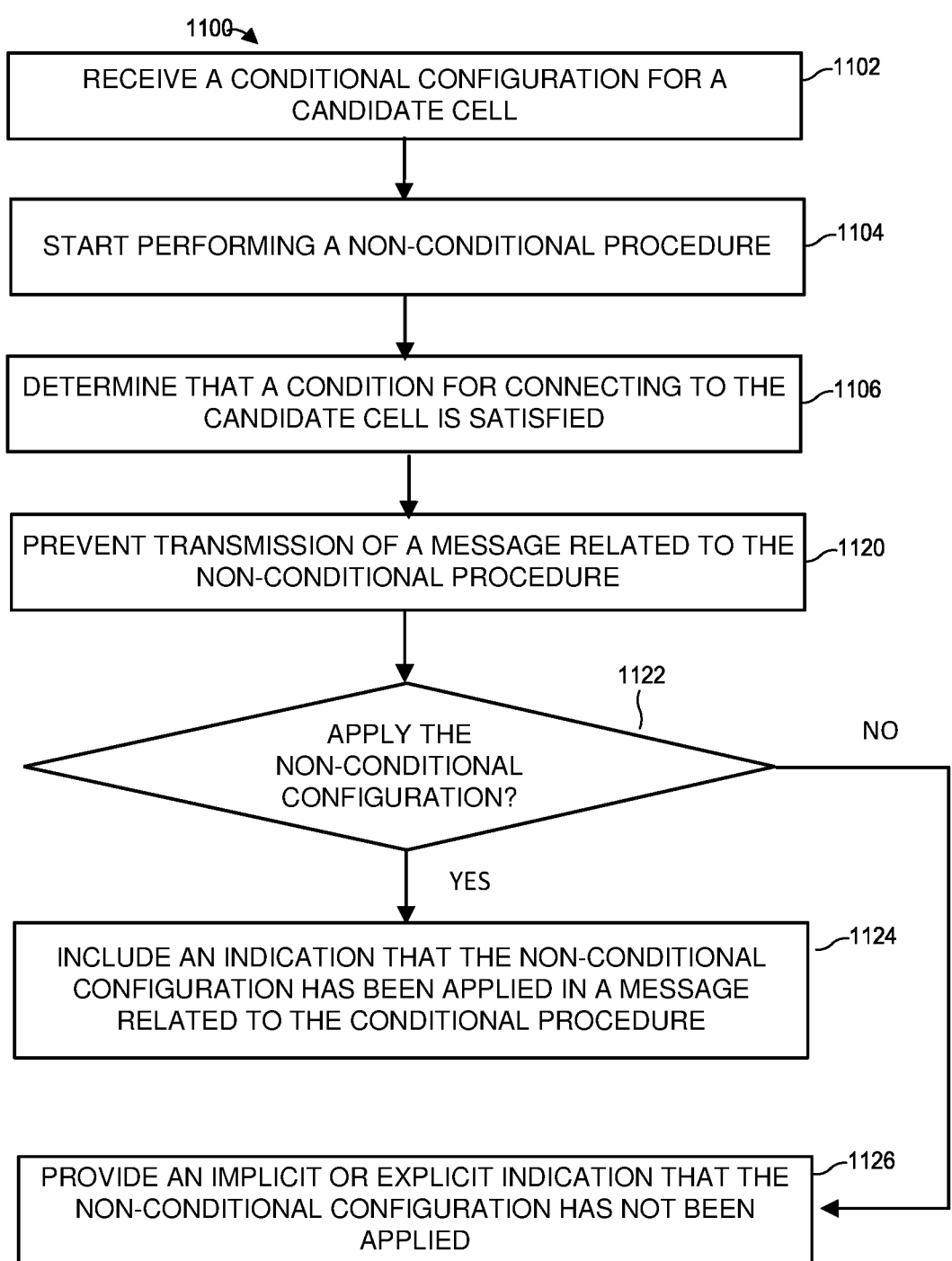

1100

RECEIVE A CONDITIONAL CONFIGURATION FOR A CANDIDATE CELL — 1102

START PERFORMING A NON-CONDITIONAL PROCEDURE — 1104

DETERMINE THAT A CONDITION FOR CONNECTING TO THE CANDIDATE CELL IS SATISFIED — 1106

PREVENT TRANSMISSION OF A MESSAGE RELATED TO THE NON-CONDITIONAL PROCEDURE — 1120

APPLY THE NON-CONDITIONAL CONFIGURATION? — 1122

NO

YES

INCLUDE AN INDICATION THAT THE NON-CONDITIONAL CONFIGURATION HAS BEEN APPLIED IN A MESSAGE RELATED TO THE CONDITIONAL PROCEDURE — 1124

PROVIDE AN IMPLICIT OR EXPLICIT INDICATION THAT THE NON-CONDITIONAL CONFIGURATION HAS NOT BEEN APPLIED — 1126

Figure 11

MANAGING A NON-CONDITIONAL PROCEDURE DURING A CONDITIONAL PROCEDURE

This disclosure relates generally to wireless communications and, more particularly, to managing an ongoing non-conditional procedure when a user equipment (UE) is performing a conditional procedure.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG or and the SCG can be referred to as split DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure.

3GPP technical specifications (TS) 36.300 and 38.300 describes procedures for handover (or called reconfiguration with sync) scenarios. These procedures involve messaging (e.g., RRC signaling and preparation) between RAN nodes that generally causes latency, which in turn increases the probability of handover procedures. These procedures do not involve conditions associated with the UE, and can be referred to as immediate or non-conditional handover procedures. 3GPP submissions R2-1914640 and R2-1914834 describe procedures for conditional handover scenarios.

3GPP specification TS 37.340 (v16.0.0) describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These procedures, which do not involve conditions that are checked at the UE, can be referred to as immediate or non-conditional SN addition and SN change procedures.

UEs can also perform handover procedures to switch from one cell to another, whether in single connectivity (SC) or DC operation. The UE may handover from a cell of a first base station to a cell of a second base station, or from a cell of a first distributed unit (DU) of a base station to a cell of a second DU of the same base station, depending on the scenario. 3GPP specifications 36.300 v16.0.0 and 38.300 v16.0.0 describe a handover procedure that includes several steps (RRC signaling and preparation) between RAN nodes, which causes latency in the handover procedure and therefore increases the risk of handover failure. This procedure, which does not involve conditions that are checked at the UE, can be referred to as an immediate or non-conditional handover procedure.

More recently, for both SN or PSCell addition/change and handover, "conditional" procedures have been considered (i.e., conditional SN or PSCell addition/change and conditional handover). Unlike the immediate or non-conditional procedures discussed above, these procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., a set of random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied.

A UE with a configuration for a conditional procedure in some case can initiate an immediate procedure, or receive a command from the RAN to initiate an immediate procedure, and also determine that the one or more conditions for performing the conditional procedure are satisfied. It is not clear how the UE should manage the two procedures, an immediate one and a conditional one, concurrently.

SUMMARY

A base station of this disclosure provides a UE with conditional configuration for a conditional procedure such as conditional handover, conditional PSCell addition or change, or conditional SN addition or change. While the UE is communicating with the RAN via one or more cells, the RAN or the UE determines that the UE should initiate a non-conditional procedure. For example, the RAN can transmit an RRC message to the UE in order to request a reconfiguration of certain radio resources, or to initiate a UE information procedure for example. As another example, the UE can initiate an uplink information transfer procedure, a measurement reporting procedure, a UE assistance information procedure, or an in-device coexistence indication procedure. In any case, before the UE completes the non-conditional procedure, the UE determines that the condition for initiating the conditional procedure is now satisfied. The UE then initiates the conditional procedure. For example, the UE can perform a random access procedure on the candidate cell to which the conditional procedure pertains. The UE then communicates with the RAN in accordance with the conditional configuration. The UE in some cases suspends, temporarily or permanently, completion of the non-conditional procedure in view of the conditional procedure.

As used in this disclosure, completion of a conditional or non-conditional procedure refers to transmitting a message to the RAN indicating that the procedure completed, e.g., that the UE successfully applied the corresponding configuration. Thus, in some cases, the UE can receive a configuration in connection with a non-conditional procedure, apply the configuration, but not complete the non-conditional procedure by failing to transmit a message to the RAN or not attempting to transmit the message.

In some cases, the UE then can report the reconfiguration of radio resources via the candidate cell. The report (e.g., an RRC Reconfiguration Complete message) can also reference the non-conditional procedure (e.g., via a transaction identifier) to prevent the RAN from re-trying to initiate the non-conditional procedure, when the non-conditional procedure is RAN-initiated.

One example embodiment of these techniques is a method in a UE for managing mobility configuration. The method can be executed by processing hardware and includes obtaining conditional configuration information including (i) a conditional configuration related to a candidate cell in the RAN, and (ii) a condition to be satisfied before the UE applies the configuration. The method further includes detecting that a non-conditional procedure related to the UE and the RAN has been initiated, when the UE is connected to the RAN via at least one cell; determining, subsequently to the detecting and when the non-conditional procedure has not been completed, that the condition is satisfied; and completing, by the processing hardware, at least one of the (i) the conditional procedure in accordance with the conditional configuration or (ii) the non-conditional procedure.

Another example embodiment of these techniques is a UE including processing hardware and configured to implement the method above.

Yet another example embodiment of these techniques is a method in a base station for managing mobility configuration of a UE. The method can be executed by processing hardware and includes communicating with the UE in accordance with one or more configurations pertaining to one or more cells of a RAN in which the base station operates. The method further includes determining an updated configuration should be applied to the one or more configurations at the UE and, in response to determining that the one or more configurations include a conditional configuration which the UE applies only when a corresponding condition is satisfied, preventing the updated configuration from being transmitted to the UE.

Another example embodiment of these techniques is a base station including processing hardware and configured to implement the method above.

BRIEF DESCRIPTION OF THE DRAWINGS

FIG. 1A is a block diagram of an example system in which a radio access network (RAN) and a user FIG. 1A is a block diagram of an example system in which a radio access network (RAN) and a user device can implement the techniques for managing non-conditional (immediate) and conditional mobility configuration procedures that overlap in time;

FIG. 3E is a messaging diagram of an example scenario in which an SN provides a UE with CPAC configuration and subsequently initiates a non-conditional procedure, and the UE performs the non-conditional procedure concurrently with the conditional procedure;

FIG. 5C is a messaging diagram of an example scenario similar to the scenario of FIG. 3F, except that the conditional procedure is CHO;

FIG. 5D is a messaging diagram of an example scenario similar to the scenario of FIG. 3D, except that the conditional procedure is CHO;

FIG. 6A is a messaging diagram of an example scenario similar to the scenario of FIG. 5A, except that the conditional procedure is an intra-base station CHO;

FIG. 6B is a messaging diagram of an example scenario similar to the scenario of FIG. 5B, except that the conditional procedure is an intra-base station CHO;

FIG. 10 is a flow diagram of an example method for managing configuration updates at a UE in view of whether the UE is configured conditional configuration, which can be implemented in a base station of this disclosure;

FIG. 11 is a flow diagram of an example method for managing non-conditional configuration when the UE does not transmit a message related to the corresponding non-conditional procedure to the RAN, which can be implemented in the UE of this disclosure;

DETAILED DESCRIPTION OF THE DRAWINGS

As discussed in detail below, a UE and/or a base station manage a configuration related to a non-conditional procedure such as reconfiguration of radio resources or a UE information procedure as well a configuration related to a conditional procedure such as conditional handover (CHO), conditional PSCell addition or change (CPAC), or conditional SN addition or change (CSAC), when the execution of these procedures partially overlaps in time. In particular, the UE can receive a command to initiate a non-conditional procedure and, before completing the non-conditional procedure, determine that the condition for performing a conditional procedure is satisfied. The UE can implement the techniques discussed below to determine whether, and in what order, to complete one or both of the procedures. Further, when the base station obtains a new configuration for the UE, the base station in some cases determines that it should suspend transmission of the new configuration to the UE because the UE currently stores a conditional configuration for a conditional procedure.

Figure 1A:
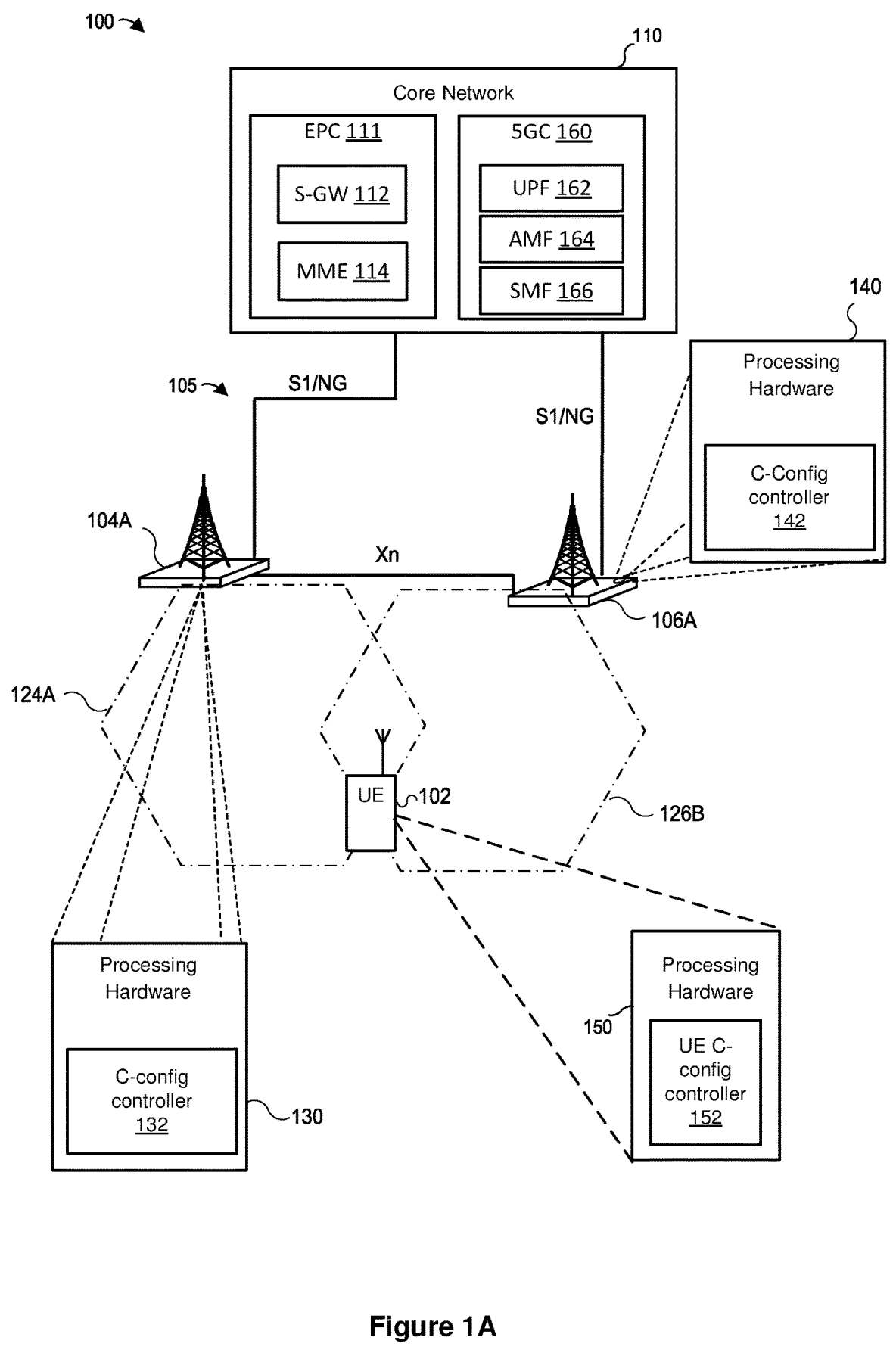

Referring first to FIG. 1A, an example wireless communication system 100 includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

Figure 1B:
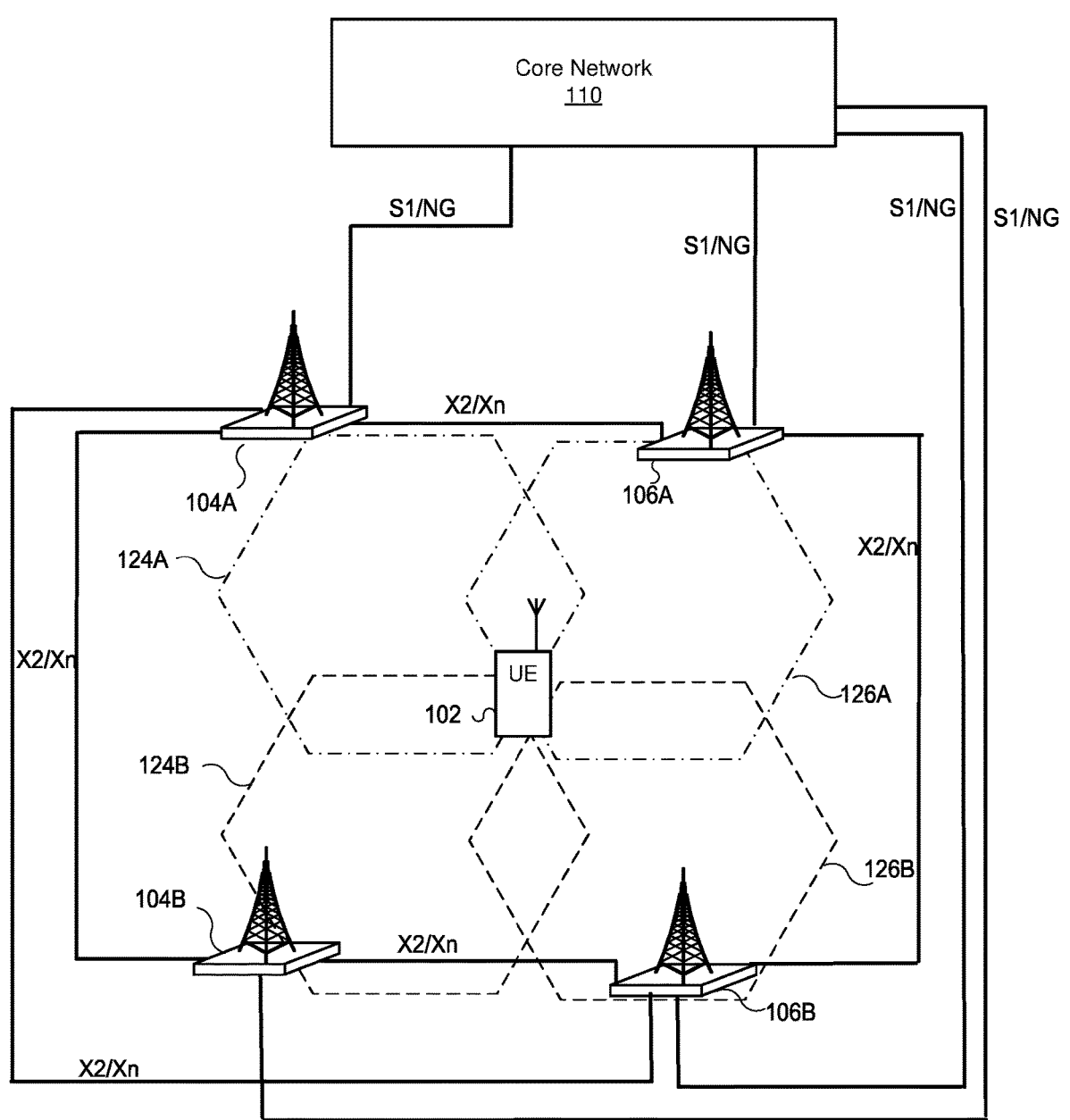
FIG. 1B is another block diagram of an example system in which a radio access network (RAN) and a user device can implement the techniques of this disclosure for managing concurrent immediate and conditional mobility configuration.

As illustrated in FIG. 1A, the base station 104A supports a cell 124A, and the base station 106A supports a cell 126A. The cells 124A and 126A can partially overlap, so that the UE 102 can communicate in DC with the base station 104A and the base station 106A operating as a master node (MN) and a secondary node (SN), respectively. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells. An example configuration in which the EPC 110 is connected to additional base stations is discussed below with reference to FIG. 1B.

The base station 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a conditional configuration controller 132 configured to manage conditional configuration for one or more conditional procedures such as CHO, CPAC, or CSAC, when the base station 104A operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes a conditional configuration controller 142 configured to manage conditional configurations for one or more conditional procedures such as CHO, CPAC, or CSAC, when the base station 106A operates as an SN.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE conditional configuration controller 152 configured to manage conditional configuration for one or conditional procedures.

More particularly, the conditional configuration controllers 132, 142, and 152 can implement at least some of the techniques discussed with reference to the messaging and flow diagrams below to receive conditional configuration, release the conditional configuration in response to certain events, apply the conditional configuration, etc. Although FIG. 1A illustrates the conditional configuration controllers 132 and 142 as separate components, in at least some of the scenarios the base stations 104A and 106A can have similar implementations and in different scenarios operate as MN or SN nodes. In these implementations, each of the base stations 104A and 106A can implement both the conditional configuration controller 132 and the conditional configuration controller 142 to support MN and SN functionality, respectively.

In operation, the UE 102 can use a radio bearer (e.g., a DRB or an SRB) that at different times terminates at the MN

104A or the SN 106A. The UE 102 can apply one or more security keys when communicating on the radio bearer, in the uplink (from the UE 102 to a BS) and/or downlink (from a base station to the UE 102) direction. The UE in some cases can use different RATs to communicate with the base stations 104A and 106A. Although the examples below may refer specifically to specific RAT types, 5G NR or EUTRA, in general the techniques of this disclosure also can apply to other suitable radio access and/or core network technologies.

FIG. 1B depicts an example wireless communication system 100 in which communication devices can implement these techniques. The wireless communication system 100 includes a UE 102, a base station 104A, a base station 104B, a base station 106A, a base station 106B and a core network (CN) 110. The UE 102 initially connects to the base station 104A. The BSs 104B and 106B may have similar processing hardware as the base station 106A. The UE 102 initially connects to the base station 104A.

In some scenarios, the base station 104A can perform immediate SN addition to configure the UE 102 to operate in dual connectivity (DC) with the base station 104A (via a PCell) and the base station 106A (via a PSCell other than cell 126A). The base stations 104A and 106A operate as an MN and an SN for the UE 102, respectively. The UE 102 in some cases can operate using the MR-DC connectivity mode, e.g., communicate with the base station 104A using 5G NR and communicate with the base station 106A using EUTRA, or communicate with the base station 104A using EUTRA and communicate with the base station 106A using 5G NR.

At some point, the MN 104A can perform an immediate SN change to change the SN of the UE 102 from the base station 106A (source SN, or "S-SN") to the base station 104B (target SN, or "T-SN") while the UE 102 is in DC with the MN 104A and the S-SN 106A. In another scenario, the SN 106A can perform an immediate PSCell change to change the PSCell of the UE 102 to the cell 126A. In one implementation, the SN 106A can transmit a configuration changing the PSCell to cell 126A to the UE 102 via a signaling radio bearer (SRB) (e.g., SRB3) for the immediate PSCell change. In another implementation, the SN 106A can transmit a configuration changing the PSCell to the cell 126A to the UE 102 via the MN 104A for the immediate PSCell change. The MN 104A may transmit the configuration immediately changing the PSCell to the cell 126A to the UE 102 via SRB1.

In other scenarios, the base station 104A can perform a conditional SN Addition procedure to first configure the base station 106B as a C-SN for the UE 102, i.e. conditional SN addition or change (CSAC). At this time, the UE 102 can be in single connectivity (SC) with the base station 104A or in DC with the base station 104A and the base station 106A. If the UE 102 is in DC with the base station 104A and the base station 106A, the MN 104A may determine to perform the conditional SN Addition procedure in response to a request received from the base station 106A or in response to one or more measurement results received from the UE 102 or obtained by the MN 104A from measurements on signals received from the UE 102. In contrast to the immediate SN Addition case discussed above, the UE 102 does not immediately attempt to connect to the C-SN 106B. In this scenario, the base station 104A again operates as an MN, but the base station 106B initially operates as a C-SN rather than an SN.

More particularly, when the UE 102 receives a configuration for the C-SN 106B, the UE 102 does not connect to the C-SN 106B until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-SN 106B, so that the C-SN 106B begins to operate as the SN 106B for the UE 102. Thus, while the base station 106B operates as a C-SN rather than an SN, the base station 106B is not yet connected to the UE 102, and accordingly is not yet servicing the UE 102. In some implementations, the UE 102 may disconnect from the SN 106A to connect to the C-SN 106B.

In yet other scenarios, the UE 102 is in DC with the MN 104A (via a PCell) and SN 106A (via a PSCell other than cell 126A and not shown in FIG. 1A). The SN 106A can perform conditional PSCell addition or change (CPAC) to configure a candidate PSCell (C-PSCell) 126A for the UE 102. If the UE 102 is configured a signaling radio bearer (SRB) (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104A or may be obtained by the SN 106A from measurements on signals received from the UE 102. In case of via the MN 104A, the MN 104A receives the configuration for the C-PSCell 126A. In contrast to the immediate PSCell change case discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some scenarios, the condition associated with CSAC or CPAC can be signal strength/quality, which the UE 102 detects on the C-PSCell 126A of the SN 106A or on a C-PSCell 126B of C-SN 106B, exceeding a certain threshold or otherwise corresponding to an acceptable measurement. For example, when the one or more measurement results the UE 102 obtains on the C-PSCell 126A are above a threshold configured by the MN 104A or the SN 106A or above a pre-determined or pre-configured threshold, the UE 102 determines that the condition is satisfied. When the UE 102 determines that the signal strength/quality on the C-PS-Cell 126A of the SN 106A is sufficiently good (again, measured relative to one or more quantitative thresholds or other quantitative metrics), the UE 102 can perform a random access procedure on the C-PSCell 126A with the SN 106A to connect to the SN 106A. Once the UE 102 successfully completes the random access procedure on the C-PSCell 126A, the C-PSCell 126A becomes a PSCell 126A for the UE 102. The SN 106A then can start communicating data (user-plane data or control-plane data) with the UE 102 through the PSCell 126A. In another example, when the one or more measurement results the UE 102 obtains on the C-PSCell 126B are above a threshold configured by the MN 104A or the C-SN 106B or above a pre-determined or pre-configured threshold, the UE 102 determines that the condition is satisfied. When the UE 102 determines that the signal strength/quality on the C-PSCell 126B of the C-SN 106B is sufficiently good (again, measured relative to one or more quantitative thresholds or other quantitative metrics), the UE 102 can perform a random access procedure on the C-PSCell 126B with the C-SN 106B to connect to the C-SN 106B. Once the UE 102 successfully completes the random access procedure on the C-PSCell 126B, the C-PSCell 126B becomes a PSCell 126B for the UE 102 and the C-SN 106B becomes a SN 106B. The SN 106B then can start communicating data (user-plane data or control-plane data) with the UE 102 through the PSCell 126B.

In various configurations of the wireless communication system 100, the base station 104A can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104A and the base station 106A or 106B (106A/B) via the same RAT such as EUTRA or NR, or different RATs. When the base station 104A is an MeNB and the base station 106A is an SgNB, the UE 102 can be in EUTRA-NR DC (EN-DC) with the MeNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MeNB and the base station 106A is a C-SgNB for the UE 102, the UE 102 can be in SC with the MeNB. In this scenario, the MeNB 104A may or may not configure the base station 106B as another C-SgNB to the UE 102.

In some cases, an MeNB, an SeNB or a C-SgNB is implemented as an ng-eNB rather than an eNB. When the base station 104A is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an Mng-NB and the base station 106A is a C-SgNB for the UE 102, the UE 102 can be in SC with the Mng-NB. In this scenario, the Mng-eNB 104A may or may not configure the base station 106B as another C-SgNB to the UE 102.

When the base station 104A is an MgNB and the base station 106A/B is an SgNB, the UE 102 may be in NR-NR DC (NR-DC) with the MgNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. In this scenario, the Sng-eNB 106A may configure cell 126A as a C-PSCell to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

The base stations 104A, 106A, and 106B can connect to the same core network (CN) 110 which can be an evolved packet core (EPC) 111 or a fifth-generation core (5GC) 160. The base station 104A can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104A, 106A, and 106B can support an X2 or Xn interface.

As illustrated in FIG. 1B, the base station 104A supports a cell 124A, the base station 104B supports a cell 124B, the base station 106A supports a cell 126A, and the base station 106B supports a cell 126B. The cells 124A and 126A can partially overlap, as can the cells 124A and 124B, so that the UE 102 can communicate in DC with the base station 104A (operating as an MN) and the base station 106A (operating as an SN) and, upon completing an SN change, with the base station 104A (operating as MN) and the SN 104B. More particularly, when the UE 102 is in DC with the base station 104A and the base station 106A, the base station 104A operates as an MeNB, a Mng-eNB or a MgNB, and the base station 106A operates as an SgNB or a Sng-eNB. The cells 124A and 126B can partially overlap. When the UE 102 is in SC with the base station 104A, the base station 104A operates as an MeNB, a Mng-eNB or a MgNB, and the base station 106B operates as a C-SgNB or a C-Sng-eNB. When the UE 102 is in DC with the base station 104A and the base station 106A, the base station 104A operates as an MeNB, a Mng-eNB or a MgNB, the base station 106A operates as an SgNB or a Sng-eNB, and the base station 106B operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

Figure 1C:
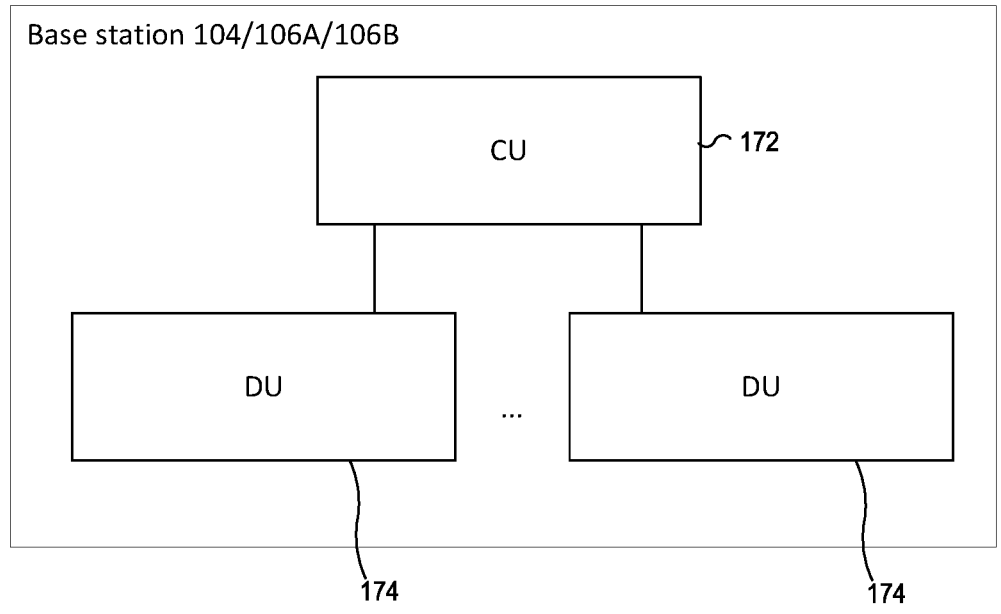
FIG. 1C is a block diagram of an example base station in which a centralized unit (CU) and a distributed unit (DU) that can operate in the system of FIG. 1A or FIG. 1B.

FIG. 1C depicts an example distributed implementation of a base station such as the base station 104A, 104B, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as a MN, an SN or a candidate SN (C-SN). The process hardware may include further a physical layer controller configured to manage or control one or more physical layer operations or procedures.

Figure 2:
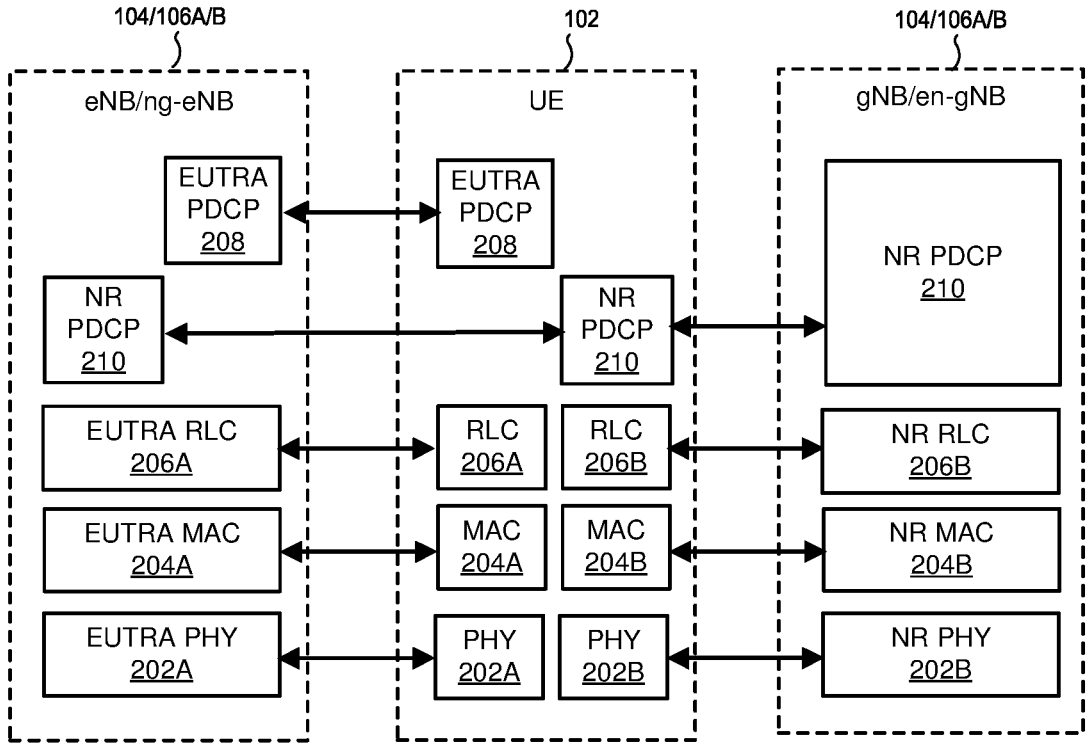
FIG. 2 is a block diagram of an example protocol stack according to which the UE of FIG. 1A communicates with base stations.

FIG. 2 illustrates, in a simplified manner, an example radio protocol stack 200 according to which the UE 102 may communicate with an eNB/ng-eNB or a gNB (e.g., one or more of the base stations 104A, 104B, 106A, 106B). In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP sublayer 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104A operating as an MeNB and the base station 106A operating as an SgNB, the wireless communication system 100 can provide the UE 102 with an MN-terminated bearer that uses the EUTRA PDCP sublayer 208, or an MN-terminated bearer that uses the NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can an SRB or a DRB.

Next, several example scenarios in which a UE and/or a base station manage respective configuration for a conditional procedure and a non-conditional procedure are discussed with reference to FIGS. 3A-6E.

Figure 3A:
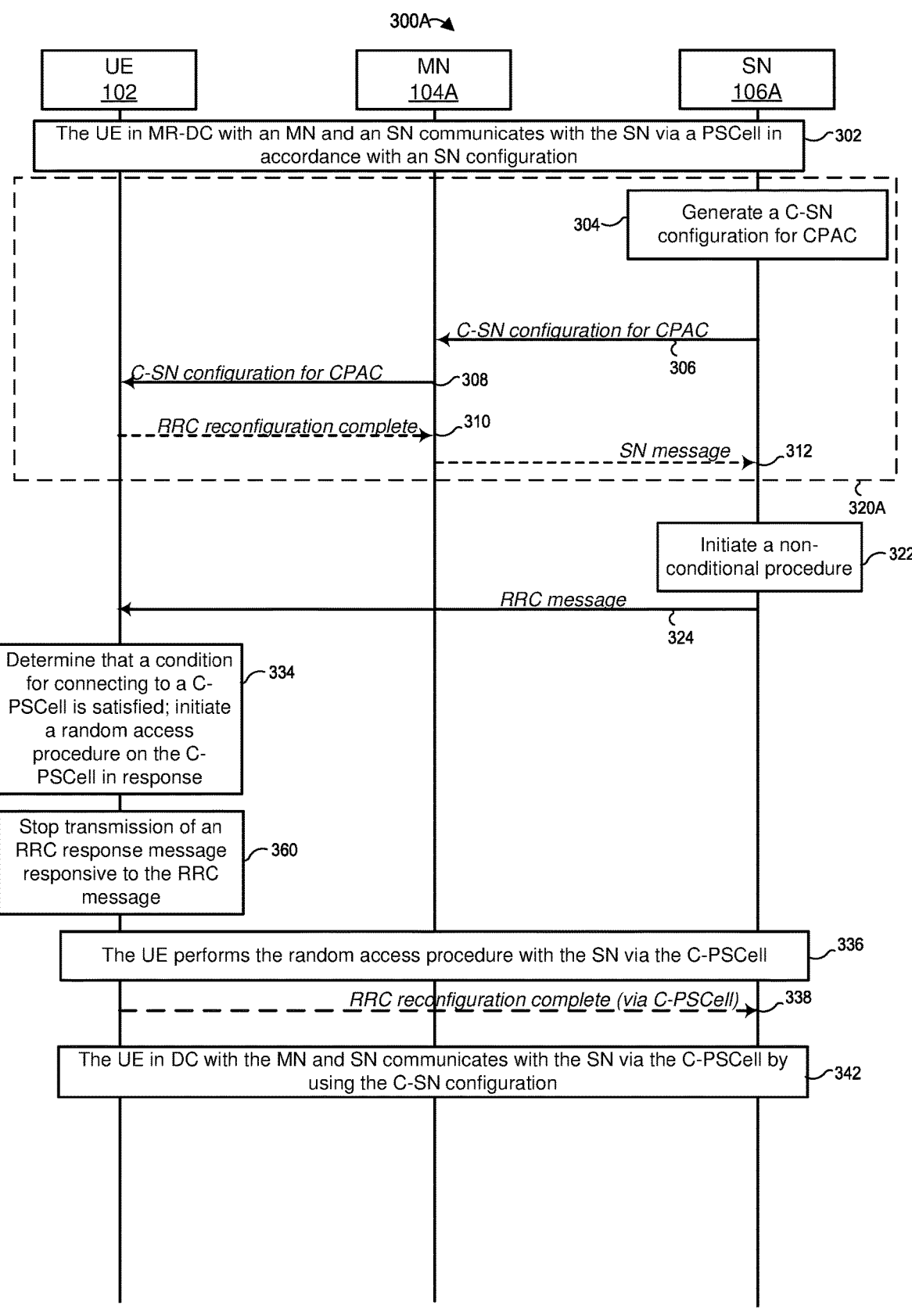
FIG. 3A is a messaging diagram of an example scenario in which an SN provides a UE with CPAC configuration and subsequently initiates a non-conditional procedure, and the UE suspends completion of the non-conditional procedure to complete the conditional procedure, when the condition for performing the conditional procedure is satisfied.

Referring first to FIG. 3A, the base station 104A in a scenario 300A operates as an MN, and the base station 106A operates as an SN. Initially, the UE 102 communicates 302 in DC with the MN 104A and the SN 106A. More particularly, the UE 102 can communicate 302 UL PDUs and/or DL PDUs with SN 106A via a certain primary secondary cell (PSCell) in accordance with a certain SN configuration. The SN 106A then determines 304 that it should generate a C-SN configuration for conditional PSCell addition or change (CPAC). The SN 106A can make this determination based on one or more measurement results received from the UE 102 via the MN 104A, from the UE directly (e.g., via an SRB established between the UE 102 and the SN 106A or via a physical control channel), or obtained by the SN 106A from measurements on signals, control channels or data channels received from the UE 102, for example, or another suitable event. The SN 106A in some cases can make this determination more accurate by estimating that the UE 102 is moving toward the coverage area of the cell 126A, according to uplink signals received from the UE 102 or positioning measurement result(s) received from the UE 102, for example. In response to this determination, the SN 106A generates 304 a C-SN configuration.

In the example scenario 300A, the MN 104A then transmits 306 the C-SN configuration to the MN 104A. The MN 104A in turn transmits 308 the C-SN configuration to the UE 102. In some implementations, the SN 106A at event 304 generates a conditional configuration including the C-SN configuration and generates an RRC reconfiguration message including the conditional configuration. The MN 104A at event 306 then transmits the RRC reconfiguration message to the MN 104A. The MN 104A in turn at event 308 transmits the RRC reconfiguration message including the conditional configuration to the UE 102. In other implementations, the MN 104A generates a conditional configuration including the C-SN configuration and generates an RRC reconfiguration message including the conditional configuration. The MN 104A at event 308 transmits the RRC reconfiguration message including the conditional configuration to the UE 102.

In some implementations, the UE 102 may transmit 310 an RRC reconfiguration complete message to the MN 104A in response to the RRC reconfiguration message described above. The MN 104A may transmit 312 a SN message (e.g., SN Reconfiguration Complete message or SN Modification Confirm message) to the SN 106A in response to the RRC reconfiguration complete message. The events 304-312 collectively can define a CPAC configuration procedure 320A.

To transmit the RRC reconfiguration message, the MN 104A in one implementation transmits an RRC container message including the RRC reconfiguration to the UE 102. In response, the UE 102 in one implementation transmits an RRC container response message to the MN 104A to transmit 310 the RRC reconfiguration complete message. The MN 104A may transmit 312 the SN message to the SN 106A in response to the RRC container response message. In turn, the MN 104A may include the RRC reconfiguration complete message in the 312 SN message. In another implementation, the UE 102 does not generate an RRC container response message to wrap the RRC reconfiguration complete message.

When the SN 106A is implemented as an ng-eNB, the RRC reconfiguration message generated by the SN 106A is an RRCConnectionReconfiguration message, and the RRC reconfiguration complete message in the event 310 is RRC-ConnectionReconfigurationComplete. When the SN 106A is implemented as a gNB, the RRC reconfiguration message generated by the SN 106A is an RRCReconfiguration message, and the RRC reconfiguration complete message in the event 310 is an RRCReconfigurationComplete message. When the MN 104A is implemented as an eNB or ng-eNB, the RRC container message is an RRCConnectionReconfiguration message, and the RRC container response message is RRCConnectionReconfigurationComplete. When the MN 104A is implemented as a gNB, the RRC container message is an RRCReconfiguration message, and the RRC container response message is an RRCReconfigurationComplete message.

When the MN 104A is implemented as an eNB or ng-eNB, the RRC reconfiguration message generated by the MN 104A is an RRCConnectionReconfiguration message, and the RRC reconfiguration complete message is RRCConnectionReconfigurationComplete. When the MN 104A is implemented as a gNB, the RRC reconfiguration message generated by the MN 104A is an RRCReconfiguration message, and the RRC reconfiguration complete message is an RRCReconfigurationComplete message.

At a later time, the SN 106A initiates 322 a non-conditional procedure with the UE 102. In response to the initiation, the SN 106A transmits 324 an RRC message to the UE 102 on a first SRB (e.g., SRB3) or via the MN 104A to cause the UE 102 to perform the non-conditional procedure. In the meantime, the UE 102 determines 334 that a condition for connecting to a C-PSCell 126A is satisfied and initiates a random access procure on the C-PSCell 126A in response to the detection. The detecting 334 and the transmitting 324 may proceed in parallel. In case of via the MN 104A, the MN 104A at event 324 transmits an RRC container message including the RRC message to the UE 102.

In other scenarios, the detection 334 and the reception 324 proceed sequentially but within a short time period within which the UE 102 cannot complete the entire non-conditional procedure or the entire conditional procedure. In response to the detecting 334, the UE 102 stops or suspends 360 a transmission of an RRC response message responsive to the RRC message. The UE 102 then performs 336 the random access procedure with the SN 106A via the candidate cell C-PSCell 126A, e.g., in accordance with one or more random access configurations in the C-SN configuration. The UE 102 may transmit 338 an RRC reconfiguration complete message via the C-PSCell 126A during or after the random access configuration to connect to the C-PSCell 126A. Alternatively, the UE 102 may transmit 338 the RRC reconfiguration complete message to the SN 106A via the MN 104A. The RRC reconfiguration complete message 338 can be similar to, or the same as, the RRC reconfiguration complete message 310. The UE 102 sets a transaction identifier in the RRC reconfiguration complete message 310 to the same value as a transaction identifier in the RRC reconfiguration message 308. The UE 102 also sets a transaction identifier in the RRC reconfiguration complete message 338 to the same value as a transaction identifier in the RRC reconfiguration message 308. The SN 106A can determine that the UE 102 received the C-SN configuration in response to the RRC reconfiguration complete message 310. The SN 106A can determine the UE 102 is performing CPAC or is connecting to the C-PSCell 126A in response to the RRC reconfiguration complete message 338 received from the MN 104A.

In one implementation, the SN 106A stops (or refrains from) reusing the same transaction identifier value in another RRC reconfiguration message until receiving the RRC reconfiguration complete message 338. For example, if the RRC message 324 is an RRC reconfiguration message, the SN 106A assigns a transaction identifier in the RRC message 324 to a different value than the transaction identifier in the RRC reconfiguration message 308. Thus, the SN 106A can determine that the RRC reconfiguration complete message 338 corresponds to the RRC reconfiguration message 308 based on the transaction identifier. After the SN 106A receives the RRC reconfiguration complete message 338, the SN 104A can assign the transaction identifier value included in the RRC reconfiguration message 308 to an RRC reconfiguration message to be transmitted to the UE 102. In another implementation, the SN 106A sets a value of a transaction identifier in each of RRC message(s) to be transmitted to the UE 102 via the first SRB or via the MN 104A irrespective of the RRC reconfiguration message 308. In these implementations, the UE 102 may include an indication in the RRC reconfiguration complete message 338 to indicate that the UE 102 performs the CPAC on the C-PSCell 126A or indicate that the RRC reconfiguration complete message 338 is transmitted because the UE 102 connected to the C-PSCell 126A and/or applied the C-SN configuration. Thus, the SN 106A can determine that the RRC reconfiguration complete message 338 corresponds to the RRC reconfiguration message 308 based on the indication. In some implementations, the indication can include at least one of an identification of the C-PSCell 126A or the configuration ID.

The SN 106A can discard or ignore an RRC reconfiguration complete message from the UE 102 if the SN 106A cannot identify the RRC reconfiguration message to which the RRC reconfiguration complete message corresponds (i.e., to which RRC reconfiguration message the RRC reconfiguration complete message is responsive). In some implementations, the SN 106A determines that the connection with the UE failed, and in response releases the connection, when the SN 106A cannot identify an RRC reconfiguration message from the UE 102 to which the RRC reconfiguration complete message corresponds.

In case of transmitting the RRC reconfiguration complete message 338 via the MN 104A, the UE 102 can transmit an RRC container response message including the RRC reconfiguration complete message 338 to the MN 104A, and the MN 104A in turn sends an SN message (e.g., an a SN message such as SN Reconfiguration Complete message, SN Modification Confirm message or RRC Transfer message, or an SN message specifically defined for transmitting this type of information) including the RRC reconfiguration complete message to the SN 106A. The RRC container response message including the RRC reconfiguration complete message 338 can be similar to, or the same as, the RRC container response message including the RRC reconfiguration complete message 310. The UE 102 sets a transaction identifier in the RRC container response message including the RRC reconfiguration complete message 310 to the same value as the transaction identifier in the RRC container message including the RRC reconfiguration message 308. The UE 102 can set a transaction identifier in the RRC container response message including the RRC reconfiguration complete message 338 to the same value as the transaction identifier in the RRC container message including the RRC reconfiguration message 308. When the MN 104A receives the RRC container response message at event 338 including the same transaction identifier value as the RRC container message, the MN 104A determines the UE 102 is performing CPAC or is connecting to the C-PSCell 126A. The MN 104A can also identify the RRC container response message (event 338) corresponds to the RRC container message (event 308) based on the transaction identifier. In one implementation, the MN 104A stops (or refrains from) reusing the same transaction identifier value in an RRC message (e.g., a RRCConnectionReconfiguration message or a RRCReconfiguration message) which has the same message type as the RRC container message before receiving the RRC container response message (e.g., a RRCConnectionReconfigurationComplete message or a RRCReconfigurationComplete message) including the RRC reconfiguration complete message 338. If the MN 104A needs to transmit to the UE 102 an RRC message that has the same message type as the RRC container message before receiving the RRC container response message including the RRC reconfiguration complete message 338, the MN 104A assigns a transaction identifier in the RRC message to a different value than the transaction identifier in the RRC container message. After the MN 104A receives the RRC container response message including the RRC reconfiguration complete message 338, the MN 104A can assign the transaction identifier value that was included in the RRC container message to an RRC message (which has the same message type as the RRC container message) to be transmitted to the UE 102. In another implementation, the MN 104A sets a value of the transaction identifier in each of RRC message(s) to be transmitted to the UE 102 irrespective of the RRC container message including the RRC reconfiguration message 308. In these implementations, the UE 102 can include an indication in the RRC container response message to indicate that the UE 102 performs the CPAC to the C-PSCell 126A or indicate that the RRC reconfiguration complete message 338 is transmitted because the UE 102 connected to the C-PSCell 126A or applied the C-SN configuration. Based on the indication, the MN 104A determines the RRC container response message including the RRC reconfiguration complete message 338 corresponds to the RRC container message including the C-SN configuration at event 308. The MN 104A can also identify the RRC container response message (event 338) corresponds to the RRC container message (event 308) based on the indication, irrespective of whether the transaction identifiers in the RRC container response (event 338) message and the RRC container message (event 308) are the same or different.

The MN 104A can discard or ignore an RRC response message from the UE 102 if the MN 104A cannot identify the RRC message to which the RRC response message corresponds. In some implementations, the MN 104A determines that the connection with the UE has failed and releases the connection, if the MN 104A cannot identify an RRC message from the UE 102 to which the RRC response message responds.

In other implementations, the UE 102 at event 338 transmits an ULInformationTransferMRDC message including the RRC reconfiguration complete message to the MN 104A and in turn, the MN 104A sends a SN message (e.g., RRC Transfer message) including the RRC reconfiguration complete message to the SN 106A. In this case, the UE 102 may not include a transaction identifier in the ULInformationTransferMRDC message. The UE 102 can include a transaction identifier in the RRC reconfiguration complete message 338 as described above. The UE 102 may also include an indication in the ULInformationTransfer-MRDC message to indicate the UE 102 performs the CPAC on the C-PSCell 126A or indicate that the RRC reconfiguration complete message 338 is transmitted because the UE 102 is performing the CPAC on the C-PSCell 126A or is applying the C-SN configuration.

If the UE 102 successfully completes the random access procedure, the UE 102 communicates 342 with the SN 106A via the C-PSCell 126A using one or more configurations in the C-SN configuration. If the SN 106A identifies the UE 102 in the random access procedure, the SN 106A communicates with the UE 102 via the C-PSCell 126A. The UE 102 may disconnect from the PSCell to perform the random access procedure, i.e., to connect the C-PSCell 126A. The events 334, 336 and 338 collectively can define a CPAC procedure (or simply a conditional procedure) in the following description.

In various implementations, the UE 102 accounts for the information and/or instructions regarding one or more actions the UE 102 should take, which the UE 102 can receive 324 in the RRC message, or does not account for this information and/or instructions. Some of these possibilities are illustrated below in the flow diagram of FIG. 11.

In some implementations, the UE 102 discards the configuration received 324 in the RRC message and/or otherwise does not perform the one or more actions specified in the RRC message. In another implementation, the UE 102 applies the configuration received 324 in the RRC message and/or performs the one or more actions specified in the message. In other words, the UE 102 can partially perform the non-conditional procedure with which the RRC message of event 324 is associated, even if the UE 102 does not complete the non-conditional procedure by responding to the RRC message (as discussed in detail below).

According to one approach, the UE 102 indicates to the SN that the UE 102 has applied the immediate configuration received 324 in the RRC message. The UE 102 may include this indication in the RRC reconfiguration complete message of event 338, for example. Based on the indication, the SN 106A can determine that the UE 102 has received the RRC message 324 and/or applied the configuration(s) the SN 106A had transmitted 324 in the RRC message. The SN 106A thus does not expend resources unnecessarily by retransmitting the RRC message.

As a more specific example, if the information in the RRC message of event 324 includes a configuration for communication with the SN 106A, the UE 102 and the SN 106A can communicate with each other using this configuration. In another example, if the information in the RRC message includes a measurement configuration, the UE 102 can transmit a measurement report associated to the measurement configuration to the SN 106A at event 342. If the information includes another C-SN configuration (e.g., a second C-SN configuration) or another conditional configuration including the second C-SN configuration, the UE 102 can store the second C-SN configuration or the second conditional configuration. In some implementations, the UE 102 may include an indication field or information element (IE) in the RRC reconfiguration complete message 338, which indicates the UE 102 successfully received the RRC message 324 and/or applied the information. The field/IE can include a transaction identifier also included in the RRC message of event 324. If there is more than one ongoing non-conditional procedure initiated by the SN 106A, the UE 102 can include a transaction identifier in an RRC message of each ongoing non-conditional procedure initiated by the SN 106A. In response to the indication field/IE, the SN

106A may apply (or use) the configuration(s) to communicate with the UE 102 when or after the SN 106 detects the UE 102 in the random access procedure 336.

If the UE 102 does not properly receive the RRC message at event 324, the UE 102 can indicate in the RRC reconfiguration complete message 338 that the UE 102 did not receive the RRC message 324 or did not apply the corresponding configuration, so that the SN 106A can determine that the UE 102 did not receive the RRC message or apply the configuration(s) in the RRC message. In response to the determination, the SN 106A does not apply (or use) the configuration(s) to communicate with the UE 102 when or after the SN 106A detects the UE 102 in the random access procedure 336. For example, the UE 102 may not include an indication field/IE in the RRC reconfiguration complete message 338, which indicates the UE 102 did not receive the RRC message 324 or apply the configuration(s).

The UE 102 alternatively can use another mechanism for indicating to the SN 106A that the UE 102 applied the information or took the required action in accordance with the RRC message of event 324. According to this approach, the SN 106A determines that the RRC message of 324 has reached the UE 102 based on acknowledgement protocols of other layers or sublayers.

For example, the UE 102 can transmit an acknowledgement (e.g., an RLC STATUS PDU or an HARQ acknowledgement) to the SN 106A via e.g., the PSCell or a SCell in the SN configuration to indicate that the UE 102 received the RRC message. If the SN 106A receives the acknowledgement, the SN 106A determines the UE 102 received the RRC message. In response to the acknowledgement, the SN 106A can apply (or use) the configuration(s) to communicate with the UE 102 when or after the SN 106 identifies the UE 102 in the random access procedure 336. If the SN 106A does not receive the acknowledgement, the SN 106A determines the UE 102 did not receive the RRC message. In response to the determination, the SN 106A does not apply (or use) the configuration(s) to communicate with the UE 102 when or after the SN 106A detects the UE 102 in the random access procedure 336.

According to another approach, the UE 102 does not apply the configuration included in the RRC message of event 324 or execute the action specified in the message, in view of the detecting 334. More specifically, the UE 102 can abort the non-conditional procedure by discarding or ignoring the RRC message received at event 324. Thus, the UE 102 does not apply the configuration in the RRC message or take any other action in response to this message.

In some implementations, the non-conditional procedure can be an RRC reconfiguration procedure and the RRC message at event 324 is an RRCReconfiguration message with one or more configuration parameters. The RRC response message can be an RRCReconfigurationComplete message responsive to the RRCReconfiguration message. More specifically, the RRCReconfiguration message does not configure the UE 102 to perform immediate PSCell change or include a reconfigurationWithSync field. If the UE 102 receives an RRCReconfiguration message configuring immediate PSCell change or including a reconfiguration-WithSync field, the UE 102 can abort the random access procedure or the conditional procedure. The RRCReconfiguration message does not configure the UE 102 to release the C-SN configuration or the conditional configuration including the C-SN configuration. If the RRCReconfiguration message configures the UE 102 to release the C-SN configuration or the conditional configuration including the C-SN configuration, the UE 102 aborts the random access configuration or the conditional procedure.

In other implementations, the non-conditional procedure can be a UE information procedure and the RRC message at event 324 is an UEInformationRequest message which may command the UE 102 to provide information stored in the UE 102. The RRC response message can be an UEInformationResponse message responding to the UEInformationRequest message.

If the UE 102 receives an RRC message releasing the C-SN configuration or the conditional configuration from the SN 106A, the UE 102 aborts the random access configuration or the conditional procedure. For example, the RRC message can be a RRCReconfiguration message which configures the UE 102 to release the C-SN configuration or the conditional configuration including the C-SN configuration.

In some implementations, the random access procedure can be a four-step random access procedure or a two-step random access procedure. In other implementations, the random access procedure can be a contention-based random access procedure or a contention-free random access procedure. In some implementations, the UE 102 may include RRC reconfiguration complete message in "message 3" of the four-step random access procedure or in a message A of the two-step random access procedure.

In some implementations, the SN 106A includes a trigger condition configuration specifying the condition that the UE 102 detects at event 334, in the conditional configuration generated by the SN 106A. The SN 106A may include a configuration ID identifying the conditional configuration or the C-SN configuration in the conditional configuration. In other implementations, the SN 106A can transmit the trigger condition configuration at event 306 and, in turn, the MN 104A can include the trigger condition configuration in the conditional configuration generated by the MN 104A. To simplify the description below, the term "CPAC configuration" is used to refer to the C-SN configuration as well as the trigger condition configuration, conditional configuration, or the RRC reconfiguration message generated by the SN 106A described above.

With continued reference to FIG. 3A, the C-SN configuration in some implementations can be a complete and self-contained configuration (i.e. a full configuration). The C-SN configuration may include a full configuration indication (an information element (IE) or a field) that identifies the C-SN configuration as a full configuration. The UE 102 in this case can directly use the C-SN configuration to communicate with the SN 106A without relying on an SN configuration. On the other hand, the C-SN configuration in other cases can include a "delta" configuration, or one or more configurations that augment a previously received SN configuration. The UE 102 in this case can use the delta C-SN configuration together with the SN configuration to communicate with the SN 106A.

The C-SN configuration can include multiple configuration parameters for the UE 102 to apply when communicating with the SN 106A via a C-PSCell 126A. The multiple configuration parameters may configure the C-PSCell 126A and zero, one, or more candidate secondary cells (C-SCells) of the SN 106A to the UE 102. The multiple configuration parameters may configure radio resources for the UE 102 to communicate with the SN 106A via the C-PSCell 126A and zero, one, or more C-SCells of the SN 106A. The multiple configuration parameters may configure zero, one, or more radio bearers. The one or more radio bearers can include one or more SRBs (e.g., SRB1 and/or SRB2) and/or one or more DRBs.

The SN configuration can include multiple configuration parameters for the UE 102 to communicate with the SN 106A via the PSCell and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers. The one or more radio bearers can include an SRB and/or one or more DRBs.

In some implementations, the SN 106A can include the CPAC configuration in a SN Modification Acknowledge message responding to a SN Modification Request message received from the MN 104A and transmit the SN Modification Request Acknowledge message to the MN 104A during the event 306. In other implementations, the SN 106A can the CPAC configuration in an SN Modification Required message and transmit the SN Modification Required message to the MN 104A during the event 306. The SN 106A may indicate that the SN Modification Request Acknowledge message or the SN Modification Required message is for CPAC, so that the MN 104A can determine that the SN Modification Request Acknowledge message or the SN Modification Required message includes the CPAC configuration. In other implementations, the SN 106A does not indicate CPAC in the SN Modification Request Acknowledge message or the SN Modification Required message, so that the CPAC configuration from the SN 106A is transparent to the MN 104A (in other words, so that the MN 104A simply tunnels the CPAC configuration through to the UE 102, without processing the CPAC configuration).

In some implementations, the C-SN configuration can include a group configuration (CellGroupConfig) IE that configures the C-PSCell 126A and zero, one, or more C-SCells of the SN 106A. In one implementation, the C-SN configuration may include a radio bearer configuration. In another implementation, the C-SN configuration may not include a radio bearer configuration. For example, the radio bearer configuration can be a RadioBearerConfig IE, DRB-ToAddModList IE or SRB-ToAddModList IE, DRB-ToAddMod IE or SRB-ToAddMod IE. In various implementations, the C-SN configuration can be an RRCReconfiguration message, RRCReconfiguration-IEs, or the CellGroupConfig IE conforming to 3GPP TS 38.331. The full configuration indication may be a field or an IE conforming to 3GPP TS 38.331. In other implementations, the C-SN configuration can include an SCG-ConfigPartSCG-r12 IE that configures the C-PSCell 126A and zero, one, or more C-SCells of the SN 106A. In some implementations, the C-SN configuration is an RRCConnectionReconfiguration message, RRCConnectionReconfiguration-IEs, or the ConfigPartSCG-r12 IE conforming to 3GPP TS 36.331. The full configuration indication may be a field or an IE conforming to 3GPP TS 36.331.

In some implementations, the SN configuration can include a CellGroupConfig IE that configures the PSCell and may configure zero, one, or more SCells of the SN 106A. In one implementation, the SN configuration can be a RRCReconfiguration message, RRCReconfiguration-IEs or the CellGroupConfig IE conforming to 3GPP TS 38.331. In other implementations, the SN configuration can include a SCG-ConfigPartSCG-r12 IE that configures the PSCell and may configure zero, one, or more SCells of the SN 106A. In one implementation, the SN configuration can be a RRC-ConnectionReconfiguration message, RRCConnectionReconfiguration-IEs or the ConfigPartSCG-r12 IE conforming to 3GPP TS 36.331.

In some cases, the UE 102 may receive one or more conditions (discussed in this disclosure in singular for convenience) in the trigger condition configuration during the event 308. The UE 102 may use the one or more conditions to determine whether to connect to the C-PSCell 126A. The UE 102 determines 334 that the condition is satisfied, the UE 102 connects to the C-PSCell 126A. That is, the condition (or "triggering condition") triggers the UE 102 to connect to the C-PSCell 126A or to execute the C-SN configuration. However, if the UE 102 does not determine that the condition is satisfied, the UE 102 does not connect to the C-PSCell 126A.

Still referring to FIG. 3A, the SN 106A in some cases can include the CU 172 and one or more DU 174 as illustrated in FIG. 1C. The UE communicates 302 with the SN via a first DU 174 operating the PSCell. A second DU 174 operating the C-PSCell 126A may generate the C-SN configuration or part of the C-SN configuration and transmit the C-SN configuration or part of the C-SN configuration to the CU 172. In case the second DU 174 generates a portion of the C-SN configuration, the CU 172 may generate rest of the C-SN configuration. The UE 102 performs 336 the random access procedure with the second DU 172 and the second DU 174 may identify the UE 102 in the random access procedure. The second DU 174 may send a Downlink Data Delivery Status message to the CU 172 in response to the identification. The second DU 174 may receive 338 the RRC reconfiguration complete message from the UE 102 during or after the random access procedure. In turn, the second DU 172 may include the RRC reconfiguration complete in a F1 application protocol (F1AP) message (e.g., UL RRC Message Transfer message) and transmit the F1AP message to the CU 172. The CU 172 communicates 342 with the UE 102 via the second DU 174 in response to the F1AP message, the RRC reconfiguration complete message 338 or the Downlink Data Delivery Status message. The CU 172 may transmit a UE Context Release Command message to the first DU 174 to command the first DU 174 to release a UE context of the UE 102. In response to the UE Context Release Command message, first DU 174 releases the UE context of the UE 102 and transmits a UE Context Release Complete message.

Figure 3B:
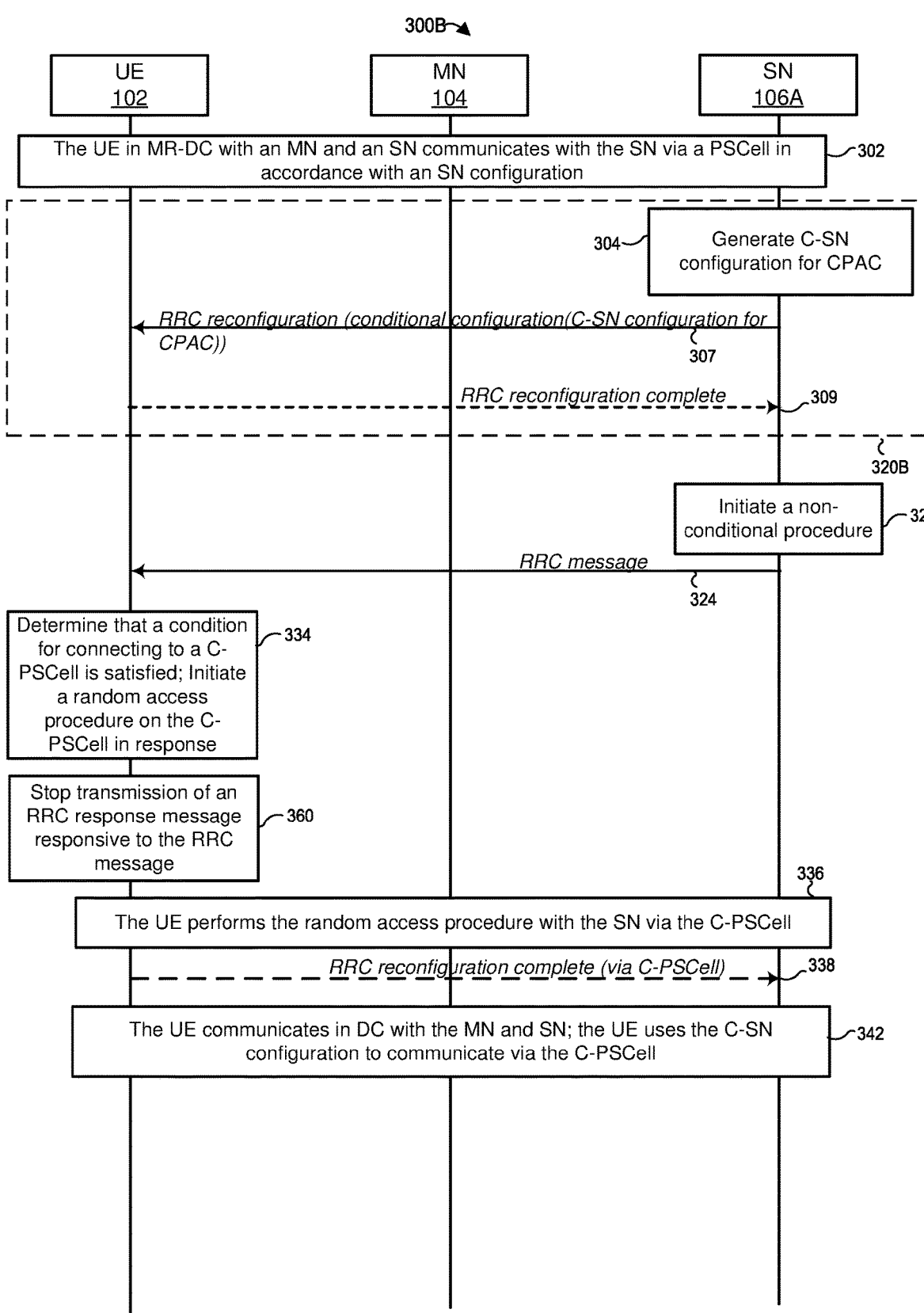
FIG. 3B is a messaging diagram of an example scenario that is similar to the scenario of FIG. 3A, except that the SN provides the UE with CPAC configuration directly rather than via the MN.

Now referring to FIG. 3B, a scenario 300B involves a CPAC without SN change, i.e., a conditional change of a PSCell of an SN when the UE is already in DC with the MN and SN. In this scenario, the base station 104A operates as a MN and the base station 106A operates as a SN. Events in this scenario similar to those discussed above are labeled with same references numbers. The differences between the scenarios of FIG. 3A and FIG. 3B are discussed below.

The CPAC configuration procedure 320B is generally similar to the CPAC configuration procedure 320A of FIG. 3A. However, in the scenario 300B the SN 106A directly transmits 307 the RRC reconfiguration message including the conditional configuration to the UE 102, rather that transmitting the RRC reconfiguration message to the UE 102 via the MN 104A, as the SN 106A does in the scenario 300A of FIG. 3A. In some implementations, the SN 106A configures a first SRB for the UE 102 via the MN 104A and transmits the RRC reconfiguration message via the first SRB to the UE 102. For example, the SN 106A transmits an SRB configuration configuring the first SRB (e.g., SRB3) to the MN 104A, and the MN 104A transmits the SRB configuration to the UE via a second SRB (e.g., SRB1) between the MN 104A and the UE 102. In some implementations, the UE 102 can transmit 309 an RRC reconfiguration complete message via the first SRB to the SN 106A in response to the RRC reconfiguration message, rather than transmitting 310 the RRC reconfiguration complete message to the MN 104A as in the scenario 300A.

When the SN 106A is implemented as an ng-eNB, the RRC reconfiguration message in the event 307 is a RRC-ConnectionReconfiguration message, and the RRC reconfiguration complete message in the event 309 is a RRCConnectionReconfigurationComplete message. When the SN 106A is an gNB, the RRC reconfiguration message in the event 307 is a RRCReconfiguration message, and the RRC reconfiguration complete message in the event 309 is an RRCReconfigurationComplete message.

The RRC reconfiguration complete message 338 can be similar to, or the same as, the RRC reconfiguration complete message 309. The UE 102 sets a transaction identifier in the RRC reconfiguration complete message 309 to the same value as the transaction identifier in the RRC container message including the RRC reconfiguration message 307. The UE 102 also sets a transaction identifier in the RRC container response message including the RRC reconfiguration complete message 338 to the same value as the transaction identifier in the RRC reconfiguration message 307. The SN 106A can determine that the UE 102 received the C-SN configuration in response to the RRC reconfiguration complete message 309. In one implementation, the SN 106A stops (or refrains from) reusing the same transaction identifier value in another RRC reconfiguration message before receiving the RRC reconfiguration complete message 338 or before the random access procedure 336. For example, if the RRC message 324 is an RRC reconfiguration message, the SN 106A assigns a transaction identifier in the RRC message 324 to a different value from the transaction identifier in the RRC reconfiguration message 307. Thus, the SN 106A can identify the RRC reconfiguration complete message 338 responds to the RRC reconfiguration message 307 by the transaction identifier. After the SN 106A receives the RRC reconfiguration complete message 338, the SN 104A can assign the transaction identifier value which was included in the RRC reconfiguration message 307 to an RRC reconfiguration message to be transmitted to the UE 102. In another implementation, the SN 106A sets a value of the transaction identifier in an RRC message to be transmitted to the UE 102 via the SRB or via the MN 104A irrespective of the RRC reconfiguration message 307. In these implementations, the UE 102 may include an indication in the RRC reconfiguration complete message 338 to indicate that the RRC reconfiguration complete message 338 is transmitted because the UE 102 connected to the C-PSCell 126A or applied the C-SN configuration. Thus, the SN 106A can identify the RRC reconfiguration complete message 338 corresponds to the RRC reconfiguration message 307 based on the indication.

Figure 3C:
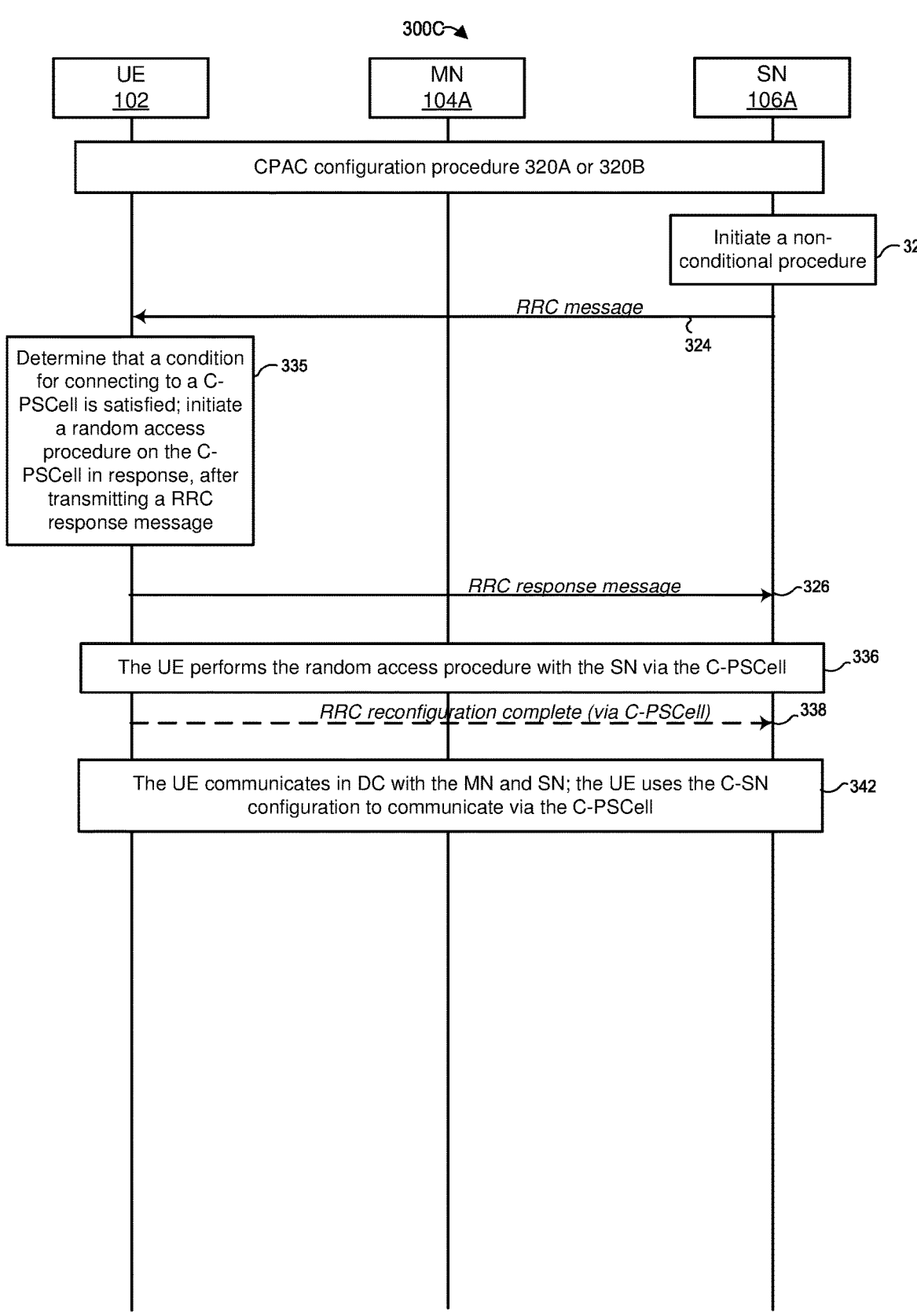
FIG. 3C is a messaging diagram of an example scenario in which an SN provides a UE with CPAC configuration and subsequently initiates a non-conditional procedure, and the UE performs the conditional procedure when the condition for performing the conditional procedure is satisfied and after completing the non-conditional procedure.

Now referring to FIG. 3C, a scenario 300C involves a CPAC without SN change, i.e., a conditional change of a PSCell of an SN when the UE is already in DC with the MN and SN. In this scenario, the base station 104A operates as a MN and the base station 106A operates as a SN. Events in this scenario similar to those discussed above are labeled with same references numbers. The differences between the scenarios of FIGS. 3A-3B and FIG. 3C are discussed below.

In the scenario 300C, the UE 102 initiates 335 a random access procedure on the C-PSCell 126A in response to the determination 335 that the condition for connecting to the C-PSCell 126A is satisfied. The UE 102 transmits 326 the RRC response message, e.g. via the PSCell or a SCell (i.e., not a candidate cell), in response to the RRC message 324 before the UE 102 performs 336 the random access procedure on the C-PSCell 126A with the SN 106A. In other words, the UE 102 delays the event 336 until the UE 102 completes the transmission of the RRC response message. In this implementation or scenario, the UE 102 accounts for the information in the RRC message of event 324, i.e., takes one or more actions in response to this message or apply the information (e.g., configuration) in the RRC message.

Figure 3D:
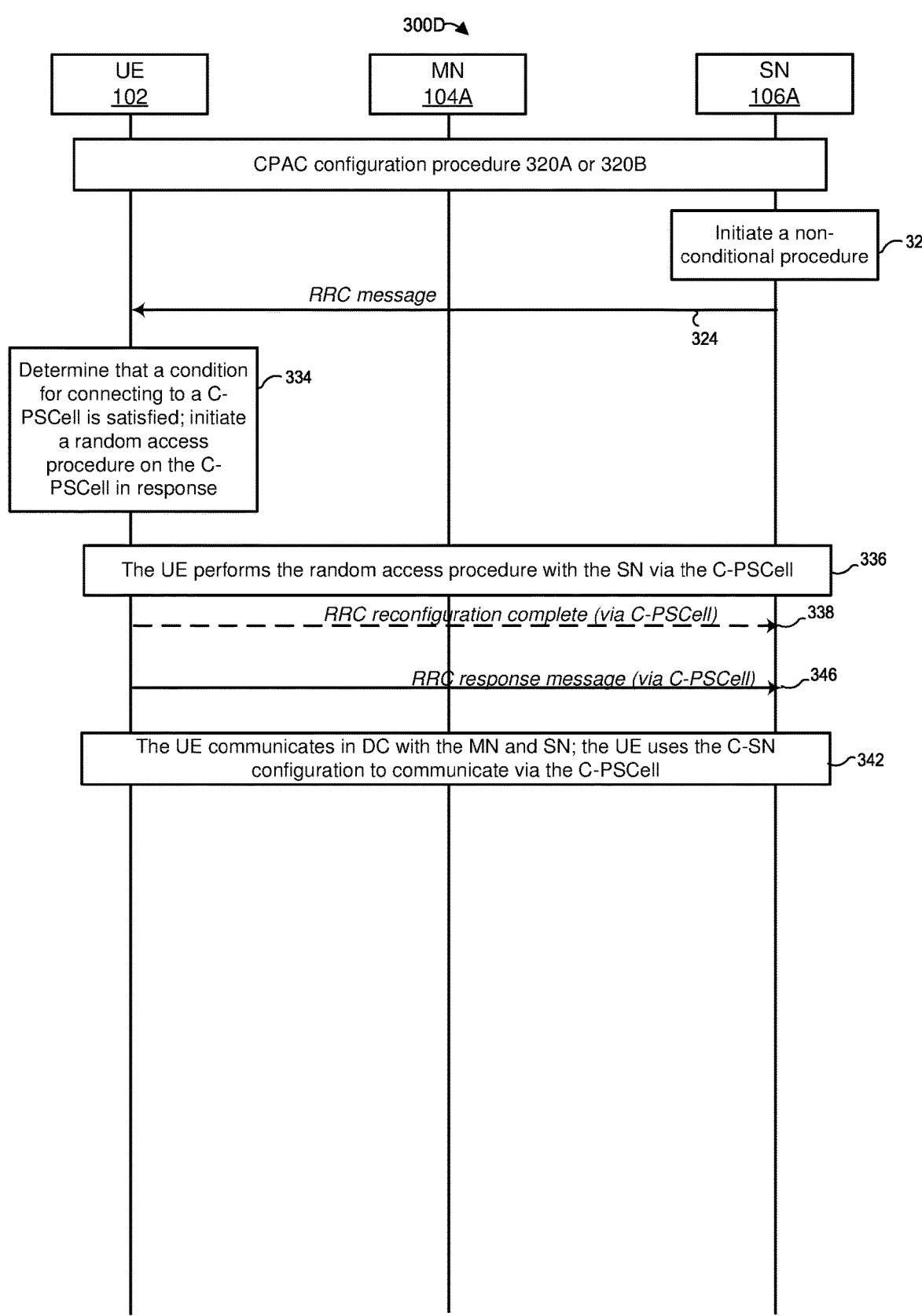
FIG. 3D is a messaging diagram of an example scenario in which an SN provides a UE with CPAC configuration and subsequently initiates a non-conditional procedure, and the UE performs the non-conditional procedure after completing the conditional procedure.

Now referring to FIG. 3D, a scenario 300D involves a CPAC without SN change, i.e., a conditional change of a PSCell of an SN when the UE is already in DC with the MN and SN. In this scenario, the base station 104A operates as a MN and the base station 106A operates as a SN. Events in this scenario similar to those discussed above are labeled with same references numbers. The differences between the scenarios of FIG. 3C and FIG. 3D are discussed below.

In the scenario 300D, the UE 102 transmits 346 the RRC response message via the C-PSCell 126A to the SN 106A after the random access procedure of event 336 instead of transmitting 326 the RRC response message before the random access procedure of event 336. In this implementation or scenario, similar to the scenario 300C, the UE 102 accounts for the information in the RRC message into account, i.e., takes one or more actions in response to this message or apply the information (e.g., configuration) in the RRC message.

Now referring to FIG. 3E, a scenario 300E involves a CPAC without SN change, i.e., a conditional change of a PSCell of an SN when the UE is already in DC with the MN and SN. In this scenario, the base station 104A operates as a MN and the base station 106A operates as an SN. Events in this scenario similar to those discussed above are labeled with same reference numbers. The differences between the scenarios of FIG. 3C and FIG. 3E are discussed below.

In the scenario 300E, the UE 102 transmits 356 the RRC response message to the MN 104A during the conditional procedure. In turn, the MN 104A transmits 358 the RRC response message to the SN 106A. Thus, the UE 102 can perform the non-conditional procedure and the conditional procedure concurrently. In this implementation or scenario, the UE 102 accounts for the information in the RRC message of event 324, i.e., takes one or more actions in response to this message or apply the information (e.g., configuration) in the RRC message.

In some implementations, the UE 102 may transmit 356 an RRC container message including the RRC response message to the MN 104A. For example, the RRC container message can be a ULInformationTransferMRDC message.

Figure 3F:
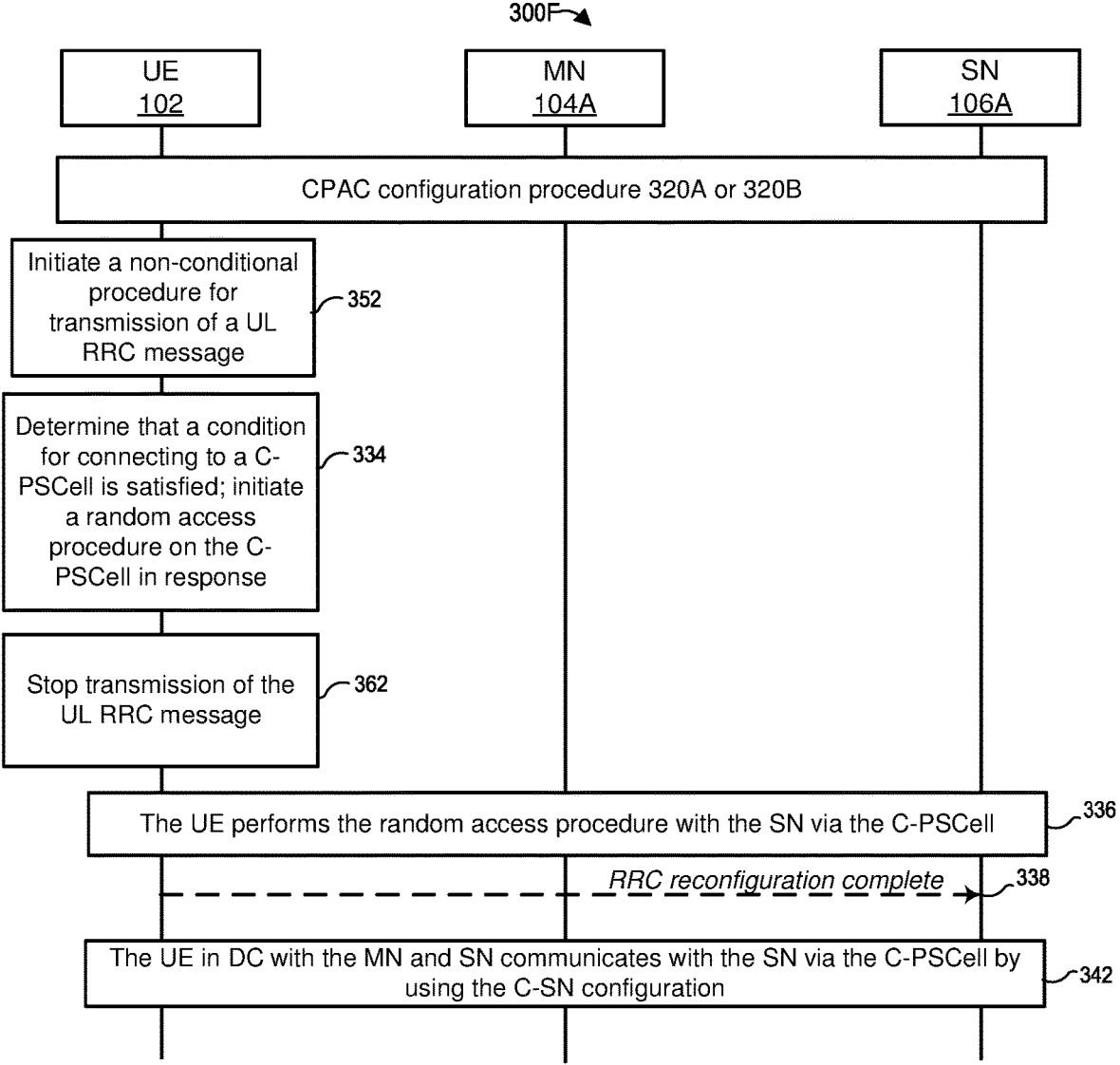
FIG. 3F is a messaging diagram of an example scenario that is similar to the scenario of FIG. 3A, except that the UE initiates the non-conditional procedure.

Now referring to FIG. 3F, a scenario 300F involves a CPAC without SN change, i.e., a conditional change of a PSCell of an SN when the UE is already in DC with the MN and SN. In this scenario, the base station 104A operates as a MN and the base station 106A operates as an SN. Events in this scenario similar to those discussed above are labeled with same references numbers. The differences between the scenarios of FIG. 3A and FIG. 3F are discussed below.

In the scenario 300F, the UE 102 initiates 352 a non-conditional procedure with the SN 106A to transmit a UL RRC message to the SN 106A (unlike the scenario 300A, where the RAN initiates the non-conditional procedure). In the meantime, the UE 102 determines 334 that the condition for connecting to the C-PSCell 126A is satisfied and initiates a random access procure on the C-PSCell 126A in response to the detection. In some scenarios, the detection 334 and the initiation 352 may occur in parallel. In other scenarios, the detection 334 and the initiation 352 may occur sequentially in a short time period. In response to the detection 334, the UE 102 stops (or suspends) transmitting 362 the UL RRC response message. More specifically, the UE 102 in this scenario aborts the non-conditional procedure.

In some implementations, the non-conditional procedure can be an UL information transfer procedure and the UL RRC message can be a ULInformationTransfer message, a ULInformationTransferMRDC message or a ULInformationTransferSN message. In other implementations, the non-conditional procedure can be a measurement reporting procedure and the UL RRC message can be a MeasurementReport message. In yet other implementations, the non-conditional procedure can be a UE assistance information procedure and the UL RRC message can be a UEAssistanceInformation message. In yet other implementations, the non-conditional procedure can be an in-device coexistence indication procedure and the UL RRC message can be an InDeviceCoexIndication message.

Figure 3G:
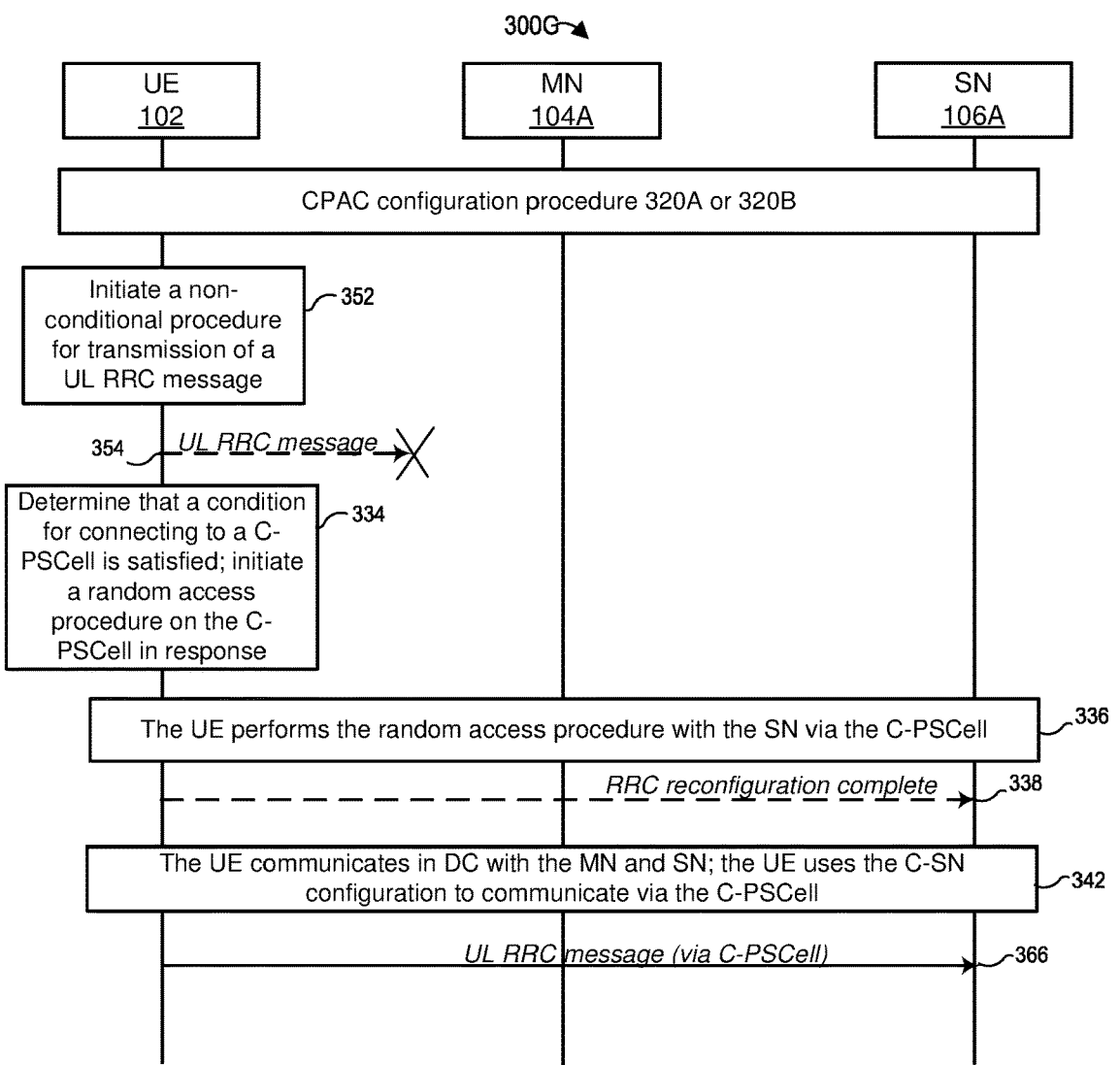
FIG. 3G is a messaging diagram of an example scenario that is similar to the scenario of FIG. 3F, except that the UE fails to complete the non-conditional procedure prior to completing the conditional procedure.

Now referring to FIG. 3G, a scenario 300G also involves a CPAC without SN change, and the base stations 104A and 106A operate as an MN and as an SN, respectively. Events in this scenario similar to those discussed above are labeled with same references numbers. The differences between the scenarios of FIG. 3G and FIG. 3F are discussed below.

After initiating 352 a non-conditional procedure with the SN, the UE 102 fails 354 to transmit the UL RRC message to the SN 106A. The UE 102 then determines 334 that the condition for connecting to the C-PSCell 126A is satisfied, performs 336 the random access procedure with the SN 106A via the candidate cell C-PSCell 126A, and transmits 338 an RRC reconfiguration complete message via the C-PSCell 126A.

After the UE 102 begins to communicate 342 with the SN 106A via the C-PSCell 126A, the UE 102 in this scenario transmits 366 the UL RRC message via the C-PSCell 126A (which now is simply the new PSCell). Thus, in this scenario, the UE 102 completes the UE-originated non-conditional procedure, but only after completing the conditional procedure.

Figure 3H:
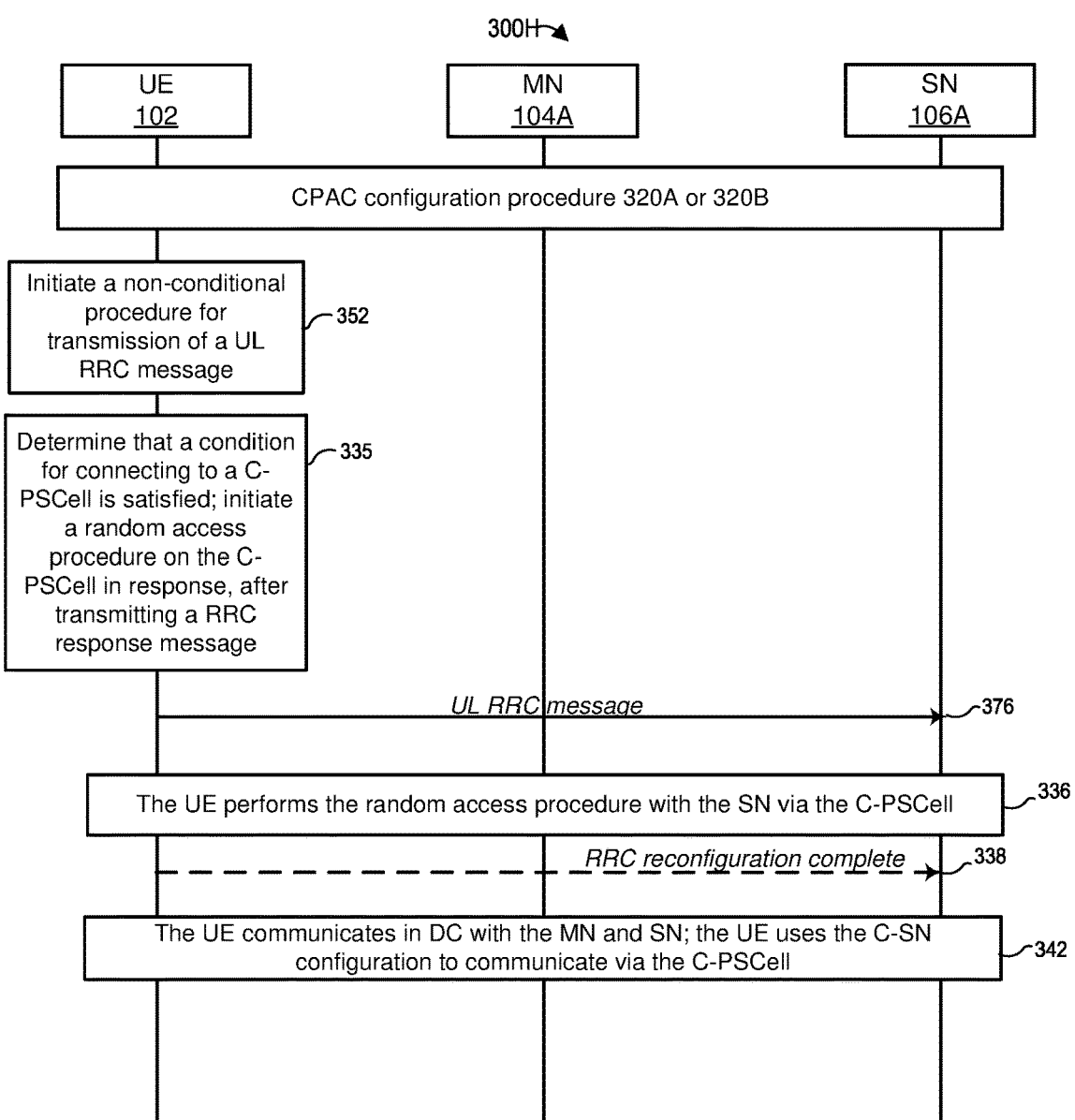
FIG. 3H is a messaging diagram of an example scenario similar to the scenario of FIG. 3C, except that the UE initiates the non-conditional procedure.

Now referring to FIG. 3H, a scenario 300H also involves a CPAC without SN change, and the base stations 104A and 106A operate as an MN and as an SN, respectively. Events in this scenario similar to those discussed above are labeled with same references numbers.

Similar to the scenario 300F, the non-conditional procedure in the scenario 300G is UE-initiated. In this scenario, however, the UE 102 initiates 352 a non-conditional procedure with the SN, determines 335 that the condition for connecting to the C-PSCell 126A is satisfied, and completes the non-conditional procedure by transmitting 376 the UL RRC message to the SN, prior to performing 336 the random access procedure with the SN 106A via the candidate cell C-PSCell 126.

Figure 3I:
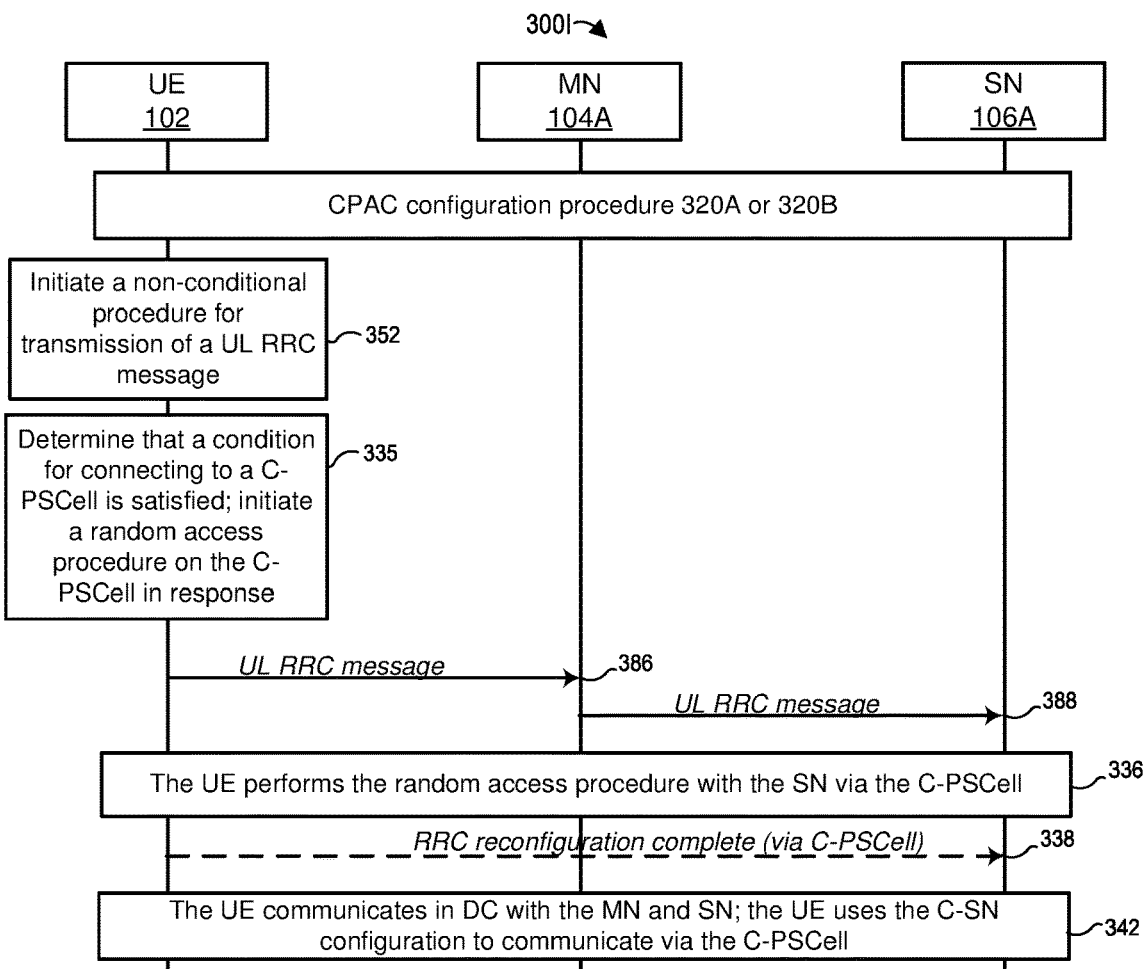
FIG. 3I is a messaging diagram of an example scenario similar to the scenario of FIG. 3E, except that the UE initiates the non-conditional procedure.

Next, FIG. 3I illustrates a scenario 300I that also involves a CPAC without SN change, and the base stations 104A and 106A also operate as an MN and as an SN, respectively. Events in this scenario similar to those discussed above are labeled with same references numbers. The differences between the scenarios of FIG. 3I and FIG. 3H are discussed below.

In this scenario, the UE 102 completes the non-conditional procedure either prior to performing 336 the random access procedure with the SN 106A via the candidate cell C-PSCell 126 (similar to the scenario 300H) or concurrently with the event 336. The UE 102 here transmits 386 the UL RRC message on the PCell to the MN 104A, which in turn forwards 388 the UL RRC message to the SN 106A. Because the UE 102 transmits 386 on the PCell and performs 336 the random access procedure on the PSCell, the UE 102 can conduct these operations concurrently, if desired.

Next, several example scenarios involving CSAC are discussed next with reference to FIGS. 4A-G.

Figure 4A:
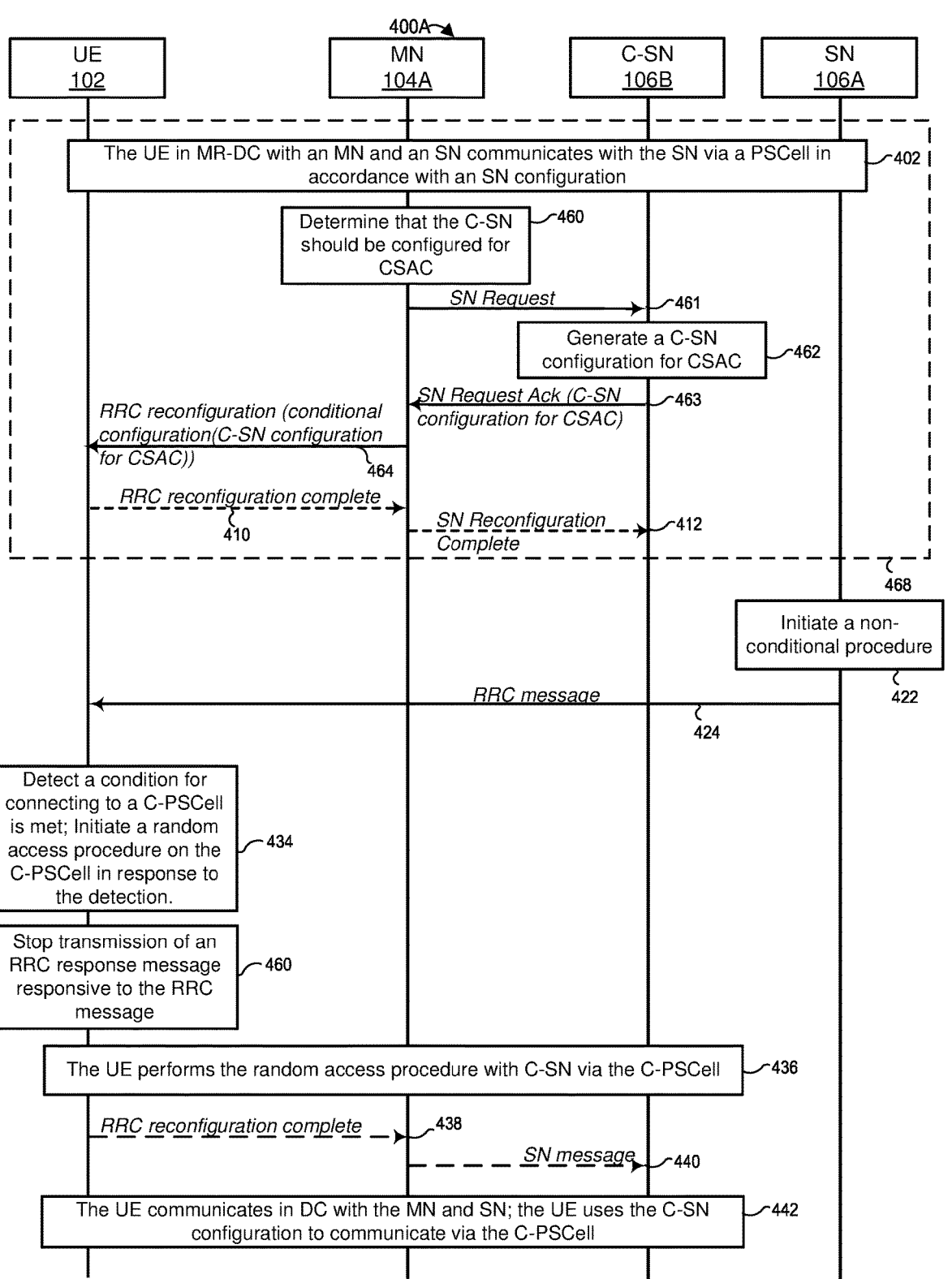
FIG. 4A is a messaging diagram of an example scenario similar to the scenario of FIG. 3A, except that the conditional procedure is CSAC.

Referring first to a scenario 400A of FIG. 4A, the base station 104A operates as a MN, the base station 106A operates as an SN, and the base station 106B operates as a C-SN. At the beginning of this scenario, the UE 102 operates 402 in DC with the MN 104A and SN 106A and communicates UL PDUs and/or DL PDUs with MN 104A via a PCell, and communicates UL PDUs and/or DL PDUs with the SN 106A via a PSCell (i.e., a cell other than cell 126A).

The MN 104A determines 460 that it should configure the base station 106B as a C-SN for CSAC, such that the SN for the UE 102 would change from the SN 106B to the C-SN 106B. The MN 104A may determine that it should do so based on measurement result(s) from the UE 102, for example, or in response to an indication that the SN 106A requires a conditional SN change (e.g., SN Change Required message), which the SN 106A can transmit to the MN 104A. In response to the determination, the MN 104A transmits 461 an SN Request message to the C-SN 106A for the CSAC. In response to receiving 461 the SN Request message, the C-SN 106B determines 462 that it should generate a C-SN configuration for CSAC, for the UE 102. The C-SN 106B transmits 463 an SN Request Acknowledge message including the C-SN configuration for the CSAC to the MN 104A. The C-SN configuration can include a configuration for a C-PSCell and for zero, one, or more C-SCells. In some implementations, the MN 104A may include the C-SN configuration message in an RRC container message. The MN 104A then includes the C-SN configuration for CSAC or the RRC container message in a conditional configuration field/IE and transmits 464 an RRC reconfiguration message including the conditional configuration field/IE to the UE 102. In some implementations, the UE 102 transmits 410 an RRC reconfiguration complete message to the MN 104A in response to the RRC reconfiguration message. The MN 104A can transmit 412 an SN Reconfiguration Complete message to the C-SN 106B in response to the RRC reconfiguration complete message. Events 402, 460-464, 410, and 412 collectively define a CSAC configuration procedure 468.

In some implementations, the C-SN 106B includes a radio bearer configuration for the conditional configuration in the SN Request Acknowledge message in event 463, and in turn the MN 104A can include the radio bearer configuration in the RRC reconfiguration message in event 464. The MN 104A may include the radio bearer configuration at the level of the RRC reconfiguration message, at the level of the conditional configuration element or at the level of the RRC container message described above.

When transmitting 464 the RRC reconfiguration to the UE 102, the MN 104A can specify a condition that must be satisfied before the UE 102 applies the C-SN configuration for CSAC. The MN 104A can specify this condition at the level of the RRC reconfiguration message, at the level of the conditional configuration element, or at the level of the C-SN configuration for CSAC. In the conditional configuration in the RRC reconfiguration message of the 464, MN 104A for example can include a configuration ID to identify the C-SN configuration for CSAC or the conditional configuration.

In some implementations, the SN Request message is an SN Addition Request message, and the SN Request Acknowledge message is an SN Addition Request Acknowledge message. In other implementations, the SN Request message is an SN Modification Request message, and the SN Request Acknowledge message is an SN Modification Request Acknowledge message. In some implementations, the MN 104A indicates to the base station 106B, in the SN Request message, that the MN 104A requests that the base station 106A operate as a C-SN for the UE 102. The UE 102 determines that the conditional configuration includes the C-SN configuration so that the UE 102 may apply the C-SN configuration for the CSAC to communicate with the C-SN 106B.

At a later time, the SN 106A initiates 422 a non-conditional procedure with the UE 102. In response to the initiation, the SN 106A transmits 424 an RRC message on a first SRB (e.g., SRB3) or via the MN 104A to the UE 102 to cause the UE 102 to perform the non-conditional procedure, e.g., as described for event 324. In the meantime, the UE 102 detects 434 a condition for connecting to a C-PSCell 126B is satisfied and initiates a random access procure on the C-PSCell 126B in response to the detection. In some scenarios, the detection 434 and the reception 424 may occur in parallel. In other scenarios, the detection 434 and the reception 424 may occur sequentially in a short time period. In response to the detection 434, the UE 102 stops (or suspends) transmitting 460 an RRC response message responding to the RRC message. For convenience, this discussion may refer to the condition or a configuration in singular, but it will be understood that there may be multiple conditions, and that the conditional configuration can include one or multiple configuration parameters to specify the condition or the multiple conditions. In any case, the UE 102 performs 436 the random access procedure with the C-SN 106B via the C-PSCell 126B using a random access configuration included in the C-SN configuration. The UE 102 in DC may disconnect from the SN 106A (i.e., the PSCell and all of SCell(s) of the SN 106A if configured) in response to the event 434 or 436. The UE 102 may transmit 438 an RRC reconfiguration complete message to the MN 104A in response to the event 434 or 436. The UE 102 may transmit 438 the RRC reconfiguration complete message before or after the even 436 or while the UE 102 performs 436 the random access procedure. In response to the RRC reconfiguration complete message 438, the MN 104A may transmit 440 an SN message (e.g., SN Reconfiguration Complete message or SN Modification Confirm message) to the C-SN 106B. The events 434, 436 and 438 collectively can define a CSAC procedure (or simply a conditional procedure) in the following description.

In some implementations, the MN 104A includes the C-SN configuration in an RRC container message and then include the RRC container message in the conditional configuration 464. In one implementation, the UE 102 transmits 438 the RRC reconfiguration complete message to respond to the RRC container message. The UE 102 may include a transaction identifier value included in the RRC container message in the RRC reconfiguration complete message. For example, the RRC container message can be a RRCConnectionReconfiguration message and the RRC reconfiguration complete message is a RRCConnectionReconfigurationComplete message. Thus, the MN 104A can determine that the RRC reconfiguration complete message (event 438) corresponds to (is responsive to) the RRC container message based the transaction identifier. The MN 104A can also determine that the UE 102 performs the CSAC on the C-SN 106B based on the transaction identifier, and the MN 104A sends the SN message 440 to the C-SN 106B in response to the determination. In one implementation, the MN 104A stops (or refrains from) reusing the same transaction identifier value in an RRC message (e.g., a RRCConnectionReconfiguration message or a RRCReconfiguration message) which has the same message type as the RRC container message until receiving 438 the RRC reconfiguration complete message. If the MN 104A needs to transmit to the UE 102 an RRC message which has the same message type as the RRC container message before receiving the RRC reconfiguration complete message 438, the MN 104A assigns a transaction identifier in the RRC message to a different value from the transaction identifier in the RRC container message. After the MN 104A receives the RRC reconfiguration complete message 438, the MN 104A can assign the transaction identifier value which was included in the RRC container message to an RRC message (which has the same message type as the RRC container message, e.g., a RRCConnectionReconfiguration message or a RRCReconfiguration message) to be transmitted to the UE 102.

In another implementation, the UE 102 can transmit 438 an RRC container response message including the RRC reconfiguration complete message to the MN 104A and the MN 104A can include the RRC reconfiguration complete message in the SN message 440. The UE 102 may include a transaction identifier value included in the C-SN configuration in the RRC reconfiguration complete message and include a transaction identifier value included in the RRC container message in the RRC container response message. For example, the RRC container message can be a RRCConnectionReconfiguration message and the RRC container response message is a RRCConnectionReconfigurationComplete message. Thus, the MN 104A can determine that the RRC container response message (event 438) corresponds to the RRC container message in the conditional configuration by the transaction identifier. The MN 104A can also determine the UE 102 performs the CSAC to the C-SN 106B based on the transaction identifier, and the MN 104A sends the SN message 440 to the C-SN 106B in response to the determination. That is, the MN 104A can address the C-SN 106B using the transaction identifier in the RRC container response message. In one implementation, the MN 104A stops (or refrains from) reusing the same transaction identifier value in an RRC message (e.g., a RRCConnectionReconfiguration message or a RRCReconfiguration message) that has the same message type as the RRC container message before receiving 438 the RRC container response message. If the MN 104A needs to transmit the UE 102 an RRC message that has the same message type as the RRC container message before receiving the RRC container response message 438, the MN 104A assigns a transaction identifier in the RRC message to a different value from the transaction identifier in the RRC container message. After the MN 104A receives the RRC container response message 438, the MN 104A can assign the transaction identifier value that was included in the RRC container message to an RRC message (which has the same message type as the RRC container message, e.g., a RRCConnectionReconfiguration message or a RRCReconfiguration message) to be transmitted to the UE 102.

In yet another implementation, the MN 104A sets a value of the transaction identifier in each of RRC message(s) to be transmitted to the UE 102 irrespective of the RRC container message. In these implementations, the UE 102 may include an indication in the RRC reconfiguration complete message

438 to indicate that the UE 102 performs the CSAC to the C-PSCell 126B or indicate that the RRC reconfiguration complete message 438 is transmitted due to connecting to the C-PSCell 126B or applying the C-SN configuration. Based on the indication, the MN 104A determines the RRC reconfiguration complete message 438 responds to the RRC container message including the C-SN configuration at event 464, and the MN 104A sends the SN message 440 to the C-SN 106B in response to the determination. In some implementations, the indication can include at least one of an identification of the C-PSCell 126B or the configuration ID, so that the MN 104A can address the C-SN 106B according to the at least one of the identification of the C-PSCell 126B or the configuration ID.

The MN 104A can discard or ignore an RRC response message from the UE 102 if the MN 104A cannot identify the RRC message to which the RRC response message responds. In some implementations, the MN 104A determines that the connection with the UE failed and releases the connection, if the MN 104A cannot identify an RRC message from the UE 102 to which the RRC response message responds.

In other implementations, the UE 102 at event 438 transmits an ULInformationTransferMRDC message including the RRC reconfiguration complete message to the MN 104A and in turn, the MN 104A sends a SN message (e.g., RRC Transfer message) including the RRC reconfiguration complete message 438 to the SN 106A. In this case, the UE 102 may not include a transaction identifier in the ULInformationTransferMRDC message. The UE 102 can include a transaction identifier in the RRC reconfiguration complete message as described above. The UE 102 may also include an indication in the ULInformationTransferMRDC message to indicate the UE 102 performed the CSAC on the C-PSCell 126B or indicate that the RRC reconfiguration complete message 438 is transmitted because the UE 102 performed the CSAC n the C-PSCell 126B or applied the C-SN configuration.

Similar to the CPAC scenarios discussed above, the UE 102 can account for the information and/or instructions in the RRC message of event 424 or not account for this information and/or instructions. Some of these possibilities are illustrated below in the flow diagram of FIG. 11.

For example, in some implementations, the UE 102 accounts for the configuration in the RRC message, e.g., the UE 102 takes certain action in response to the configuration(s). In some implementations, the UE 102 may indicate, in the RRC reconfiguration complete message 438, that the UE 102 receives the RRC message 424 or applies the configuration(s), so that if the C-SN 106B receives the RRC reconfiguration complete message, the C-SN 106B determines the UE 102 receives the RRC message or applies the configuration(s) in the RRC message. The SN 106A may forward the configuration(s) or the RRC message to the C-SN 106B directly or via the MN 104A and therefore, the C-SN 106B does not waste resources to retransmit the RRC message for the same configuration(s) if the C-SN 106B determines the UE 102 receives the RRC message or applies the configuration(s) in the RRC message according to the indication. For example, if the configuration(s) in the RRC message configures the UE 102 to use for communication with the SN 106A, the UE 102 and the C-SN 106B may communicate with each other by using the configuration(s) in the RRC message at event 442. In another example, if the configuration(s) includes a measurement configuration, the UE 102 may transmit a measurement report associated to the measurement configuration to the C-SN 106B at event 442.

In some implementations, the UE 102 may include indication field or information element (IE) in the RRC reconfiguration complete message 438, which indicates the UE 102 receives the RRC message 424 or applies the configuration(s). The indication field/IE can include a transaction identifier included in the RRC message. If there are more than one ongoing non-conditional procedure initiated by the SN 106A, the UE 102 can include a transaction identifier included in an RRC message of each ongoing non-conditional procedure initiated by the SN 106A. In response to the indication field/IE, the C-SN 106B may apply (or use) the configuration(s) to communicate with the UE 102 when or after the C-SN 106B detects the UE 102 in the random access procedure 436.

If the UE 102 does not receive the RRC message at event 424, the UE 102, may indicate in the RRC reconfiguration complete message 438, that the UE 102 does not receive the RRC message 424 or apply the configuration(s), so that the C-SN 106B determines the UE 102 does not receive the RRC message or apply the configuration(s) in the RRC message. In response to the determination, the C-SN 106B does not apply (or use) the configuration(s) to communicate with the UE 102 when or after the C-SN 106B detects the UE 102 in the random access procedure 436. For example, the UE 102 may omit an indication field/IE from the RRC reconfiguration complete message 438, which indicates the UE 102 does not receive the RRC message 424 or apply the configuration(s).

In other implementations, the UE 102 may transmit an acknowledgement (e.g., an RLC STATUS PDU or an HARQ acknowledgement) to the SN 106A via e.g., the PSCell or a SCell in the SN configuration to indicate that the UE 102 receives the RRC message. If the SN 106A receives the acknowledgement, the SN 106A determines the UE 102 receives the RRC message. In one implementation, the SN 106A may forward the configuration(s) or the RRC message to the C-SN 106B directly or via the MN 104A in response to the determination. The C-SN 106B may apply (or use) the configuration(s) to communicate with the UE 102 when or after the C-SN 106B detects the UE 102 in the random access procedure 436. If the SN 106A does not receives the acknowledgement, the SN 106A determines the UE 102 does not receive the RRC message. The SN 106A may not forward the configuration(s) or the RRC message to the C-SN 106B directly or via the MN 104A in response to the determination.

In another implementation, the SN 106A may forward the configuration(s) or the RRC message to the C-SN 106B directly or via the MN 104A before receiving the acknowledgement. If the SN 106A does not receive the acknowledgement, the SN 106A may transmit an indication indicating the UE 102 applies the configuration(s) to the C-SN 106B directly or via the MN 104A. In response to the indication, the C-SN 106B may apply (or use) the configuration(s) to communicate with the UE 102 when or after the C-SN 106B detects the UE 102 in the random access procedure 436. If the SN 106A does not receive the indication, the SN 106A does not apply (or use) the configuration(s) to communicate with the UE 102 when or after the SN 106A detects the UE 102 in the random access procedure 436.

In yet other implementations, the UE 102 can abort the non-conditional procedure by discarding or ignoring the RRC message received at event 424. That is, the UE 102 does not account for the configuration(s) in the RRC message, nor does the UE 102 perform any actions in response to the configuration(s).

In some implementations, the non-conditional procedure can be an RRC reconfiguration procedure and the RRC message at event 424 is an RRCReconfiguration message which may include one or more configuration parameters. The RRC response message can be an RRCReconfigurationComplete message responding to the RRCReconfiguration message. More specifically, the RRCReconfiguration message does not configure the UE 102 to perform immediate PSCell change or does not include a reconfigurationWithSync field. If the UE 102 receives a RRCReconfiguration message configuring immediate PSCell change or including a reconfigurationWithSync field, the UE 102 may abort the random access procedure or the conditional procedure.

In other implementations, the non-conditional procedure can be a UE information procedure and the RRC message at event 424 is an UEInformationRequest message which may command the UE 102 to provide information stored in the UE 102. The RRC response message can be an UEInformationResponse message responding to the UEInformationRequest message.

If the UE 102 receives an RRC message releasing the C-SN configuration or the conditional configuration from the SN 106A, the UE 102 aborts the random access configuration or the conditional procedure. For example, the RRC message can be a RRCReconfiguration message which configures the UE 102 to release the C-SN configuration or the conditional configuration including the C-SN configuration.

In some implementations, the random access procedure can be a four-step random access procedure or a two-step random access procedure. In other implementations, the random access procedure can be a contention-based random access procedure or a contention-free random access procedure. After the UE 102 successfully completes 436 the random access procedure, the C-SN 106B begins to operate as the SN 106B, and the UE 102 begins to operate 442 in DC with the MN 104A and the SN 106B. In particular, the UE 102 communicates 442 with the SN 106B via the C-PSCell 126B (i.e., new PSCell 126B) in accordance with the C-SN configuration for the CSAC.

In some implementations, the C-SN 106B identifies the UE 102 if the C-SN 106B finds an identity of the UE 102 in a medium access control (MAC) protocol data unit (PDU) received from the UE 102 in the random access procedure (event 436). The C-SN 106B includes the identity of the UE 102 in the C-SN configuration. In other implementations, the C-SN 106B identifies the UE 102 if the C-SN 106B receives a dedicated random access preamble from the UE 102 in the random access procedure. The C-SN 106B includes the dedicated random access preamble in the C-SN configuration.

The SN configuration can include multiple configuration parameters for the UE 102 to communicate with the SN 106A via the PSCell 126A and zero, one, or more secondary cells (SCells) of the SN 106A. The multiple configuration parameters may configure radio resources for the UE 102 to communicate with the SN 106A via the PSCell 126B and zero, one, or more SCells of the SN 106A. The multiple configuration parameters may configure zero, one, or more radio bearers. The one or more radio bearers can include one or more SRBs (e.g., SRB1 and/or SRB2) and/or DRBs.

In some implementations, the C-SN 106B specifies the one or more conditions in the C-SN configuration for CSAC. In other implementations, the MN 104A includes the C-SN configuration along with the one or more conditions in a conditional configuration element or in the RRC reconfiguration message. The MN 104A may generate the conditional configuration for the UE 102A or receive 463 the conditional configuration from the C-SN 106B.

In some implementations, the C-SN configuration includes a group configuration (CellGroupConfig) IE that configures the C-PSCell 126B and zero, one, or more C-SCells of the C-SN 106B. In one implementation, the C-SN configuration can be a RRCReconfiguration message, RRCReconfiguration-IEs or the CellGroupConfig IE conforming to 3GPP TS 38.331. In other implementations, the C-SN configuration includes a SCG-ConfigPartSCG-r12 IE that configures the C-PSCell and may configure zero, one, or more C-SCells of the C-SN 106B. In one implementation, the C-SN configuration is an RRCConnectionReconfiguration message, RRCConnectionReconfiguration-IEs or the ConfigPartSCG-r12 IE conforming to 3GPP TS 36.331.

In some implementations, the SN configuration includes a CellGroupConfig IE that configures the PSCell and may zero, one, or more SCells of the SN 106A. In one implementation, the SN configuration can be a RRCReconfiguration message, RRCReconfiguration-IEs or the CellGroup-Config IE conforming to 3GPP TS 38.331. In other implementations, the SN configuration can include a SCG-ConfigPartSCG-r12 IE that configures the PSCell and may configure zero, one, or more SCells of the SN 106A. In one implementation, the SN configuration can be a RRCConnectionReconfiguration message, RRCConnectionReconfiguration-IEs or the ConfigPartSCG-r12 IE conforming to 3GPP TS 36.331.

In some cases, the UE 102 may receive one or more conditions in the conditional configuration or in the RRC reconfiguration message (event 464). The UE 102 can use the one or more conditions to determine whether to connect to the C-PSCell 126B. If the UE 102 determines that the condition is satisfied, the UE 102 connects to the C-PSCell 126B. That is, the condition (or called triggering condition) triggers the UE 102 to connect to the C-PSCell 126B or to execute the C-SN configuration. If the UE 102 does not determine that the condition is satisfied, the UE 102 does not connect to the C-PSCell 126B.

In some implementations, the C-SN 106B can include a CU 172 and one or more DU 174 as illustrated in FIG. 1C. The CU 172 receives the SN Request message from the MN 104A and transmits the SN Request Acknowledge message. The DU 174 may generate the C-SN configuration or part of the C-SN configuration (e.g., the identity of the UE 102, the dedicated random access preamble, the random access configuration) and transmit the C-SN configuration or part of the C-SN configuration to the CU 172. In case the DU 174 generates part of the C-SN configuration, the CU 172 may generate rest of the C-SN configuration. In one implementation, the DU 174 can perform the random access procedure (event 436) with the UE 102 and identify the UE 102 in the random access procedure. The DU 174 may send a Downlink Data Delivery Status message to the CU 172 in response to the identification. The CU 172 communicates 442 with the UE 102 via the DU 174 in response to the Downlink Data Delivery Status message. In response to the identification, the DU 174 communicates with the UE 102 using the C-SN configuration or part of the C-SN configuration. In another implementation, the DU 174 can perform the random access procedure (event 436) with the UE 102 and forward the identity of the UE 102 received in the MAC PDU in the random access procedure to the CU 172. The CU 172 identifies the UE 102 according to the identity of the UE 102. In response to the identification, the CU 172 and DU

174 communicates with the UE 102 using the rest of the C-SN configuration and part of the C-SN configuration respectively.

If the C-SN 106B identifies the UE 102 on the C-PSCell 126B during the event 436, the C-SN 106B begins to transmit downlink control information (DCI) command(s) on physical downlink control channel(s) (PDCCH(s)), reference signal(s) or data to the UE 102 via the C-PSCell 126B and/or one or more C-SCells (if configured in the C-SN configuration) according to some configuration parameters in the C-SN configuration. If the C-SN 106B identifies the UE 102 on the C-PSCell 126B during the event 436, the C-SN 106B can receive signal(s) on physical uplink control channel(s) (PUCCH(s)), sounding reference signal(s) or data from the UE 102 via the C-PSCell 126B and/or one or more C-SCells (if configured in the C-SN configuration) according to some configuration parameters in the C-SN configuration. The UE 102 receives the DCI command(s) on PDCCH(s), reference signal(s) or data from the C-SN 106B via the C-PSCell 126B and/or one or more C-SCells (if configured in the C-SN configuration) according to some configuration parameters in the C-SN configuration. The UE 102 may transmit signal(s) on PUCCH(s), sounding reference signal(s) or data to the C-SN 106B via the C-PSCell 126B and one or more C-SCells (if configured in the C-SN configuration) according to some configuration parameters in the C-SN configuration. In response to the identification, the C-SN 106B becomes SN 106B and determines that the C-PSCell 126B becomes PSCell 126B and the one or more C-SCells becomes one or more SCells.

As described above, the MN 104A and C-SN 106B configures the C-PSCell 126B to the UE 102 during the events 463 and 464 in advance, before the C-PSCell 126B becomes suitable for the UE 102. When the C-PSCell 126B becomes suitable for the UE 102 (i.e., the UE 102 detects the corresponding condition), the UE 102 performs the random access procedure with the C-PSCell to quickly change PSCell (i.e., change SN). In contrast to the immediate SN Addition procedure, the conditional SN addition technique discussed in this disclosure significantly reduces latency associated with DC configuration.

Figure 4B:
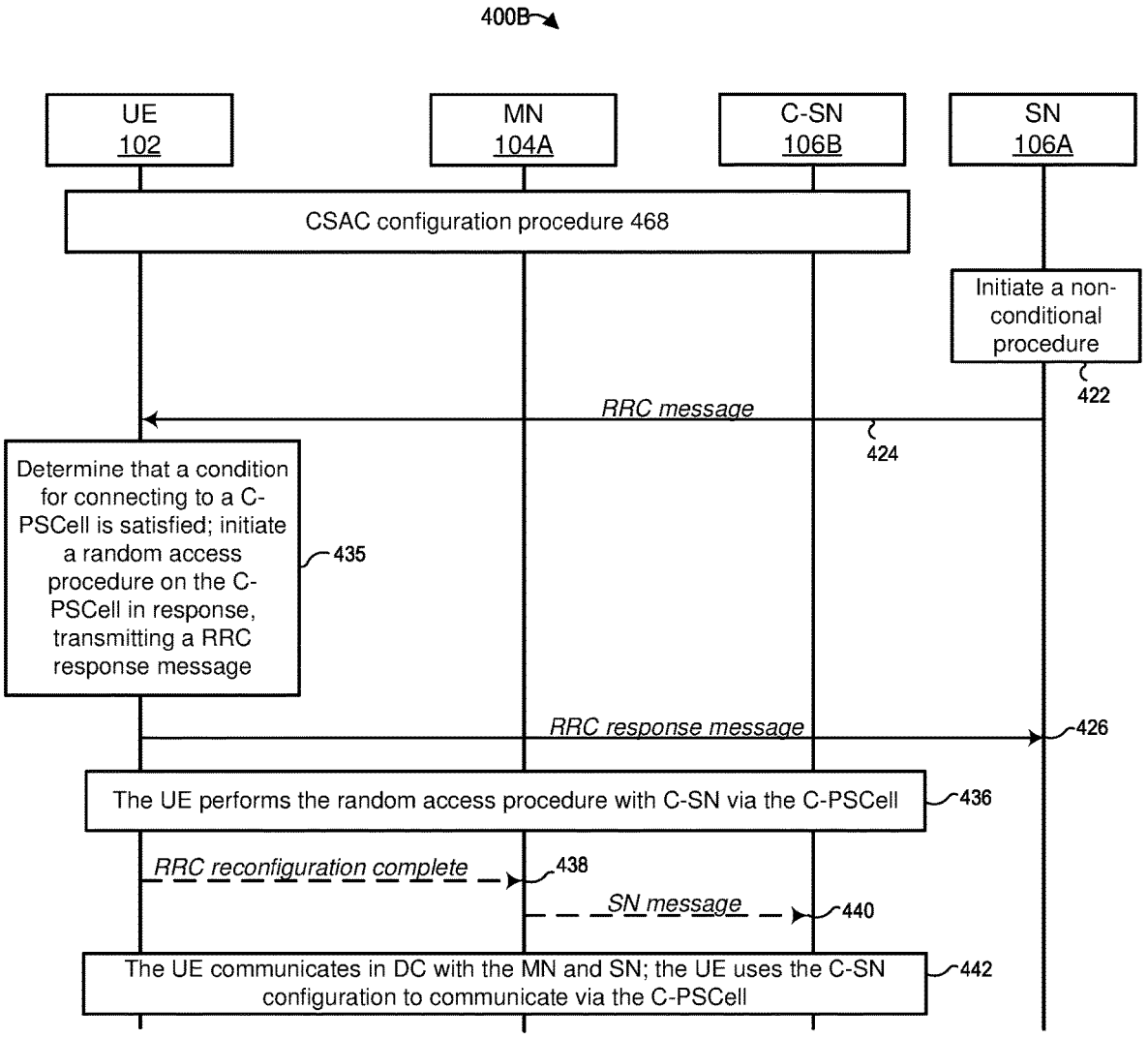
FIG. 4B is a messaging diagram of an example scenario similar to the scenario of FIG. 3C, except that the conditional procedure is CSAC.

Now referring to FIG. 4B, a scenario 400B also involves CSAC, and the base stations 104A, 106A, and 106B operate as an MN, a SN, and a C-SN, respectively. Events in this scenario similar to those discussed above are labeled with same references numbers. The differences between the scenarios of FIG. 4B and FIG. 4A are discussed below.

In this scenario, which is also similar to the scenario 300C discussed above with reference to FIG. 3C, the UE 102 initiates 435 a random access procedure on the C-PSCell 126A in response to the determination 435 that the condition for connecting to the C-PSCell 126A is satisfied. The UE 102 transmits 426 the RRC response message, e.g. via the PSCell or a SCell (i.e., not a candidate cell), in response to the RRC message 424 before the UE 102 performs 436 the random access procedure on the C-PSCell 126A with the C-SN 106B. In other words, the UE 102 delays transmission 338 of an RRC Reconfiguration message until the UE 102 completes the transmission 426 of the RRC response message. The MN 104A receives 438 the RRC reconfiguration complete message and forwards 440 the message to the SN 106A. In this implementation or scenario, the UE 102 accounts for the information in the RRC message of event 424, i.e., takes one or more actions in response to this message or apply the information (e.g., configuration) in the RRC message.

Figure 4C:
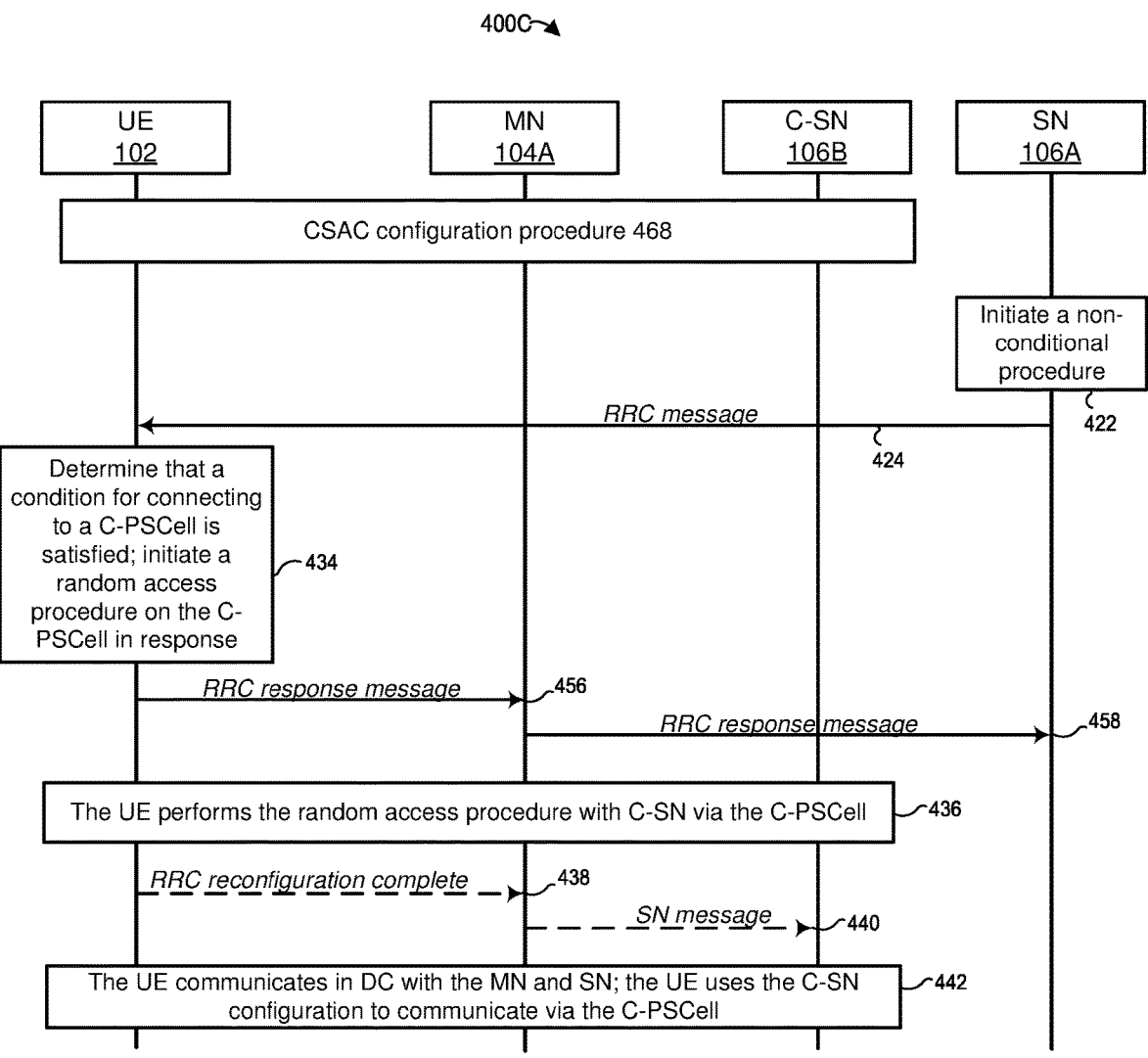
FIG. 4C is a messaging diagram of an example scenario similar to the scenario of FIG. 3C, except that the conditional procedure is CSAC.

A scenario 400C of FIG. 4C is similar to the scenario of FIG. 4B, and also is similar to the scenario of FIG. 3C, but here the UE 102 transmits 456 an RRC response message to the MN 104A, which forwards 458 the message to the SN 106A (rather than directly transmitting 426 the RRC response message to the SN 106A, as in FIG. 4B).

Figure 4D:
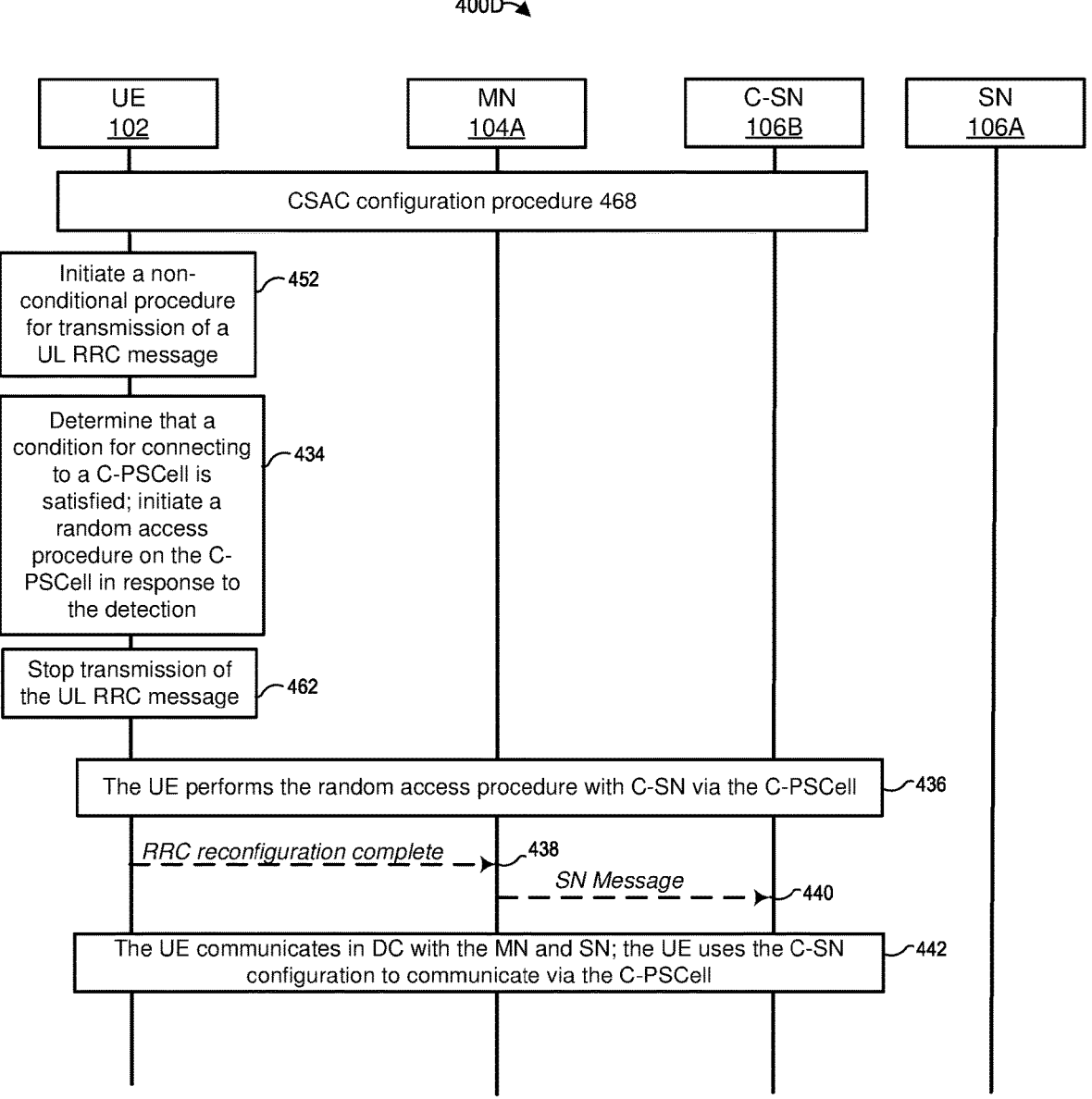
FIG. 4D is a messaging diagram of an example scenario similar to the scenario of FIG. 3F, except that the conditional procedure is CSAC.

Now referring to FIG. 4D, a scenario 400D also involves CSAC, and the base stations 104A, 106A, and 106B operate as an MN, a SN, and a C-SN, respectively. Events in this scenario similar to those discussed above are labeled with same references numbers. This scenario is also similar to the scenario of FIG. 3F discussed above, in that the UE 102 in this scenario aborts the non-conditional procedure.

However, unlike the scenario of FIG. 3F, procedures 426 and 442 involve the UE 102 and the C-SN 106B rather than the SN 106A. Also, the UE 102 in this scenario transmits an RRC reconfiguration complete 438 to the MN 104A, which then transmits 440 an SN message to the C-SN 106B.

Figure 4E:
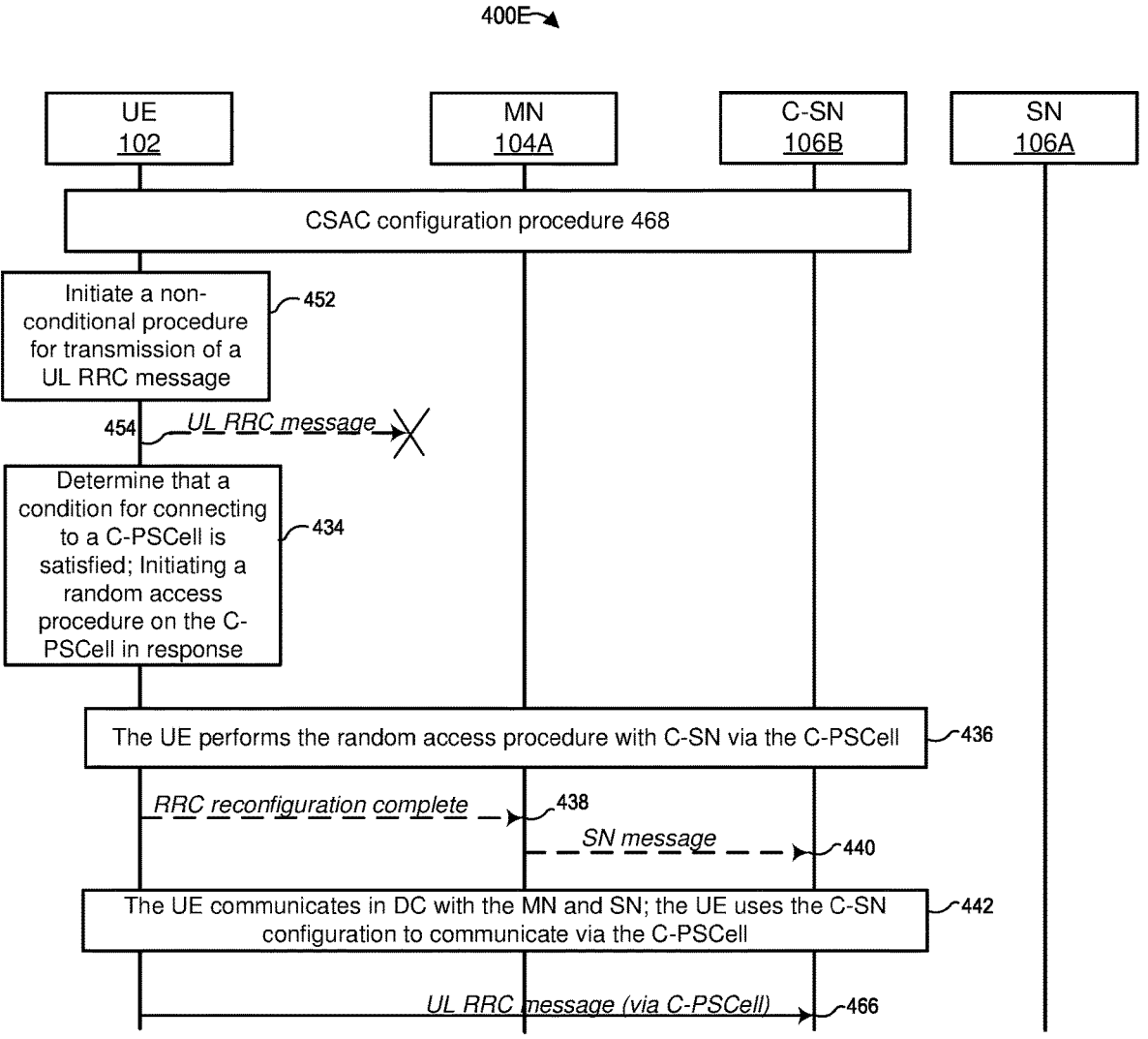
FIG. 4E is a messaging diagram of an example scenario similar to the scenario of FIG. 3G, except that the conditional procedure is CSAC.

Now referring to FIG. 4E, a scenario 400E involves CSAC, and the base stations 104A, 106A, and 106B operate as an MN, a SN, and a C-SN, respectively. Events in this scenario similar to those discussed above are labeled with same references numbers. This scenario is also similar to the scenario of FIG. 3G discussed above, in that the UE 102 initially fails to transmit an UL RRC message to the SN 106A.

Unlike the scenario of FIG. 3G, the UE 102 eventually transmits 466 the UL RRC message to the C-SN 106B via the C-PSCell rather than to the C-SN. Also, the UE 102 in this scenario transmits an RRC reconfiguration complete 438 to the MN 104A, which then transmits 440 an SN message to the C-SN 106B.

Figure 4F:
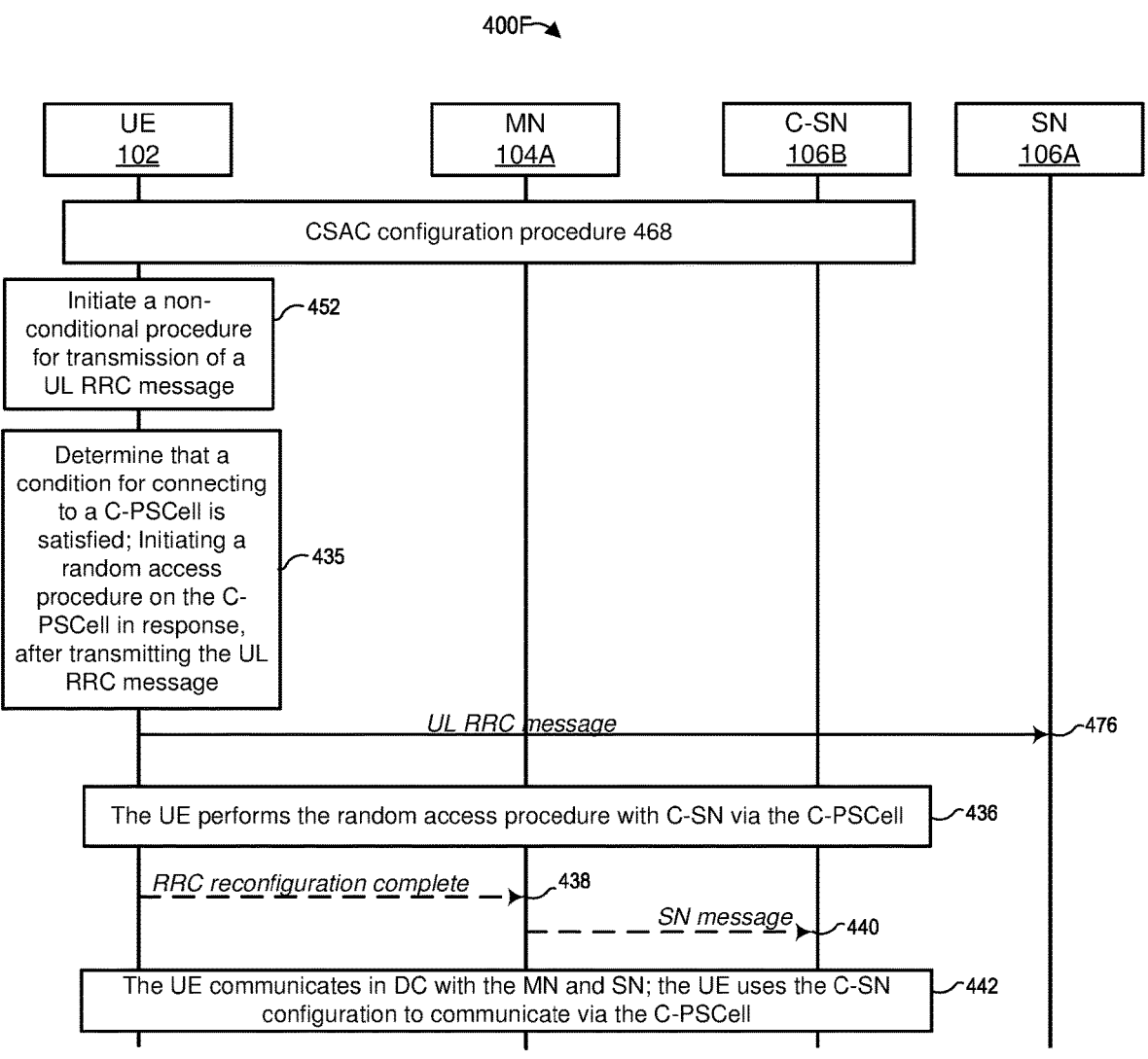
FIG. 4F is a messaging diagram of an example scenario similar to the scenario of FIG. 3H, except that the conditional procedure is CSAC.

Now referring to FIG. 4F, a scenario 400F involves CSAC, and the base stations 104A, 106A, and 106B operate as an MN, a SN, and a C-SN, respectively. Events in this scenario similar to those discussed above are labeled with same references numbers. This scenario is also similar to the scenario of FIG. 3H discussed above, in that the UE 102 completes the non-conditional procedure either prior to performing 436 the random access procedure with the SN 106A via the candidate cell C-PSCell 126 or concurrently with the event 436.

Unlike the scenario of FIG. 3H, the UE 102 transmits 476 the UL RRC message to the C-SN 106B via the C-PSCell rather than to the C-SN. Also, the UE 102 in this scenario transmits an RRC reconfiguration complete 438 to the MN 104A, which then transmits 440 an SN message to the C-SN 106B.

Figure 4G:
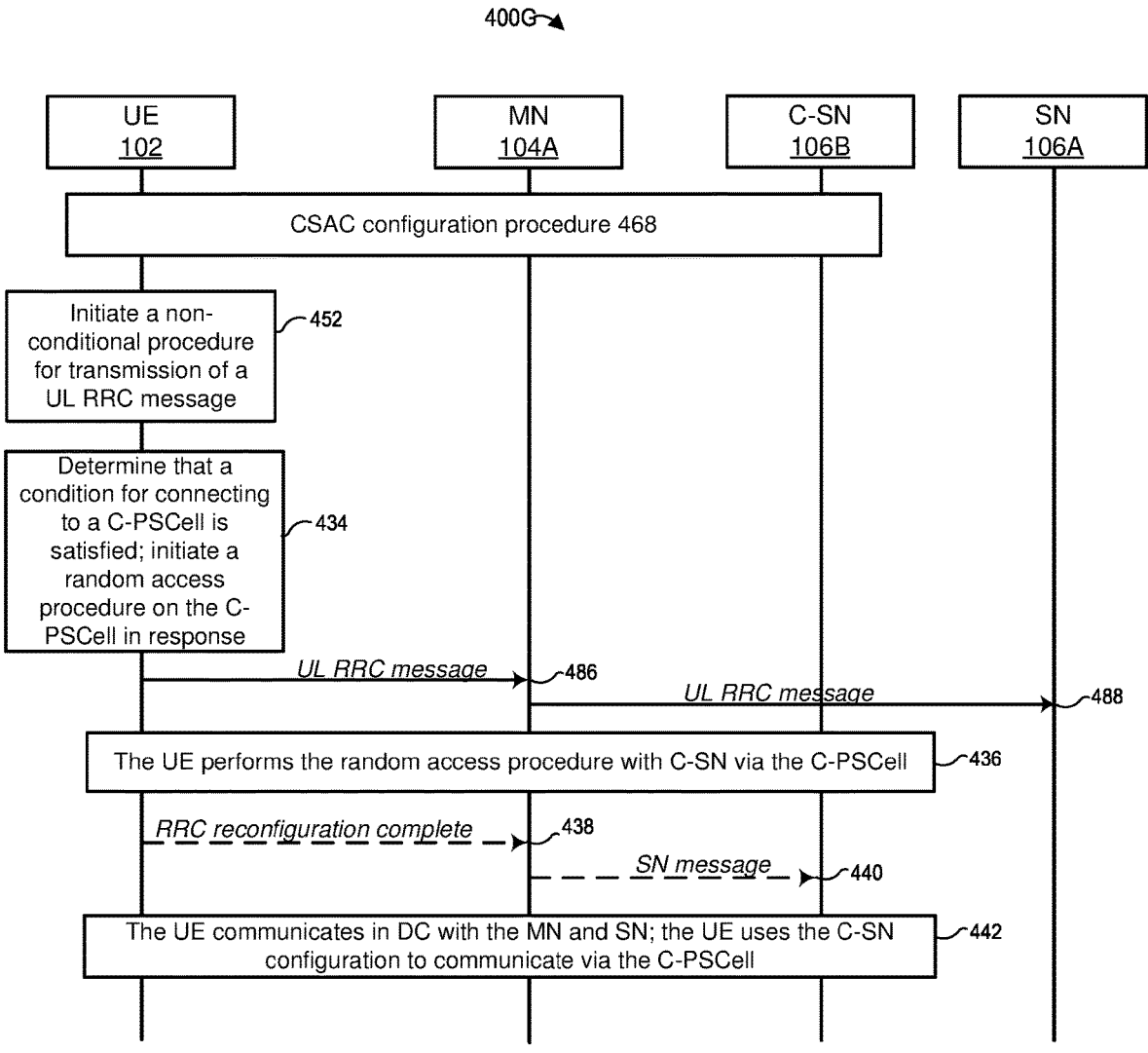
FIG. 4G is a messaging diagram of an example scenario similar to the scenario of FIG. 3I, except that the conditional procedure is CSAC.

Now referring to FIG. 4G, a scenario 400F involves CSAC, and the base stations 104A, 106A, and 106B operate as an MN, a SN, and a C-SN, respectively. Events in this scenario similar to those discussed above are labeled with same references numbers. This scenario is also similar to the scenario of FIG. 3I discussed above, in that the UE 102 completes a UE-originated non-conditional procedure either prior to performing 436 the random access procedure with the SN 106A via the candidate cell C-PSCell 126 or concurrently with the event 436.

Unlike the scenario of FIG. 3I, the UE 102 transmits 486 the UL RRC message to the MN 104A, and the MN 104 forwards 488 the UL RRC message to the SN 106A. Also, the UE 102 in this scenario transmits an RRC reconfiguration complete 438 to the MN 104A, which then transmits 440 an SN message to the C-SN 106B.

Figure 5A:
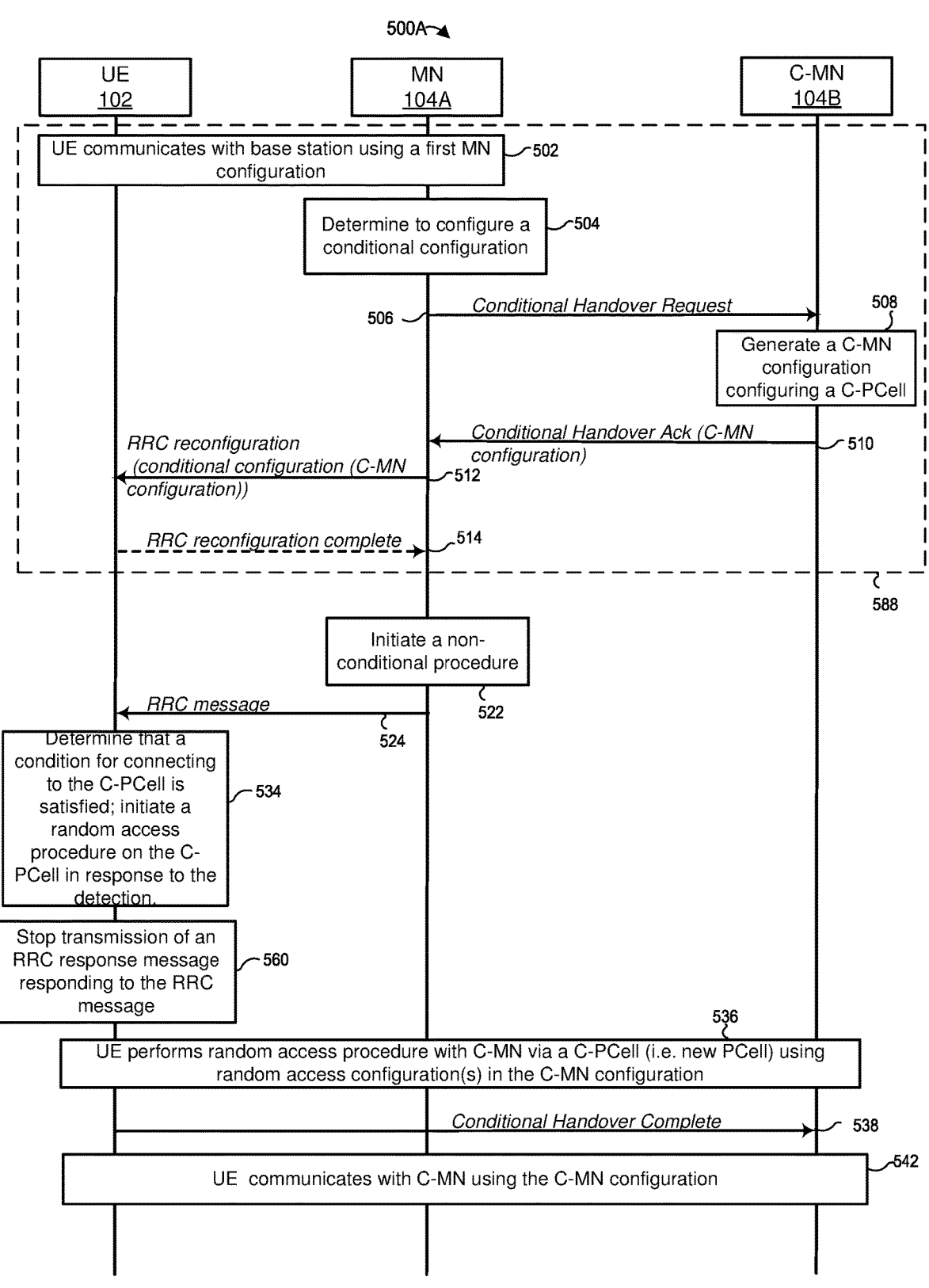
FIG. 5A is a messaging diagram of an example scenario similar to the scenario of FIG. 3A, except that the conditional procedure is CHO.

Next, FIG. 5A illustrates a scenario 500A that involves conditional handover. In this scenario, the base station 104A operates as a MN, and the base station 104B operates as a candidate base station (C-MN) for the conditional handover.

In this scenario, the UE 102 communicates 502 with the MN 104A in accordance with an MN configuration. The UE 102 may be in SC with the MN 104A or in DC with the MN 104A and SN 106A. The MN 104A determines 504 that it should request a C-MN configuration for the UE 102. The C-MN configuration configures a candidate PCell (C-PCell) 124B of the C-MN 104B. The MN 104A can make this determination based on one or more measurement results received from the UE directly (e.g., via an SRB established between the UE 102 and the MN 104A or via a physical control channel), or obtained by the MN 104A from measurements of signals, control channels or data channels received from the UE 102, for example, or another suitable event. In response to the determination, the MN 104A transmits 506 a Conditional Handover Request message to the C-MN 104B.

In response to the Conditional Handover Request message, the C-MN 104B generates 508 a C-MN configuration. The C-MN 104B then transmits a 510 Conditional Handover Request Acknowledge message including the C-MN configuration to the MN 104A. The MN 104A includes the C-MN configuration in a conditional configuration and transmits 512 an RRC reconfiguration message including the conditional configuration to the UE 102. The UE 102 may transmit 514 an RRC reconfiguration complete message to the MN 104A in response to the RRC reconfiguration message 512.

In some implementations, the Conditional Handover Request message can be a Handover Request message and the Conditional Handover Request Acknowledge message can be a Handover Request Acknowledge message as defined in 3GPP TS 36.423 or TS 38.423 and the MN 104A may include a conditional handover request indication in the Handover Request message. In some implementations, the MN 104A may include the MN configuration in the Handover Request message. In other implementations, the MN 104A may not include the MN configuration in the Handover Request message.

At a later time, the MN 104A initiates 522 a non-conditional procedure with the UE 102. In response to the initiation, the MN 104A transmits 524 an RRC message on an SRB (e.g., SRB1) to the UE 102 to cause the UE 102 to perform the non-conditional procedure. In the meantime, the UE 102 can detect 534 that a condition (or conditions) for connecting to the C-PCell 124B is satisfied and initiate 534 a random access procedure on the C-PCell 124B in response to the detection. In some scenarios, the detection 534 and the reception 524 may occur in parallel. In other scenarios, the detection 534 and the reception 524 may occur sequentially in a short time period. In response to the detection 534, the UE 102 stops (or suspends) transmitting 560 an RRC response message responding to the RRC message. In response to the initiation, the UE 102 can perform 536 the random access procedure with the C-MN 104B via the C-PCell 124B using a random access configuration in the C-MN configuration. The UE 102 may disconnect from the PCell 124A of the MN 104A in response to the initiation or the detection. The UE 102 may transmit 538 a Conditional Handover Complete message via the C-PCell 124B to the C-MN 104B in/after 536 the random access procedure in response to the C-MN configuration. The events 534, 536 and 538 collectively can define a CHO procedure (or simply a conditional procedure) in the following description.

After the UE 102 successfully completes the random access procedure 536 or transmitting 538 the Conditional Handover Complete message, the UE 102 can communicate 542 with the C-MN 104B via the C-PCell 124B (i.e., new PCell 124B) in accordance with the C-MN configuration. The UE 102 may transmit 538 the Conditional Handover Complete message during or after the random access procedure.

Similar to the CPAC and CSAC scenarios discussed above, the UE 102 can account for the information and/or instructions in the RRC message of event 524 or not account for this information and/or instructions. Some of these possibilities are illustrated below in the flow diagram of FIG. 11.

For example, the UE 102 can account for the configuration(s) in the RRC message, e.g., the UE 102 take actions in response to the configuration(s) or apply the configuration(s). In some implementations, the UE 102 may indicate, in the Conditional Handover Complete message 538, that the UE 102 receives the RRC message 524 or applies the configuration(s), so that the C-MN 104B determines the UE 102 receives the RRC message or applies the configuration(s), in the RRC message. The MN 104A may forward the configuration(s) or the RRC message to the C-MN 104B and therefore, the C-MN 104B does not waste resources to retransmit the RRC message to configure the same configuration(s) if the C-MN 104B determines the UE 102 receives the RRC message or applies the configuration(s) in the RRC message according to the indication. For example, if the configuration(s) in the RRC message configures the UE 102 to use for communication with the MN 104A, the UE 102 and the C-MN 104B may communicate with each other by using the configuration(s) in the RRC message at event 542. In another example, if the configuration(s) includes a measurement configuration, the UE 102 may transmit a measurement report associated to the measurement configuration to the C-MN 104B at event 542. In some implementations, the UE 102 may include indication field or information element (IE) in the Conditional Handover Complete message 538, which indicates the UE 102 receives the RRC message 524 or applies the configuration(s). The indication field/IE can include a transaction identifier included in the RRC message. If there are more than one ongoing non-conditional procedure initiated by the MN 104A, the UE 102 can include a transaction identifier included in an RRC message of each ongoing non-conditional procedure initiated by the MN 104A. In response to the indication field/IE, the C-MN 104B may apply (or use) the configuration(s) to communicate with the UE 102 when or after the C-SN 104B detects the UE 102 in the random access procedure 536.

If the UE 102 does not receive the RRC message at event 524, the UE 102, may indicate in the Conditional Handover Complete message 538, that the UE 102 does not receive the RRC message 524 or apply the configuration(s), so that the C-MN 104B determines the UE 102 does not receive the RRC message or apply the configuration(s) in the RRC message. In response to the determination, the C-MN 104B does not apply (or use) the configuration(s) to communicate with the UE 102 when or after the C-MN 104B detects the UE 102 in the random access procedure 536. For example, the UE 102 may not include an indication field/IE in the Conditional Handover Complete message 538, which indicates the UE 102 does not receive the RRC message 524 or apply the information.

The UE 102 alternatively can use another mechanism for indicating to the SN 106A that the UE 102 applied the information or took the required action in accordance with the RRC message of event 524. According to this approach, the MN 104A determines that the RRC message of 524 has reached the UE 102 based on acknowledgement protocols of other layers or sublayers.

In other implementations, the UE 102 may transmit an acknowledgement (e.g., an RLC STATUS PDU or an HARQ acknowledgement) to the MN 104A via e.g., the PCell or a SCell in the MN configuration to indicate that the UE 102 receives the RRC message. If the MN 104A receives the acknowledgement, the MN 104A determines the UE 102 receives the RRC message. In one implementation, the MN 104A may forward the configuration(s) or the RRC message to the C-MN 104B in response to the determination. The C-MN 104B may apply (or use) the configuration(s) to communicate with the UE 102 when or after the C-MN 104B detects the UE 102 in the random access procedure 536. If the MN 104A does not receives the acknowledgement, the MN 104A determines the UE 102 does not receive the RRC message. The MN 104A may not forward the configuration(s) or the RRC message to the C-NN 104B in response to the determination.

In another implementation, the MN 104A may forward the configuration(s) or the RRC message to the C-MN 104B before receiving the acknowledgement. If the SN 106A does not receive the acknowledgement, the MN 104A may transmit an indication indicating the UE 102 applies the configuration(s) to the C-MN 104B. In response to the indication, the C-MN 104B may apply (or use) the configuration(s) to communicate with the UE 102 when or after the C-MN 104B detects the UE 102 in the random access procedure 536. If the MN 104A does not receive the indication, the MN 104A does not apply (or use) the configuration(s) to communicate with the UE 102 when or after the MN 104A detects the UE 102 in the random access procedure 536.

According to another approach, the UE 102 does not apply the configuration included in the RRC message of event 524 or execute the action specified in the message, in view of the detecting 534. More specifically, the UE 102 can abort the non-conditional procedure by discarding or ignoring the RRC message received at event 524. That is, the UE 102 does not take the configuration(s) in the RRC message into account, i.e., the UE 102 does not take actions in response to the information or does not apply the configuration(s).

In some implementations, the non-conditional procedure can be an RRC reconfiguration procedure and the RRC message at event 524 is an RRCReconfiguration message which may include one or more configuration parameters. The RRC response message can be an RRCReconfigurationComplete message responding to the RRCReconfiguration message. More specifically, the RRCReconfiguration message does not configure the UE 102 to perform handover or does not include a reconfigurationWithSync field. If the UE 102 receives a RRCReconfiguration message configuring handover or including a reconfigurationWithSync field, the UE 102 may abort the random access procedure or the conditional procedure. The RRCReconfiguration message does not configure the UE 102 to release the C-MN configuration or the conditional configuration including the C-MN configuration. If the RRCReconfiguration message configures the UE 102 to release the C-MN configuration or the conditional configuration including the C-MN configuration, the UE 102 aborts the random access configuration or the conditional procedure.

In other implementations, the non-conditional procedure can be a UE information procedure and the RRC message at event 524 is an UEInformationRequest message which may command the UE 102 to provide information stored in the UE 102. The RRC response message can be an UEInformationResponse message responding to the UEInformationRequest message.

If the UE 102 receives an RRC message releasing the C-MN configuration or the conditional configuration from the MN 104A, the UE 102 aborts the random access configuration or the conditional procedure. For example, the RRC message can be a RRCReconfiguration message which configures the UE 102 to release the C-MN configuration or the conditional configuration including the C-MN configuration.

In some implementations, the random access procedure can be a four-step random access procedure or a two-step random access procedure. In other implementations, the random access procedure can be a contention-based random access procedure or a contention-free random access procedure. In some implementations, the UE 102 may transmit the Conditional Handover Complete message in a message 3 of the four-step random access procedure or in a message A of the two-step random access procedure.

The C-MN 104B can determine the identity of the UE 102 similar to the scenarios discussed above, e.g., using the MAC PDU.

Similar to the C-SN configuration discussed above, the C-MN configuration can be a complete and self-contained configuration (i.e. full configuration). In the C-MN configuration, the C-MN 104B may include a full configuration indication (an information element (IE) or a field) which indicates the C-MN configuration is a complete and self-contained configuration (i.e. full configuration). The UE 102 can directly use the C-MN configuration to communicate with the C-MN 104B without referring to the previously received MN configuration. In other implementations, the C-MN configuration can include one or more configurations on top of the MN configuration (i.e., delta configuration). The UE 102 can use the C-MN configuration together with the MN configuration to communicate with the C-MN 104B at event 542.

The C-MN configuration can include multiple configuration parameters for the UE 102 to communicate with the C-MN 104B via the C-PCell 124B. The multiple configuration parameters may configure radio resources for the UE 102 to communicate with the C-MN 104B via the C-PCell 124B and zero, one, or more candidate secondary cells (C-SCells) of the C-MN 104B. The multiple configuration parameters may configure zero, one, or more radio bearers. The one or more radio bearers can include SRB(s) and/or DRB(s). The SRB(s) may include SRB1 and/or SRB2.

In some implementations, the C-MN 104B may be pre-configured to generate a complete configuration for a C-MN configuration and include a full configuration indication in the C-MN configuration. In other implementations, the C-MN 104B may determine to generate a complete configuration for a C-MN configuration and include a full configuration indication in the C-MN configuration if the C-MN 104B determines that the MN 104A is from a different manufacturer. In yet other implementations, the C-MN 104B may determine it should generate a complete configuration for a C-MN configuration and include a full configuration indication in the C-MN configuration if the C-MN 104B cannot generate a delta configuration for a C-MN configuration according to the MN configuration received 506 in the Conditional Handover Request message. For example, the MN 104A may indicate the MN configuration is not up-to-date so that the C-MN 104B cannot use the MN configuration to generate a delta configuration for a C-MN configuration. In further implementations, the MN

104A may instruct the C-MN 104B to generate a complete configuration for a C-MN configuration and include a full configuration indication in the C-MN configuration. In additional implementations, the C-MN 104B may determine it should generate a delta C-MN configuration in a Conditional Handover Request Acknowledge message during a conditional handover procedure if the C-MN 104B determines that the MN 104A operates is from the same manufacturer or is pre-configured to do so.

Similar to the delta C-SN configuration, the delta C-MN configuration is not a complete configuration and does not include a full configuration indication. The UE 102 cannot use only the delta C-MN configuration to communicate with the C-MN 104B; the UE 102 must also refer to the MN configuration stored in the UE 102. The delta C-MN configuration can include one or multiple configuration parameters for the UE 102 to communicate with the C-MN 104B via the C-PCell 124B. The multiple configuration parameters may configure radio resources for the UE 102 to communicate with the C-MN 104B via the C-PCell 124B and zero, one, or more C-SCells of the C-MN 104B. The multiple configuration parameters may or may not configure zero, one, or more radio bearers. The one or more radio bearers can include an SRB and/or DRB(s). The multiple configuration parameters may or may not include a measurement configuration and/or a security configuration.

The MN configuration can include multiple configuration parameters for the UE 102 to communicate with the MN 104A via the PCell 124A and zero, one, or more secondary cells (SCells) of the MN 104A. The multiple configuration parameters may configure radio resources for the UE 102 to communicate with the MN 104A via the PCell 124A and zero, one, or more SCells of the MN 104A. The multiple configuration parameters may configure zero, one, or more radio bearers. The one or more radio bearers can include SRB(s) and/or DRB(s). The SRB(s) may include SRB1 and/or SRB2.

The MN 104A can include the condition the UE 102 evaluates at event 534 in the conditional configuration element or the RRC reconfiguration message.

Also generally similar to the C-SN, the C-MN configuration can include a group configuration (CellGroupConfig) IE that configures the C-PCell 124B and may configure zero, one, or more C-SCells of the C-MN 104B. In one implementation, the C-MN configuration can be a RRCReconfiguration message, RRCReconfiguration-IEs or the CellGroupConfig IE conforming to 3GPP TS 38.331. In this implementation, the Conditional Handover Complete message can be a RRCReconfigurationComplete message. The full configuration indication may be a field or an IE conforming to 3GPP TS 38.331. In other implementations, the C-MN configuration can include a RadioResourceConfigDedicated IE and/or a MobilityControlInfo IE configuring the C-PCell 124B and may or may not include SCellToAddModList IE configuring one or more C-SCells of the C-MN 104B. In one implementation, the C-MN configuration can be a RRCConnectionReconfiguration message or RRCConnectionReconfiguration-IEs conforming to 3GPP TS 36.331. The full configuration indication may be a field or an IE conforming to 3GPP TS 36.331. In this implementation, the Conditional Handover Complete message can be a RRCConnectionReconfigurationComplete message.

In some implementations, the MN configuration can include a CellGroupConfig IE that configures the PCell 124A and may configure zero, one, or more SCells of the MN 104A. In one implementation, the MN configuration is an RRCReconfiguration message, RRCReconfiguration-IEs or the CellGroupConfig IE conforming to 3GPP TS 38.331. In other implementations, the MN configuration can include a RadioResourceConfigDedicated IE and/or a MobilityControlInfo IE configuring the PCell 124A and may or may not include SCellToAddModList IE configuring one or more SCells of the MN 104A.

If the MN 104A is implemented as a gNB, the RRC reconfiguration message and the RRC reconfiguration complete message can be an RRCReconfiguration message and an RRCConnectionReconfigurationComplete message, respectively. If the MN 104A is implemented as an eNB or a ng-eNB, the RRC reconfiguration message and the RRC reconfiguration complete message can be implemented as an RRCReconfiguration message and an RRCConnectionReconfigurationComplete message, respectively.

In some implementations, the C-MN 104B can include a CU 172 and one or more DU 174 as shown in FIG. 1B. The CU 172 receives the Conditional Handover Request message from the MN 104A and transmits the Conditional Handover Request Acknowledge message. The DU 174 may generate the C-MN configuration or part of the C-MN configuration and transmit the C-MN configuration or part of the C-MN configuration to the CU 172. In case of the DU 174 generates the part of the C-MN configuration, the CU 172 may generate rest of the C-MN configuration. In one implementation, the DU 174 can perform 536 the random access procedure with the UE 102 and identify the UE 102 in the random access procedure. In response to the identification, the DU 174 communicates with the UE 102 using the C-MN configuration or part of the C-MN configuration. In another implementation, the DU 174 can perform the random access procedure 518 with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the rest of the C-MN configuration and part of the C-MN configuration respectively.

If the C-MN 104B identifies the UE 102 on the C-PCell 124B at event 536, the C-MN 104B (i.e., becoming the MN 104B) begins to transmit downlink control information (DCI) command(s) on physical downlink control channel(s) (PDCCH(s)), reference signal(s) or data to the UE 102 via the C-PCell 124B and/or one or more C-SCells (if configured in the C-MN configuration) according to some configuration parameters in the C-MN configuration. If the C-MN 104B identifies the UE 102 on the C-PCell 124B at event 536, the C-MN 104B may receive signal(s) on PUCCH(s), sounding reference signal(s) or data from the UE 102 via the C-PCell 124B and/or one or more C-SCells (if configured in the C-MN configuration) according to some configuration parameters in the C-MN configuration. The UE 102 receives the DCI command(s) on PDCCH(s), reference signal(s) or data from the C-MN 104B via the C-PCell 124B and/or one or more C-SCells (if configured in the C-MN configuration) according to some configuration parameters in the C-MN configuration. The UE 102 may transmit signal(s) on PUCCH(s), sounding reference signal(s) or data to the C-MN 104B via the C-PCell 124B and one or more C-SCells (if configured in the C-MN configuration) according to some configuration parameters in the C-MN configuration. In response to the identification, the C-MN 104B becomes MN 104B and determines that the C-PCell 124B becomes PCell 124B and the one or more C-SCells becomes one or more SCells.

Figure 5B:
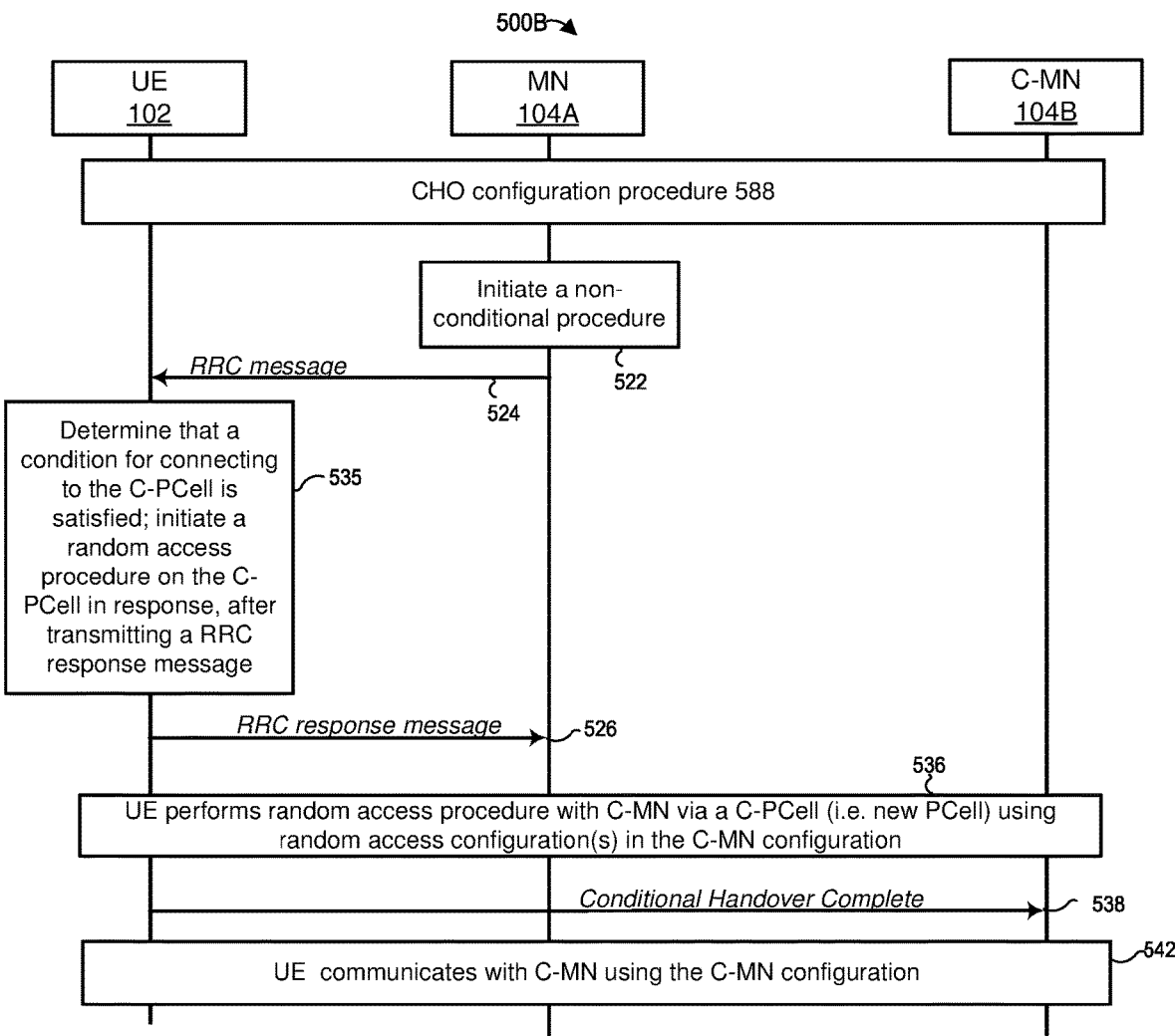
FIG. 5B is a messaging diagram of an example scenario similar to the scenario of FIG. 3C, except that the conditional procedure is CHO.

Now referring to FIG. 5B, a scenario 500B also involves CHO, and the base stations 104A and 104B operate as MN 104A and C-MN 104B, respectively. Events in this scenario similar to those discussed above are labeled with same references numbers. This scenario is also similar to the scenario 300C, in that the UE 102 transmits 526 an RRC response message to the MN 104A prior to performing 536 the random access procedure on the candidate cell (in this case, a C-PCell rather a C-PSCell of the CPAC scenarios). Thus, the UE 102 completes the non-conditional procedure prior to completing the conditional procedure, and also accounts for the non-conditional configuration and/or instructions.

Now referring to FIG. 5C, a scenario 500C also involves CHO, and the base stations 104A and 104B operate as MN 104A and C-MN 104B, respectively. Events in this scenario similar to those discussed above are labeled with same references numbers. This scenario is also similar to the scenario 300F, in that the UE 102 aborts a non-conditional procedure by stopping 562 the transmission of an UL RRC message. The non-conditional procedure in this case is UE-originated.

Now referring to FIG. 5D, a scenario 500D also involves CHO, and the base stations 104A and 104B operate as MN 104A and C-MN 104B, respectively. Events in this scenario similar to those discussed above are labeled with same references numbers. This scenario is also similar to the scenario 300D, in that the UE 102 transmits 566 the UL RRC message after the random access procedure of event 536. However, the UE 102 transmits 566 the UL RRC message via the C-PCell to the C-MN 104B. The non-conditional procedure in this case is UE-originated.

Figure 5E:
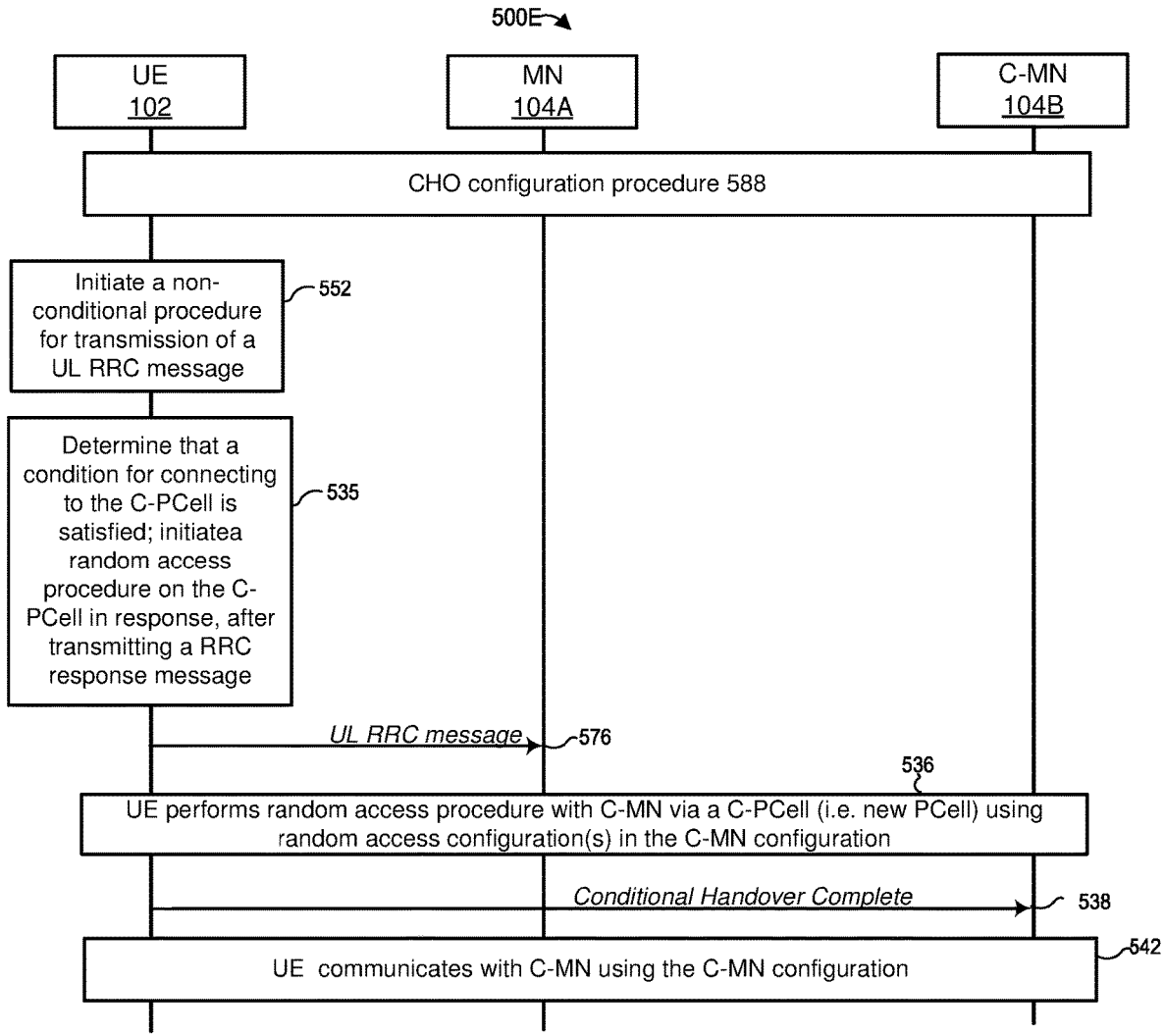
FIG. 5E is a messaging diagram of an example scenario similar to the scenario of FIG. 3I, except that the conditional procedure is CHO.

Now referring to FIG. 5E, a scenario 500E also involves CHO, and the base stations 104A and 104B operate as MN 104A and C-MN 104B, respectively. Events in this scenario similar to those discussed above are labeled with same references numbers. This scenario is also similar to the scenario 300I, in that the UE 102 transmits 576 the UL RRC message prior to the random access procedure of event 536, thus completing the non-conditional procedure first.

Next, FIG. 6A illustrates a scenario 600A that also involves CHO, but here the handover occurs between cells of the same base station operating as an MN. In this scenario, the base station 104A operates as a MN. The UE 102 initially communicates in SC with the MN 104A in accordance with the MN configuration. The MN 104A determines 604 that it should configure the UE 102 with a C-MN configuration for a C-PCell. The MN 104A transmits 612 an RRC reconfiguration enclosing conditional configuration, which in turn includes C-MN configuration, to the UE 102. The UE 102 optionally can respond 614 with an RRC reconfiguration compete message.

The MN 104 then initiates 622 a non-conditional procedure and transmits 624 an RRC message to the UE 102. The UE 102 can detect 634 that a condition (or conditions) for connecting to the C-PCell 124B is satisfied and initiate 534 a random access procedure on the C-PCell 124B in response to the detection. In response to the detection 634, the UE 102 also stops (or suspends) transmitting 660 an RRC response message responding to the RRC message.

In response to the initiation at event 634, the UE 102 can perform 636 the random access procedure with the MN 104A via the C-PCell using a random access configuration in the C-MN configuration. The UE 102 may disconnect from the PCell 124A of the MN 104A in response to the initiation or the detection. The UE 102 may transmit 638 a Conditional Handover Complete message via the C-PCell to the MN 104A in/after 636 the random access procedure in response to the C-MN configuration. The UE 102 then can communicate 642 with the MN 104A via the new PCell.

Now referring to FIG. 6B, a scenario 600B also involves an intra-MN CHO, and the base station 104A operates as MN 104A. Events in this scenario similar to those discussed above are labeled with same references numbers. This scenario is also similar to the scenario 500B, in that the UE 102 transmits 626 an RRC response message to the MN 104A prior to performing 636 the random access procedure on the candidate cell. Thus, the UE 102 completes the non-conditional procedure prior to completing the conditional procedure, and also accounts for the non-conditional configuration and/or instructions.

Figure 6C:
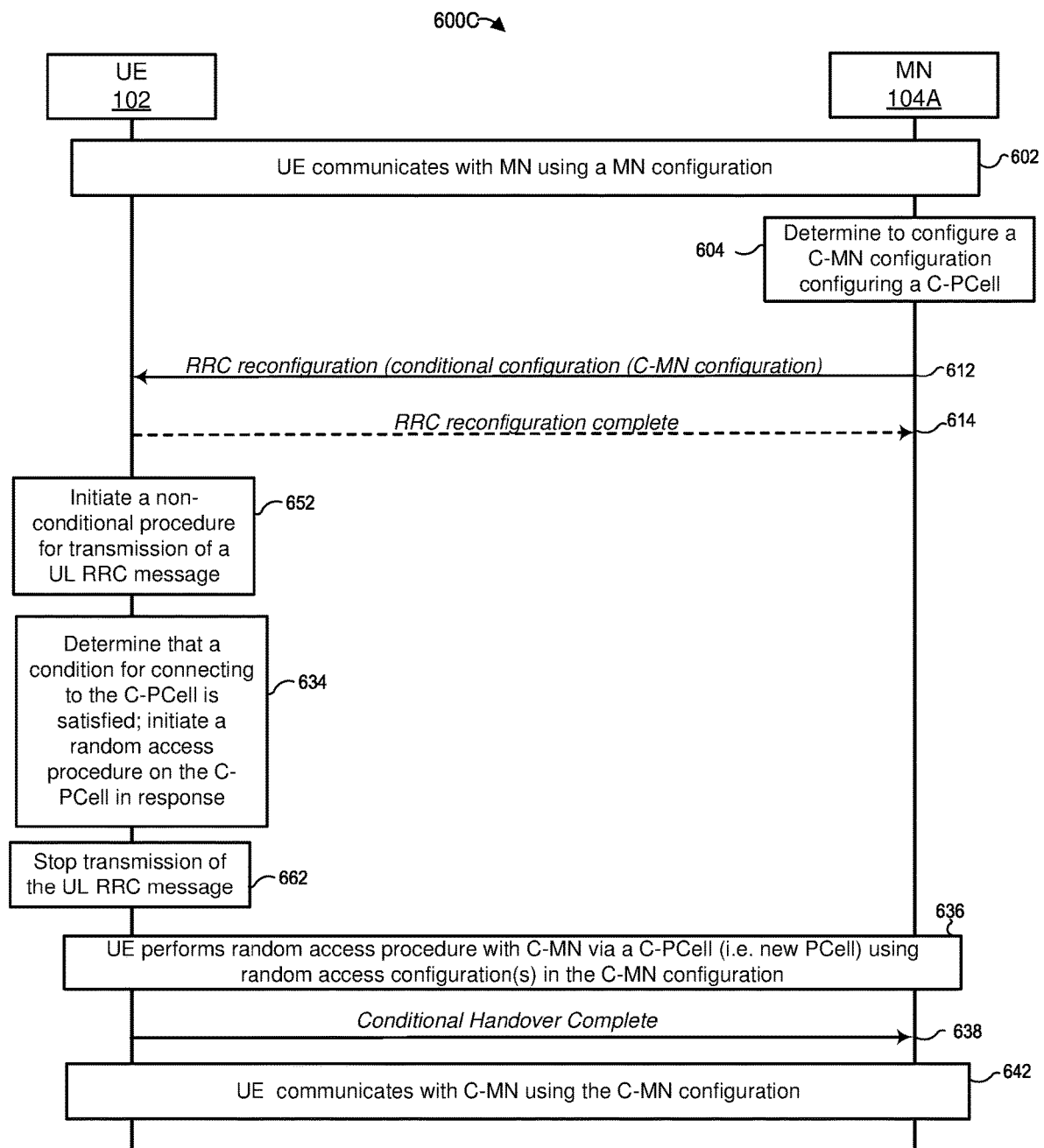
FIG. 6C is a messaging diagram of an example scenario similar to the scenario of FIG. 5C, except that the conditional procedure is an intra-base station CHO.

Now referring to FIG. 6C, a scenario 600C also involves an intra-MN CHO, and the base station 104A operates as MN 104A. Events in this scenario similar to those discussed above are labeled with same references numbers. This scenario is also similar to the scenario 500C, in that the UE 102 aborts a non-conditional procedure by stopping 662 the transmission of an UL RRC message. The non-conditional procedure in this case is UE-originated.

Figure 6D:
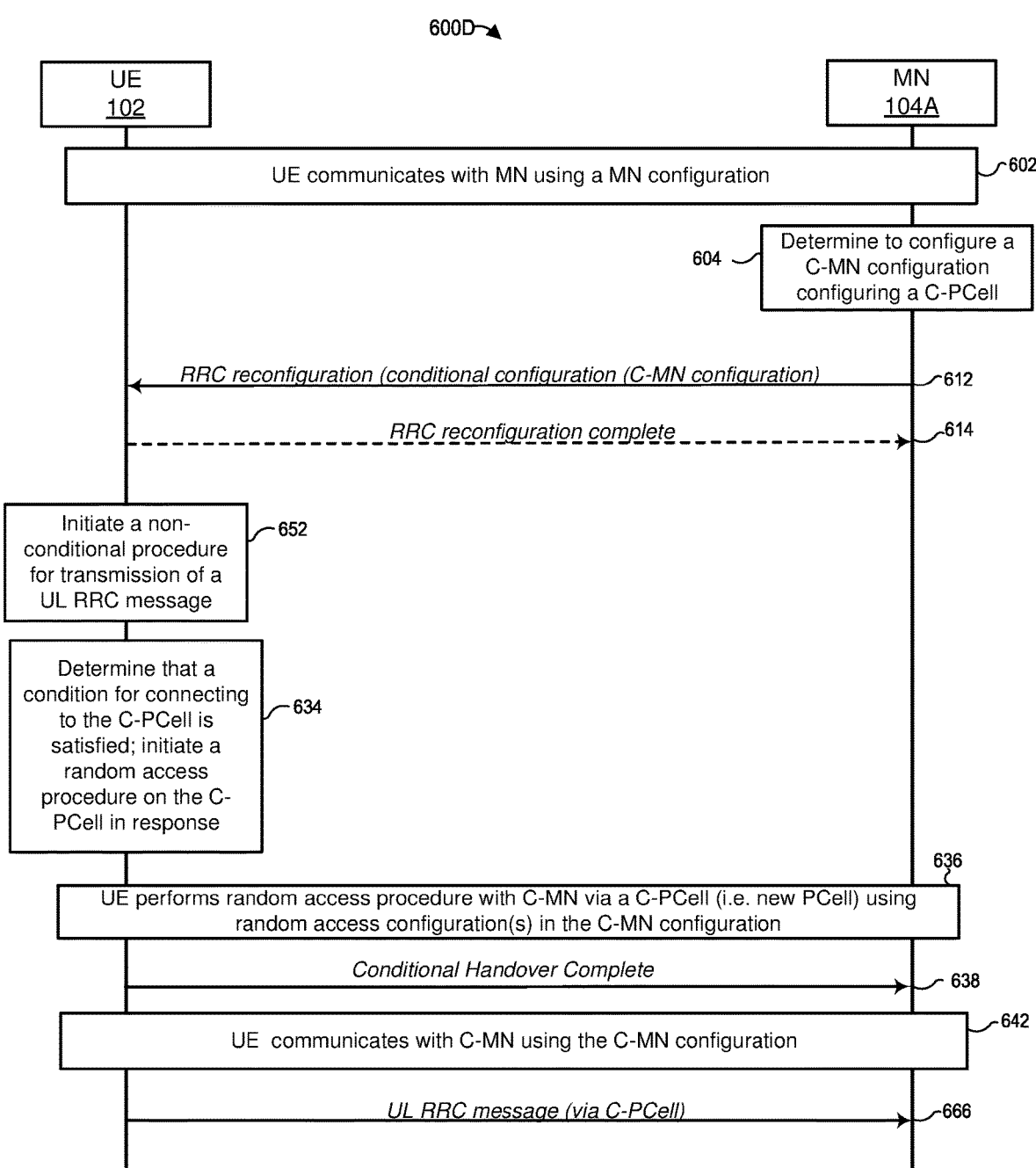
FIG. 6D is a messaging diagram of an example scenario similar to the scenario of FIG. 5D, except that the conditional procedure is an intra-base station CHO.

Now referring to FIG. 6D, a scenario 600D also involves an intra-MN CHO, and the base station 104A operates as MN 104A. Events in this scenario similar to those discussed above are labeled with same references numbers. This scenario is also similar to the scenario 500D, in that the UE 102 transmits 666 the UL RRC message after the random access procedure of event 636. However, the UE 102 transmits 666 the UL RRC message via the C-PCell to the C-MN 104B. The non-conditional procedure in this case is UE-originated.

Figure 6E:
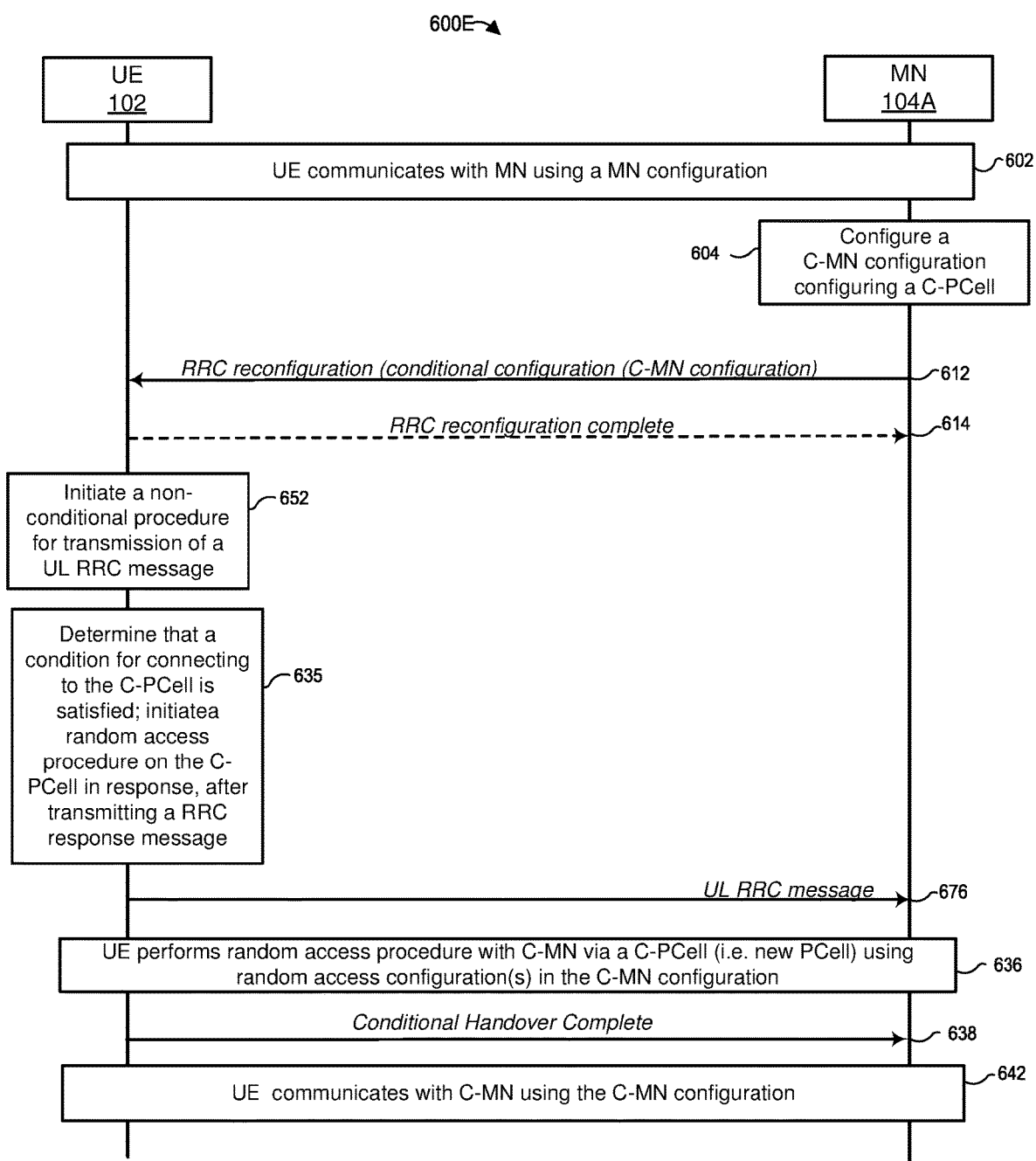
FIG. 6E is a messaging diagram of an example scenario similar to the scenario of FIG. 5E, except that the conditional procedure is an intra-base station CHO.

Now referring to FIG. 6E, a scenario 600E also involves an intra-MN CHO, and the base station 104A operates as MN 104A. Events in this scenario similar to those discussed above are labeled with same references numbers. This scenario is also similar to the scenario 500E, in that the UE 102 transmits 676 the UL RRC message prior to the random access procedure of event 636, thus completing the non-conditional procedure first.

Figure 7:
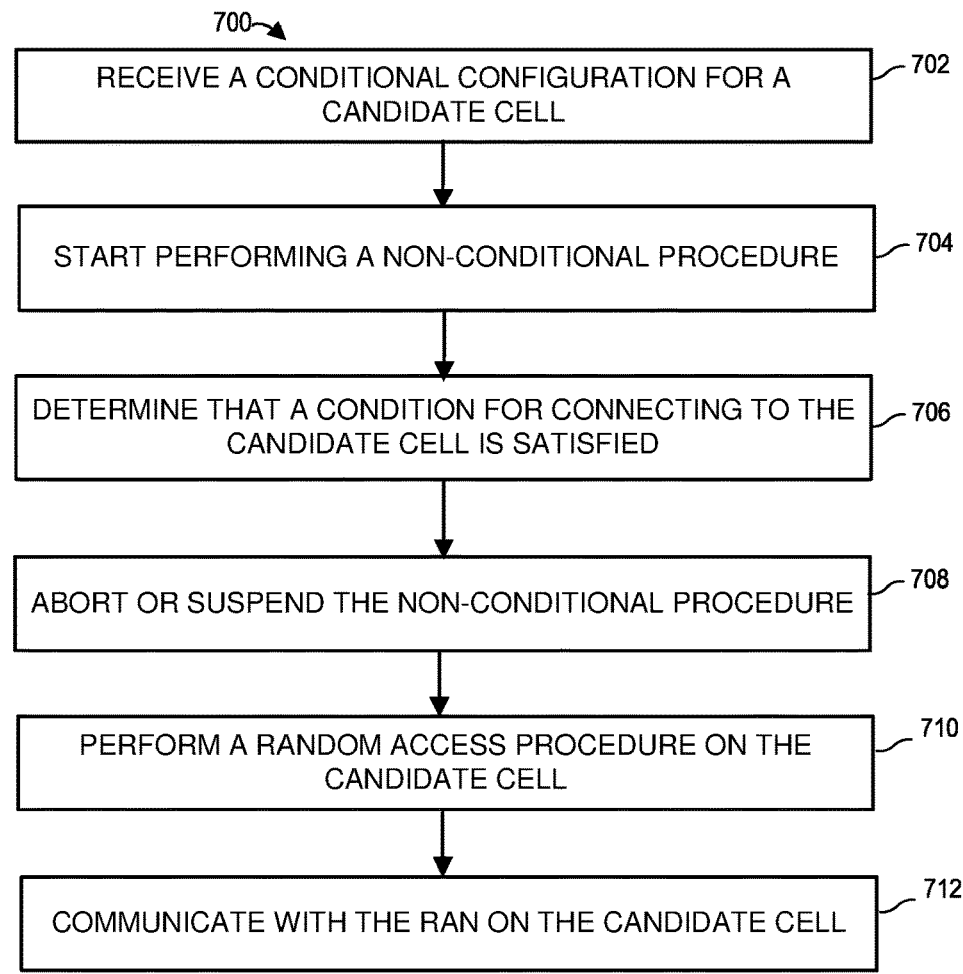
FIG. 7 is a flow diagram of an example method for managing a non-conditional procedure that is in progress when the UE detects a condition for performing a conditional procedure, which can be implemented in the UE of FIG. 1A or 1B.

FIG. 7 illustrates another example method 700 for managing a non-conditional procedure while initiating a conditional procedure, which can be implemented in a UE such as the UE 102 discussed above for example. The method 700 can be executed by any suitable processing hardware such as one or more processors.

At block 702, the UE 102 receives a conditional configuration for a candidate cell. The UE 102 then performs 704 a non-conditional procedure. This non-conditional procedure can be initiated either by the RAN (see FIGS. 3A-3E, 4A-4C, 5A-5B, 6A-6B) or by the UE (see FIGS. 3F-3I, 4D-4G, 5C-5E, 6C-6E). Next, at block 706, the UE determines that a condition for connecting to the candidate cell is satisfied. The UE then aborts or suspends 708 the non-conditional procedure and performs 710 a random access procedure on the candidate cell. The UE then begins to communicate 712 on the candidate cell.

Figure 8:
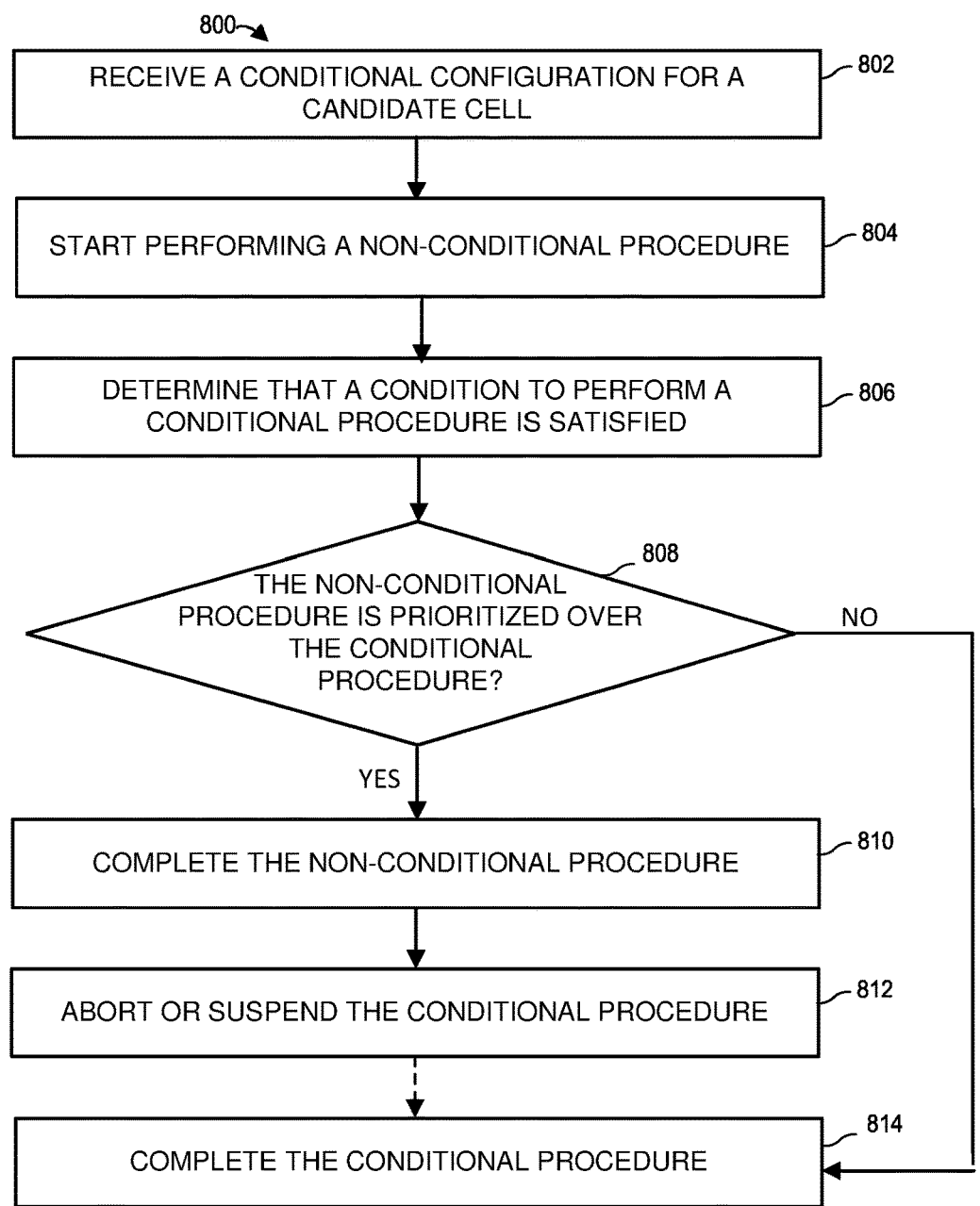
FIG. 8 is a flow diagram of an example method for managing a non-conditional procedure that is in progress when the UE detects a condition for performing a conditional procedure, which includes determining the relative priorities of the two procedures.

FIG. 8 illustrates another example method 800 for managing a non-conditional procedure while initiating a conditional procedure, which can be implemented in a UE. The method 800 can be executed by any suitable processing hardware such as one or more processors. According to this technique, the UE determines whether it should prioritize a non-conditional procedure or a conditional procedure.

The method 800 begins at block 802, where the UE receives a conditional configuration configuring a candidate cell. The UE at block 804 starts performing a non-conditional procedure after the UE receives the conditional configuration. This non-conditional procedure can be initiated either by the RAN (see FIGS. 3A-3E, 4A-4C, 5A-5B, 6A-6B) or by the UE (see FIGS. 3F-3I, 4D-4G, 5C-5E, 6C-6E). At block 806, the UE detects a condition to perform a conditional procedure is satisfied. The UE at block 808 determines whether the non-conditional procedure is prioritized over the conditional procedure. If the UE determines the non-conditional procedure is prioritized over the conditional procedure, the UE completes the non-conditional procedure at block 810 and aborts or suspends the conditional procedure at block 812. Although the flow diagram shows block 810 before block 812, they may occur in parallel or block 812 may occur before block 810. If the conditional procedure is suspended per block 812, the UE completes the conditional procedure at block 814. If the UE determines the conditional procedure is prioritized over non-conditional procedure, the UE completes the conditional procedure at block 814.

In some implementations, the UE may prioritize a non-conditional procedure or a conditional procedure based on a DL RRC message (324, 424, 524, 624) of the non-conditional procedure. The UE may prioritize the non-conditional procedure over the conditional procedure if the DL RRC message includes a mobility field/IE (e.g., a ReconfigurationWithSync IE or a MobilityControlInfo). The UE may prioritize the conditional procedure over the non-conditional procedure if the DL RRC message does not include the mobility field/IE.

Figure 9:
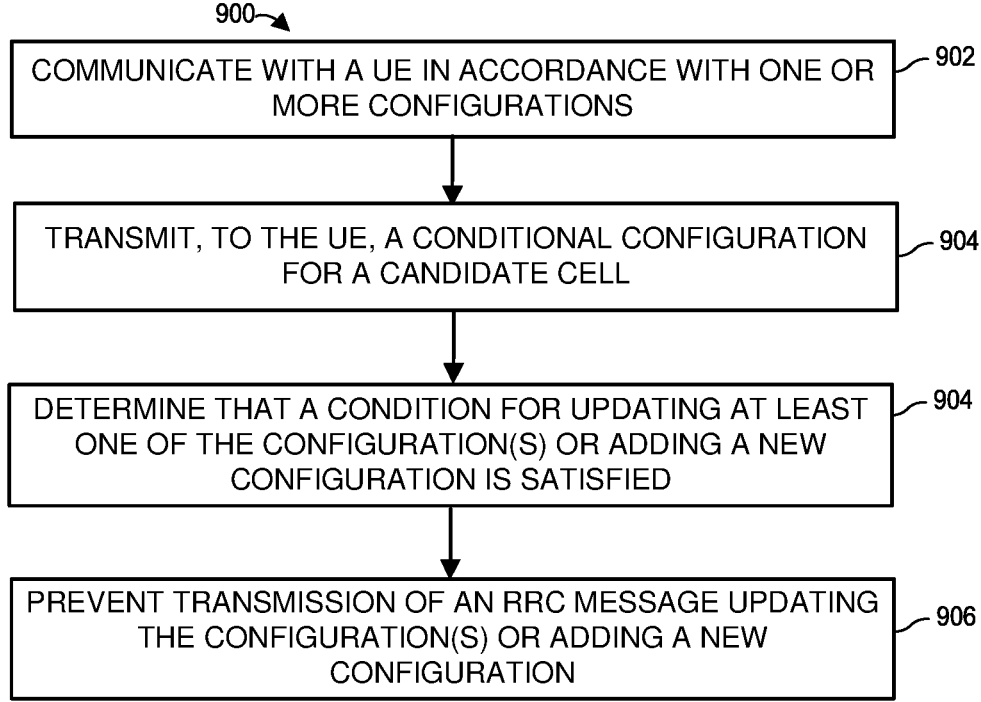
FIG. 9 is a flow diagram of an example method for managing configuration updates at a UE in view of whether a condition for applying a conditional configuration is satisfied, which can be implemented in a base station of this disclosure.

FIG. 9 is a flow diagram of an example method 900 for managing configuration updates at a UE in view of whether a condition for applying a conditional configuration is satisfied, which can be implemented in one or more base stations of this disclosure such as base stations 104A, 104B, 106A, or 106B. The method 900 can be executed by any suitable processing hardware such as one or more processors.

At block 902, the base station communicates with a UE in accordance with one or more configurations (e.g., an MN configuration, an SN configuration, and in some cases a conditional configuration). At block 904, the base station transmits to the UE a conditional configuration for a candidate cell. The base station determines that the condition for updating at least one of the configuration(s) or adding a configuration is satisfied. However, because the base station 904 provided a conditional configuration to the UE at block 904, which the UE has not yet applied, the base station at block 906 prevents transmission of an RRC message updating the configuration(s) at the UE. This transmission can be associated with a RAN-initiated non-conditional procedure.

Thus, according to the method 900, the base station can prevent the UE from receiving a command to initiate a non-conditional procedure while the UE may be initiating a conditional procedure. Of course, the base station cannot prevent the UE from initiating a UE-originated conditional procedure, and thus the base station can avoid the scenario of FIG. 3A for example but not of FIG. 3F, for example.

FIG. 10 is a flow diagram of an example method 1000 for managing configuration updates at a UE in view of whether the UE is configured conditional configuration, which can be implemented in a base station of this disclosure. The method 1000 can be executed by any suitable processing hardware such as one or more processors.

At block 1002, the base station communicates with a UE in accordance with one or more configurations (e.g., an MN configuration, an SN configuration, and in some cases a conditional configuration). At block 1004, the base station determines that a condition for updating at least one of the configuration(s) or adding a configuration at the UE is satisfied.

Similar to the scenario 900, the base station in the scenario 1000 seeks to prevent the UE receiving a command to initiate a non-conditional procedure while the UE may be initiating a conditional procedure. In this case, however, the base station determines 1006 whether the UE currently has an outstanding conditional configuration (i.e., whether the UE has not yet completed a conditional procedure). If such conditional configurations are outstanding, the base station at block 1008 prevents transmission of an RRC message updating the configuration(s) at the UE. Otherwise, the flow proceeds to block 1010, where the base station transmits the RRC message. Optionally, the flow can proceed from block 1008 to block 1010 after a certain period of time (e.g., upon timer expiration) or in response to determining that the conditional configuration is no longer outstanding at the UE.

FIG. 11 is a flow diagram of an example method 1100 for managing a non-conditional configuration when the UE does not transmit a message related to the corresponding non-conditional procedure to the RAN, which can be implemented in the UE of this disclosure such as the UE 102. The method 1100 can be executed by any suitable processing hardware such as one or more processors.

At block 1102, the UE receives a conditional configuration for a candidate cell. The UE starts performing the non-conditional procedure at block 1104. This non-conditional procedure can be initiated either by the RAN (see FIGS. 3A-3E, 4A-4C, 5A-5B, 6A-6B) or by the UE (see FIGS. 3F-3I, 4D-4G, 5C-5E, 6C-6E). At block 1106, the UE determines that the condition for connecting to a candidate cell is satisfied, and prevents transmission of a message related to the non-conditional procedure (e.g., RRC reconfiguration complete or UL RRC) to the RAN.

At block 1122, the UE determines whether it should still apply the configuration. To this end, the UE can determine whether the configuration is in conflict with the conditional configuration. Additionally or alternatively, the UE can be pre-configured to process non-conditional configuration in a certain manner in the scenario of FIG. 11.

If the UE determines that it should apply the non-conditional configuration, the flow proceeds to block 1124, where the UE applies the configuration and includes an indication that the non-conditional configuration has been applied in a message related to the conditional procedure (e.g., RRC reconfiguration complete transmitted on the candidate cell), in the form of a field, a UE, a value, etc.

Otherwise, the UE can provide an explicit or implicit indication to the RAN that the UE has not applied the non-conditional configuration. For example, the UE can include an indication that the non-conditional configuration has not been applied in a message related to the conditional procedure (e.g., RRC reconfiguration complete transmitted on the candidate cell), in the form of a field, a UE, a value, etc. Alternatively, the UE can provide no indication regarding the non-conditional procedure, and the RAN can determine that the has discarded the non-conditional configuration and aborted the non-conditional procedure based on this implicit indication.

Figure 12:
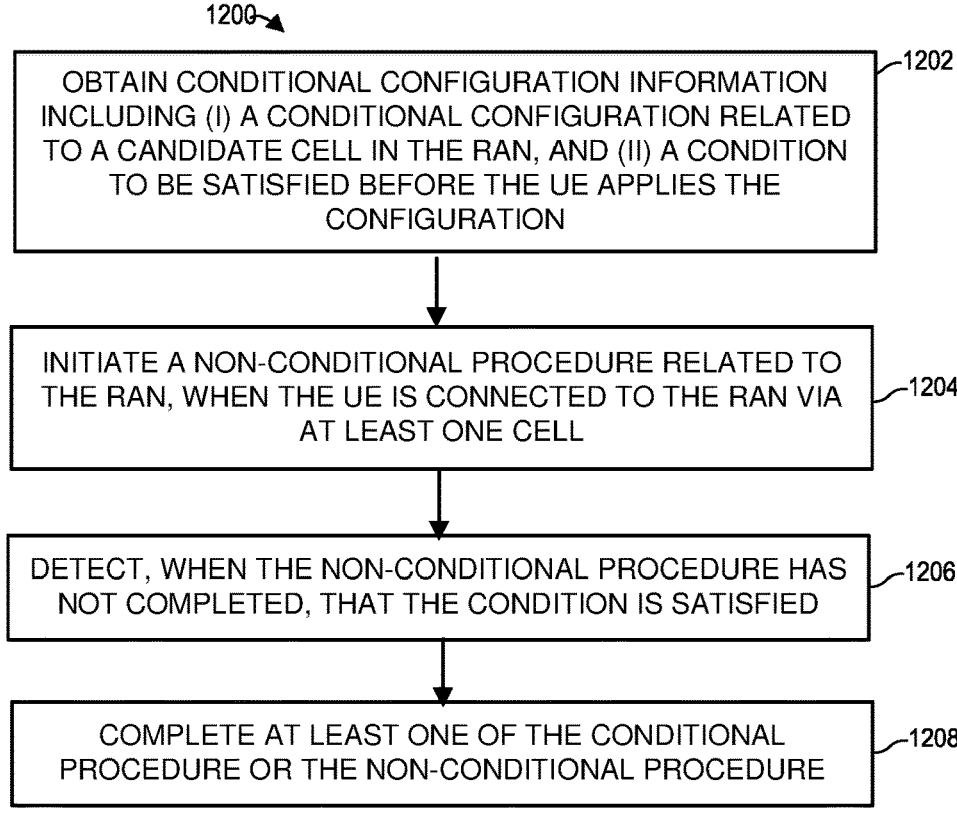
FIG. 12 is a flow diagram of an example method for managing mobility configuration, which can be implemented in the UE of this disclosure.

For further clarity, FIG. 12 illustrates a flow diagram of an example method 1200 for managing mobility configuration, which can be implemented in the UE of this disclosure, such as the UE 102. The method 1200 can be executed by any suitable processing hardware.

At block 1202, the UE obtains conditional configuration information including (i) a conditional configuration related to a candidate cell in the RAN, and (ii) a condition to be satisfied before the UE applies the configuration (events 308, 307, 464, 512, 612)

At block 1204, the UE detects that a non-conditional procedure related to the UE and the RAN has been initiated, when the UE is connected to the RAN via at least one cell (events 324, 352, 424, 452, 524, 552, 624, 652). This non-conditional procedure can be initiated either by the RAN (see FIGS. 3A-3E, 4A-4C, 5A-5B, 6A-6B) or by the UE (see FIGS. 3F-3I, 4D-4G, 5C-5E, 6C-6E).

At block 1206, the UE determines, subsequently to the detecting and when the non-conditional procedure has not been completed, that the condition is satisfied (event 334, 335, 434, 435, 534, 535, 634, 635).

At block 1208, the UE completes at least one of the conditional procedure in accordance with the conditional configuration (event 336, 436, 536, 636) or the non-conditional procedure (event 326, 346, 356, 366, 376, 386, 424, 426, 456, 466, 476, 486, 526, 566, 576, 626, 666, 638).

Figure 13:
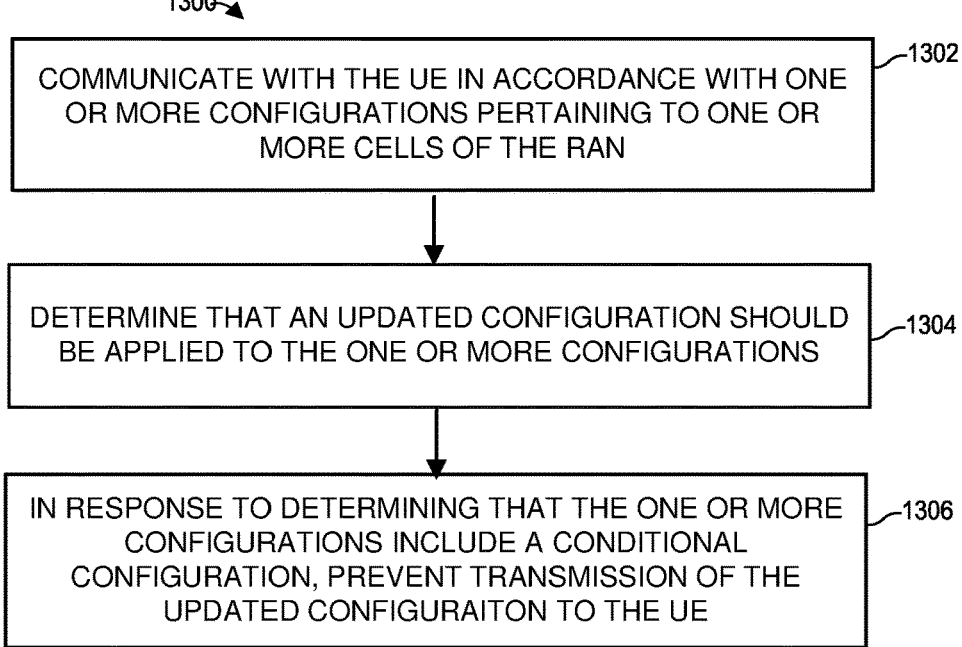
FIG. 13 is a flow diagram of an example method for managing mobility configuration at a UE, which can be implemented in a base station of this disclosure.

FIG. 13 is a flow diagram of an example method 1300 for managing mobility configuration at a UE, which can be implemented in a base station of this disclosure, such as the base station 104A, 104B, 106A, or 106B, using any suitable processing hardware such as one or more processors.

The method 1300 begins at block 1302, where the base station communicates with the UE in accordance with one or more configurations pertaining to one or more cells of a RAN in which the base station operates. At block 1304, the base station determines an updated configuration should be applied to the one or more configurations at the UE. At block 1306, in response to determining that the one or more configurations include a conditional configuration, which the UE applies only when a corresponding condition is satisfied, the base station prevents the updated configuration from being transmitted to the UE.

The following description may be applied to the description above.

The RRC message at event 324, 424, 524 and 624 in some cases includes a mobility field/IE (e.g., a MobilityControlInfo IE or a ReconfigurationWithSync IE), and in other cases does not include this field A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of examples reflects additional embodiments explicitly contemplated by the present disclosure Example 1. A method in a UE for managing mobility configuration, the method comprising: obtaining, by processing hardware, conditional configuration information including (i) a conditional configuration related to a candidate cell in the RAN, and (ii) a condition to be satisfied before the UE applies the configuration; detecting, by the processing hardware, that a non-conditional procedure related to the UE and the RAN has been initiated, when the UE is connected to the RAN via at least one cell; determining, subsequently to the detecting and when the non-conditional procedure has not been completed, that the condition is satisfied; and completing, by the processing hardware, at least one of the (i) the conditional procedure in accordance with the conditional configuration or (ii) the non-conditional procedure.

Example 2. The method of example 1, including completing the conditional procedure when the non-conditional procedure has not been completed.

Example 3. The method of example 2, further comprising: aborting transmission of a message indicative of completion of the non-conditional procedure to the RAN, in response to the determining.

Example 4. The method of example 3, further comprising: discarding, by the processing hardware, configuration information associated with the non-conditional procedure.

Example 5. The method of example 3, further comprising: applying, by the processing hardware, configuration information associated with the non-conditional procedure; and including an indication that the configuration information has been applied in a message associated with the conditional procedure and transmitted to the RAN.

Example 6. The method of example 5, further comprising: including a transaction identifier in the message to identify the non-conditional procedure to the RAN.

Example 7. The method of example 2, further comprising: completing the non-conditional procedure concurrently with completing the conditional procedure.

Example 8. The method of example 7, wherein: completing the conditional procedure includes transmitting a first message to an MN via a primary cell.

Example 9. The method of example 7 or 8, wherein: completing the conditional procedure includes transmitting a second message to an SN via a secondary cell.

Example 10. The method of example 2, further comprising: transmitting a message indicative of completion of the non-conditional procedure to the RAN, after completing the conditional procedure.

Example 11. The method of example 2, further comprising: determining a failure to transmit a message related to the non-conditional procedure prior to completing the conditional procedure; and completing the non-conditional procedure after completing the conditional procedure, including transmitting the message related to the non-conditional procedure to the RAN.

Example 12. The method of example 1, including completing the non-conditional procedure when the conditional procedure has not been completed.

Example 13. The method of example 12, further comprising: completing the conditional procedure after completing the non-conditional procedure.

Example 14. The method of example 12, further comprising: aborting the conditional procedure in response to the detecting.

Example 15. The method of example 13, wherein: the detecting includes receiving a command from the RAN; and the aborting is in response to determining that the command includes an indication that the UE is to abort the conditional procedure.

Example 16. The method of any of the preceding examples, further comprising:
determining, by the processing hardware, which of the conditional procedure and the non-conditional procedure has a higher priority.

Example 17. The method of example 16, further comprising: receiving, by the processing hardware, a message from the RAN related to the non-conditional procedure, the message including an indication of whether the non-conditional procedure has a higher priority than the conditional procedure.

Example 18. The method of any of the preceding examples, wherein the detecting includes: receiving, by the processing hardware and from the RAN, a command to initiate the non-conditional procedure.

Example 19. The method of example 18, wherein the non-conditional procedure is one of: (i) a reconfiguration of radio resources; or (ii) a UE information procedure.

Example 20. The method of any of examples 1-17, wherein the detecting includes:
determining, by the processing hardware, that the UE is to originate the non-conditional procedure.

Example 21. The method of example 20, wherein the non-conditional procedure is one of: (i) uplink information transfer procedure; (ii) a measurement reporting procedure; (iii) a UE assistance information procedure; (iv) an in-device coexistence indication procedure.

Example 22. The method of any of the preceding examples, wherein the conditional procedure is conditional handover (CHO).

Example 23. The method of any of examples 1-20, wherein the conditional procedure is conditional primary secondary cell (PSCell) addition or change (CPAC).

Example 24. The method of any examples 1-20, wherein the conditional procedure is conditional secondary node (SN) addition or change (CSAC).

Example 25. A user equipment (UE) including processing hardware and configured to implement a method of any of the preceding examples.

Example 26. A method in a base station for managing mobility configuration of a UE, the method comprising: communicating, by processing hardware with the UE, in accordance with at least one configuration pertaining to one or more cells of a radio access network (RAN) in which the base station operates; determining, by the processing hardware, that an updated configuration should be applied to the at least one configuration at the UE; and in response to determining that the at least one configuration includes a conditional configuration, which the UE applies only when a corresponding condition is satisfied, preventing the updated configuration from being transmitted to the UE;

Example 27. The method of example 26, wherein the preventing is further in response to determining, by the processing hardware, that the condition for applying the conditional configuration at the UE is satisfied.

Example 28. The method of example 26, wherein the updated configuration is for modifying one of the at least one configuration.

Example 29. The method of example 26, wherein the updated configuration is for augmenting the at least one of configuration.

Example 30. The method of any examples 26-29, wherein the conditional configuration pertains to conditional handover (CHO).

Example 31. The method of any examples 26-29, wherein the conditional configuration pertains to conditional primary secondary cell (PSCell) addition or change (CPAC).

Example 32. The method of any examples 26-29, wherein the conditional configuration pertains to conditional secondary node (SN) addition or change (CSAC).

Example 33. A base station comprising processing hardware and configured to implement a method of any of examples 26-37.

What is claimed is:

1. A method implemented in a user equipment (UE) for managing mobility configuration, the method comprising:

obtaining conditional configuration information including (i) a conditional configuration related to a candidate cell in a Radio Access Network (RAN), and (ii) a condition to be satisfied before the UE applies the configuration;

detecting that a non-conditional procedure related to the UE and the RAN has been initiated, when the UE is connected to the RAN via at least one cell;

in response to determining, subsequently to the detecting and when the non-conditional procedure has not been completed, that the condition is satisfied:

completing the conditional procedure in accordance with the conditional configuration, and performing the non-conditional procedure concurrently with the conditional procedure.

2. The method of claim 1, wherein:

completing the conditional procedure includes transmitting a first message to a master node (MN) via a primary cell.

3. The method of claim 2 wherein:

completing the conditional procedure includes transmitting a second message to a secondary node (SN) via a secondary cell.

4. The method of claim 1, further comprising:

transmitting a message indicative of completion of the non-conditional procedure to the RAN, after completing the conditional procedure.

5. The method of claim 1, wherein the detecting includes:

receiving, from the RAN, a command to initiate the non-conditional procedure.

6. The method of claim 5, wherein the non-conditional procedure is: (ii) a UE assistance information procedure.

7. The method of claim 6, wherein the UE assistance information procedure includes transmitting an UEAssistanceInformation message.

8. The method of claim 1, wherein the detecting includes:

determining that the UE is to originate the non-conditional procedure.

9. The method of claim 7, wherein the non-conditional procedure is an in-device coexistence indication procedure.

10. The method of claim 9, wherein the in-device coexistence indication procedure includes transmitting an InDeviceCoexIndication message.

11. The method of claim 1, wherein the conditional procedure is:

(i) conditional handover (CHO), (ii) conditional primary secondary cell (PSCell) addition or change (CPAC), or (iii) conditional secondary node (SN) addition or change (CSAC).

12. A user equipment (UE) including:

a transceiver; and processing hardware configured to:

obtain configuration information including (i) a conditional configuration related to a candidate cell in a Radio Access Network (RAN), and (ii) a condition to be satisfied before the UE applies the configuration;

detect that a non-conditional procedure related to the UE and the RAN has been initiated, when the UE is connected to the RAN via at least one cell;

in response to determining, subsequently to the detecting and when the non-conditional procedure has not been completed, that the condition is satisfied;

complete the conditional procedure in accordance with the conditional configuration, and perform the non-conditional procedure concurrently with the conditional procedure.

13. The UE of claim 12, wherein to complete the conditional procedure, the processing hardware is configured to transmit a first message to a master node (MN) via a primary cell.

14. The UE of claim 13, wherein to complete the conditional procedure, the processing hardware is configured to transmit a second message to a secondary node (SN) via a secondary cell.

15. The UE of claim 12, wherein processing hardware is further configured to: transmit a message indicative of completion of the non-conditional procedure to the RAN, after completing the conditional procedure.

16. The method of claim 1, wherein the non-conditional procedure is UE-initiated.

17. The UE of claim 12, wherein the non-conditional procedure is a UE assistance information procedure.

18. The UE of claim 17, wherein the UE assistance information procedure includes transmitting an UEAssistanceInformation message.

19. The UE of claim 12, wherein the non-conditional procedure is an in-device coexistence indication procedure.

20. The UE of claim 19, wherein the in-device coexistence indication procedure includes transmitting an InDeviceCoexIndication message.

* * * * *